(12) United States Patent
Duric et al.

(10) Patent No.: US 12,507,978 B2
(45) Date of Patent: Dec. 30, 2025

(54) METHODS AND SYSTEMS FOR CANCER RISK ASSESSMENT USING TISSUE SOUND SPEED AND STIFFNESS

(71) Applicant: Delphinus Medical Technologies, Inc., Novi, MI (US)

(72) Inventors: Nebojsa Duric, Novi, MI (US); Mark Sak, Novi, MI (US); Peter Littrup, Novi, MI (US); Cuiping Li, Novi, MI (US); Olivier Roy, Novi, MI (US)

(73) Assignee: Delphinus Medical Technologies, Inc., Novi, MI (US)

( * ) Notice: Subject to any disclaimer, the term of this patent is extended or adjusted under 35 U.S.C. 154(b) by 0 days.

(21) Appl. No.: 17/840,121

(22) Filed: Jun. 14, 2022

(65) Prior Publication Data

US 2022/0323043 A1 Oct. 13, 2022

Related U.S. Application Data

(63) Continuation of application No. PCT/US2020/065432, filed on Dec. 16, 2020.
(Continued)

(51) Int. Cl.
*A61B 8/08* (2006.01)
*A61B 8/00* (2006.01)
(Continued)

(52) U.S. Cl.
CPC ............ *A61B 8/0825* (2013.01); *A61B 8/406* (2013.01); *G06T 7/0012* (2013.01); *A61B 8/13* (2013.01); *G06T 2207/30068* (2013.01)

(58) Field of Classification Search
CPC ......... A61B 8/0825; A61B 8/406; A61B 8/13; G06T 7/0012; G06T 2207/30068
See application file for complete search history.

(56) References Cited

U.S. PATENT DOCUMENTS 9,144,403 B2 *  9/2015  Duric ................. A61B 8/483
10,201,324 B2    2/2019  Glide-Hurst et al.
(Continued)

FOREIGN PATENT DOCUMENTS

WO   WO-2019210292 A1   10/2019
WO   WO-2021127056      6/2021

OTHER PUBLICATIONS

Boyd et al., "Breast Tissue Composition and Susceptibility to Breast Cancer", 2010 (Year: 2010).*
(Continued)

*Primary Examiner* — Brooke Lyn Klein
(74) *Attorney, Agent, or Firm* — WILSON SONSINI GOODRICH & ROSATI

(57) ABSTRACT

A method of analyzing an image of a volume of tissue to determine a risk of developing breast cancer using a volume averaged sound speed within the volume. A method of determining a response to a treatment plan by determining a volume and a volume averaged sound speed of a region of interest within a volume of breast tissue and generating a combined metric from the volume and the volume averaged sound speed over the plurality of instances of time. A method of analyzing an image of a volume of tissue of a breast by applying a spatial filter to at least one ultrasound tomography image at the computing system and generating a stiffness map from the at least one ultrasound tomography image.

22 Claims, 38 Drawing Sheets

Related U.S. Application Data

(60) Provisional application No. 62/952,000, filed on Dec. 20, 2019, provisional application No. 62/949,004, filed on Dec. 17, 2019, provisional application No. 62/948,993, filed on Dec. 17, 2019.

(51) Int. Cl.
*G06T 7/00* (2017.01)
*A61B 8/13* (2006.01)

(56) References Cited

U.S. PATENT DOCUMENTS

| | | | |
|---|---|---|---|
| 2008/0275344 A1 | 11/2008 | Glide-Hurst et al. | |
| 2010/0331694 A1* | 12/2010 | Waki | A61B 8/08 600/443 |
| 2011/0201928 A1* | 8/2011 | Duric | G06T 7/0014 600/438 |
| 2011/0319746 A1* | 12/2011 | Kochba | A61B 5/4848 600/407 |
| 2015/0005635 A1* | 1/2015 | Glide-Hurst | A61B 8/15 600/442 |
| 2015/0313577 A1* | 11/2015 | Duric | A61B 8/5207 600/438 |
| 2016/0030000 A1 | 2/2016 | Sandhu et al. | |
| 2016/0038123 A1* | 2/2016 | Duric | G06T 5/008 600/443 |
| 2017/0181656 A1* | 6/2017 | Reeder | A61B 5/4872 |
| 2018/0153502 A1 | 6/2018 | Duric et al. | |
| 2019/0117194 A1 | 4/2019 | Duric et al. | |

OTHER PUBLICATIONS

Duric et al., "Breast density measurement with ultrasound tomography: A comparison with film and digital mammography", (Year: 2013).*
Dietmar Hiller et al., "Ultrasound Computerized Tomography using Transmission and Reflection mode: Application to Medical Diagnosis", "Acoustical Imaging textbook", pp. 553-563, 1982 (Year: 1982).*
James F. Greenleaf et al., "Clinical Imaging with Transmissive Ultrasonic Computerized Tomography", IEEE Transactions on Biomedical Engineering, vol. BME-28, Feb. 1981. (Year: 1981).*
Boyd, et al. Evidence that breast tissue stiffness is associated with risk of breast cancer. PloS one, 9(7), p. e.100937. 2014.
Boyd, et al. Mammographic density and the risk and detection of breast cancer. The New England Journal of Medicine 356 (3): 227-236. 2007.
Brentnall, et al. Mammographic density adds accuracy to both the Tyrer-Cuzick and Gail breast cancer risk models in a prospective UK screening cohort. Breast Cancer Research (2015) 17:147.
Gail, et al. Projecting individualized probabilities of developing breast cancer for white females who are being examined annually. J Natl Cancer Inst. Dec. 20, 1989; 81(24): 1879-86.
Kim, WH, et al. The Spatial Relationship of Malignant and Benign Breast Lesions with Respect to the Fat-Gland Interface on Magnetic Resonance Imaging. Nature Sci Rep. Dec. 14, 2016; 6:39085.
Mendelson, et al. Breast Imaging Reporting & Data System (BI-RADS), Fifth Edition. ACR BI-RADS Ultrasound—Reporting, Reston, VA; American College of Radiology. 2013.
PCT/US20/65432 Search Report & Written Opinion dated Mar. 10, 2021.
Peintinger, et al. Accuracy of the Combination of Mammography and Sonography in Predicting Tumor Response in Breast Cancer Patients after Neoadjuvant Chemotherapy. Annals of Surgical Oncology 13, 1443-1449 (2006).
Zhu, et al. Invasive Breast Cancer Preferably and Predominantly Occurs at the Interface between Fibroglandular and Adipose Tissue. Clin Breast Cancer: Feb. 2017; 17(1): e11-e18.
EP20901406.7 Extended European Search Report dated Nov. 6, 2023.
Lupinacci et al. Monitoring breast masses with ultrasound tomography in patients undergoing neoadjuvant chemotherapy. Medical Imaging 2009: Ultrasonic Imaging and Signal Processing, SPIE vol. 7265. 9 pages.
Myc, Lukasz et al. Volumetric breast density evaluation by Ultrasound Tomography and Magnetic Resonance Imaging: A preliminary comparative study. Medical Imaging 2010: Ultrasonic Imaging, Tomography, and Therapy. SPIE vol. 7629. 8 pages.
Sak et al. Comparison of breast density measurements made using ultrasound tomography and mammography. Progress in Biomedical Optics and Imaging, SPIE vol. 9419, 2015. 8 pages.
Sak et al. Relationship between breast sound speed and mammographic percent density. Medical Imaging 2011: Ultrasonic Imaging, Tomography, and Therapy, SPIE vol. 7968, No. 1, pp. 1-7.
Sak et al. Using Speed of Sound Imaging to Characterize Breast Density. Ultrasound in Medicine and Biology. vol. 43, No. 1, pp. 91-103. 2017.
JP Serial No. 2022-537014 Office Action dated Sep. 27, 2024.
PCT/US2020/065432 International Preliminary Report on Patentability dated May 17, 2022.

* cited by examiner

Correlation between Tamoxifen Metabolites and
12-Month Change in Breast Sound Speed (N=60)

| Tamoxifen metabolite (ng/ml) | Premenopausal (n=33) | | Postmenopausal (n=27) | |
| --- | --- | --- | --- | --- |
| | r* | P-value | r* | P-value |
| (Z)-Tamoxifen | -0.34 | 0.05 | -0.02 | 0.91 |
| (Z)-N-Desmethyl-Tamoxifen | -0.42 | 0.01 | -0.005 | 0.98 |
| (Z)-4-OH-Tamoxifen | -0.01 | 0.94 | 0.03 | 0.87 |
| (Z)-Endoxifen | -0.12 | 0.50 | -0.10 | 0.63 |

*Spearman's rank correlation coefficient

FIG. 10

The change in the product of V and VASS (V x VASS) between the two groups, showing a steady decline for the partial responders (orange) and a much steeper decline for the complete responders (blue), particularly within the first few weeks.

Correlation between Tamoxifen Metabolites and 12-Month Change in Breast Sound Speed (N=60)

| Tamoxifen metabolite (ng/ml) | Premenopausal (n=33) r* | P-value | Postmenopausal (n=27) r* | P-value |
|---|---|---|---|---|
| (Z)-Tamoxifen | -0.34 | 0.05 | -0.02 | 0.91 |
| Z)-N-Desmethyl-Tamoxifen | -0.42 | 0.01 | -0.005 | 0.98 |
| Z)-4-OH-Tamoxifen | -0.01 | 0.94 | 0.03 | 0.87 |
| (Z)-Endoxifen | -0.12 | 0.50 | -0.10 | 0.63 |

*Spearman's rank correlation coefficient

FIG. 20

METHODS AND SYSTEMS FOR CANCER RISK ASSESSMENT USING TISSUE SOUND SPEED AND STIFFNESS

CROSS-REFERENCE

This application is a continuation of PCT/US2020/065432, filed Dec. 16, 2020, which claims priority to U.S. Provisional Patent Applications Nos.: 62/948,993, filed Dec. 17, 2019, 62/949,004, filed Dec. 17, 2019, and 62/952,000, filed Dec. 20, 2019, the full contents of which are incorporated herein by reference.

BACKGROUND

The present disclosure relates to medical systems, devices, and methods, particularly for diagnosing and monitoring tissue, such as breast tissue, including for cancer risk, detection and monitoring post-treatment.

Physicians have used palpation for hundreds of years to define pathologic changes that may cause differences in tissue stiffness, particularly for breast cancer detection. However, clinical breast examination has well-known drawbacks, including a limited sensitivity of 54% for breast cancer detection. Stiffness has also been locally assessed by ultrasound (US) in numerous tissues to help characterize differences in benign and malignant masses, but generally related to elastic properties in a single dimension. These elastic properties of unidimensional stress relate to tissue strain in the axial and perpendicular US planes, thereby approximating the elastic (i.e., Young's) and shear moduli of the target tissue, respectively. However, soft tissues do not have a simple mechanical nature, making it difficult to characterize their elastic behavior with a single parameter.

Locally advanced breast cancer represents a difficult clinical problem. Many patients with locally advanced disease experience relapse and eventual death from the disease. Data from the National Cancer Institute's Surveillance, Epidemiology, and End Results (SEER) program indicate that approximately 14,000 women a year are diagnosed with locally advanced breast cancer. The 5-year relative survival rate for women with stage III breast cancer is about 55%.

Neoadjuvant chemotherapy (NAC) increases the ability to control locally advanced breast carcinomas and promotes breast-conserving surgery (BCS). It has become the standard of care for patients who have locally advanced and inflammatory breast cancer or who wish to pursue a BCS in the US. About 60-90% of patients achieve a clinical response to therapy; approximately 10-40% of patients are non-responders, and about 10-40% of patients achieve pathologic complete response.

Because not all patients respond to chemotherapy and, if they do, their responses are highly variable, there has not been a universal, cost-effective adoption of any clinical technology or technique that helps accurately assess, monitor, and predict individual patient response to NAC.

Ultrasound tomography (UST) provides various advantages over mammography and magnetic resonance imaging for the detection of breast cancers. For example, ultrasound tomography may provide an inexpensive and safe alternative to both methods, which does not employ ionizing radiation. Ultrasound tomography methods and systems should ideally detect breast cancer and/or a risk of contracting breast cancer at least as well as competing methods.

SUMMARY

The present disclosure relates to improved systems, devices, and methods for characterizing and/or diagnosing tissue, such as breast tissue, particularly for risk assessment, cancer detection, and/or monitoring during and/or after a treatment protocol.

Systems and method of the present disclosure provide assessments of breast sound speed as a risk factor for breast cancer. Sound speed may be a surrogate measure of breast density (BD) and, by inference, a potential risk factor for breast cancer. Systems and methods of the present disclosure demonstrate a direct association between sound speed and breast cancer risk.

Systems and methods of the present disclosure employ volume averaged sound speed (VASS), which may have a stronger dependence on breast cancer (BC) risk than mammographic density (MD) and therefore has the potential to increase precision in standard risk models (e.g. Gail or Tyrer-Cuzick). Beyond VASS alone, risk may also be further categorized by the stiffness components of the initial density, or fibroglandular, components of VASS. Potential benefits provided the present disclosure include, without limitation: identifying women at (i) extremely high risk, who are potential candidates for risk-reducing treatment or preventive therapy, (ii) moderately enhanced risk who might benefit from enhanced screening, and (iii) sufficiently low risk to warrant less frequent screening. Furthermore, the present disclosure provides risk stratification which may be expanded to younger women where UST assessments would enable risk-based screening without radiation concerns. The present disclosure provides methods that are radiation-free, which would be applicable and relevant to understanding breast density and detection patterns in younger women. Therefore, UST methods may have a wider range of application than mammography, especially in the area of longitudinal early-age risk stratification and long-term monitoring.

There is also a need for a clinically practical, whole breast assessment of tissue stiffness that approximates multi-parametric mechanical tissue properties, particularly for normal dense breast parenchyma. Moreover, the greater cancer risk in women with dense breasts is compounded by the greater difficulty in detecting similarly dense, suspicious masses by mammography.

Identifying less responsive or non-responsive patients earlier, following treatment interventions, would allow a timely switch to a different regimen and/or would advance surgery. Patients in these categories would benefit by stabilizing and/or potentially reversing their disease, thereby reducing morbidity and mortality rates.

The ability to identify non-responders early in the treatment process would provide potentially crucial guidance for changing to alternative regimens thereby minimizing patient suffering from unnecessary NAC side-effects and preventing further tumor progression. Furthermore, predicting pathologic complete response (pCR) would be highly beneficial for breast cancer drug development given the FDA's acceptance of pCR as an endpoint to support accelerated approval. In the absence of a practical method for monitoring response, significant improvements in image-assisted chemotherapy are unlikely.

According to aspects of the present disclosure, measurements of tumor size changes, tumor softening, and density can be measured and quantified accurately with ultrasound tomography (UST). UST may provide improve metrics over standard imaging and manual palpation.

Disclosed herein is a method of analyzing an image of a volume of tissue of a breast, comprising: receiving at least one ultrasound tomography image of the volume at a computing system; determining a volume averaged sound speed within the volume using the computing system; and determining a risk of developing breast cancer from the volume averaged sound speed. The volume can comprise at least 30% of a whole volume of the breast. The image of the breast can not comprise a cancerous mass. The image of the breast can comprise a breast of a patient less than 40 years old. The image of the breast can comprise an image of a contralateral breast of a cancer affected breast. The method can further comprise determining a volume (V) of the volume of tissue by a direct pixel count of a plurality 2D images within a stack of 2D images and determining the volume averaged sound speed by summing a sound speed for each pixel within the direct pixel count and dividing by the volume. The method can further comprise incorporating a parameter related to the risk into a risk model. The risk model can comprise a Gail model or a Tyrer-Cuzik model. The method can further comprise determining a percent of high sound speed tissue of the breast from the at least one ultrasound tomography image of the volume. Determining the percent of high sound speed tissue can comprise creating a mask comprising the high sound speed tissue. The mask can be created from a sound reflection image. The mask can be created using a k-means segmentation algorithm. The method can comprise comparing a volume averaged sound speed or a percent of high sound speed tissue to a mammographic percent density. The risk can be calculated without mammographic data. The risk can comprise a score. The score can be a number on a 1-5 scale. The risk of developing breast cancer can be a risk of redeveloping breast cancer. The method can further comprise determining the volume averaged sound speed within the volume over a plurality of instances of time. The plurality of instances of time can comprise at least a portion of a time duration during which a treatment is provided. The time duration can be during a preventative or an adjuvant time period. The treatment can comprise at least one element selected from the group consisting of a chemotherapy treatment, a radiation therapy treatment, a cryotherapy treatment, a radiofrequency ablation treatment, a focused ultrasound treatment, and an electroporation treatment. The treatment can be a preventative treatment. The treatment can comprise use of tamoxifen, raloxifene, other anti-estrogen drugs, dietary and/or lifestyle interventions. The volume can comprise at least 20% non-cancerous tissue. Disclosed herein is a computing system comprising instructions which when executed perform a method as described herein. Disclosed herein is a method of determining a response to a treatment plan, the method comprising: receiving a plurality of images from a volume of breast tissue, wherein the plurality of images comprises ultrasound tomography images, wherein the plurality of images corresponds to a plurality of instances of time; determining a tissue volume, a volume averaged sound speed and stiffness of a region of interest within the volume of breast tissue; generating a combined metric from the volume, the volume averaged sound speed and stiffness over the plurality of instances of time; and characterizing the tissue as one of non-responsive, partially responsive, or completely responsive to a treatment plan based on to the combined metric over the plurality of instances of time. The characterizing can occur prior to and/or within 30 days of a start of a treatment plan. The characterizing can occur prior to and/or within 14 days of a start of a treatment plan. The treatment plan can comprise neoadjuvant chemotherapy. The plurality of instance of time are during a preventative or an adjuvant time period. The treatment plan can comprise at least one element selected from the group consisting of a chemotherapy treatment, a radiation therapy treatment, a cryotherapy treatment, a radiofrequency ablation treatment, a focused ultrasound treatment and an electroporation treatment. The treatment plan can be a preventative treatment. The treatment plan can comprise use of tamoxifen, raloxifene, other anti-estrogen drugs, dietary and/or lifestyle interventions low. Disclosed herein is a computing system comprising instructions which when executed perform a method as described herein.

Disclosed herein is a method of analyzing an image of a volume of tissue of a breast, the method comprising: receiving at least one ultrasound tomography image of the volume at a computing system; generating a stiffness map from the at least one ultrasound tomography image; and quantifying relative stiffness percentages of a first type of tissue and a second type of tissue using the computing system. The method can further comprise applying an image partitioning process to generate tissue groups by the first type of tissue and the second type of tissue, stiffness, or both. The image partitioning process to generate tissue groups by the first type of tissue and the second type of tissue can comprise using a sound speed image. The first type of tissue can be fibroglandular tissue. The second type of tissue can be fatty tissue. The image partitioning process to generate tissue groups by stiffness can comprise combining sound speed and attenuation data. The quantifying can comprise quantifying the relative stiffness percentages for a region of interest within the volume of tissue. The quantifying can comprise quantifying the relative stiffness percentages for at least 30% of the volume of tissue. The method can further comprise removing the spatial filter and comparing a filtered image to an un-filtered image. The comparing of the filtered image to the unfiltered image can comprise one or more of addition, subtraction, division, multiplication, averaging, and convolution. The method can further comprise quantifying the relative stiffness percentage of a region of interest within the volume of tissue using the filtered image. The method can further comprise quantifying the relative stiffness percentage for at least 30% of the volume of tissue using the un-filtered image. The method can further comprise quantifying a stiffness distribution by a stiffness index or another parameter for quantifying the stiffness distribution. The identifying can comprise characterizing a mass as at least one of a cyst, a fibroadenoma, a cancer, a benign mass, or an unidentified mass based on the relative stiffness percentages. The method can further comprise analyzing a statistical pattern of stiffness within the volume of tissue. The statistical pattern can comprise at least one of $2^{nd}$-order statistics, $3^{rd}$-order statistics, or radiomics. The analyzing can be performed at least in part with a machine learning system. The analyzing can comprise calculation of a homogeneity index or another parameter for quantifying a stiffness image texture. Quantifying the stiffness image texture can comprise at least one of $2^{nd}$-order statistics, $3^{rd}$-order statistics, or radiomics. The stiffness map can be derived from a sound speed map and a sound attenuation map. Quantifying the relative stiffness percentages for the region of interest can be used to monitor response to adjuvant and neoadjuvant therapy. Quantifying the relative stiffness percentages for at least 30% of the volume of tissue can be used to monitor chemoprevention, dietary intervention, and adjuvant therapy such as Tamoxifen, raloxifene or other hormonal manipulations. The method can further comprise determining a risk of breast cancer based on the relative stiffness percentages. The method can further comprise incorporating a parameter related to the risk into a risk model. The risk model can comprise a Gail model or a Tyrer-Cuzik model. The method can further comprise applying a spatial filter to at least one ultrasound tomography image at the computing system. The stiffness index can comprise BI-RADS categories. The BI-RADS categories can be hard, intermediate, or soft. The method can further comprise quantifying a location of a peritumoral region. The method can further comprises using the location of the peritumoral region to identify the peritumoral region as a cancer or a cyst. The peritumoral region can be identified as a cancer at an interface of fat tissue and fibroglandular tissue. The peritumoral region can be identified as a cyst surrounded by fibroglandular tissue. Disclosed herein is a computing system comprising instructions which when executed perform a method as described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 and FIG. 5 show supplementary data for Table 1 and Table 2 respectively.

FIG. 10 shows a summary of correlation between Tamoxifen Metabolites and 12-month change in volume averaged sound speed associated with the case control study of Example 3.

FIG. 20 shows a summary of correlation between Tamoxifen Metabolites and 12-month change in volume averaged sound speed related to Example 5.

DETAILED DESCRIPTION

Figure 1:
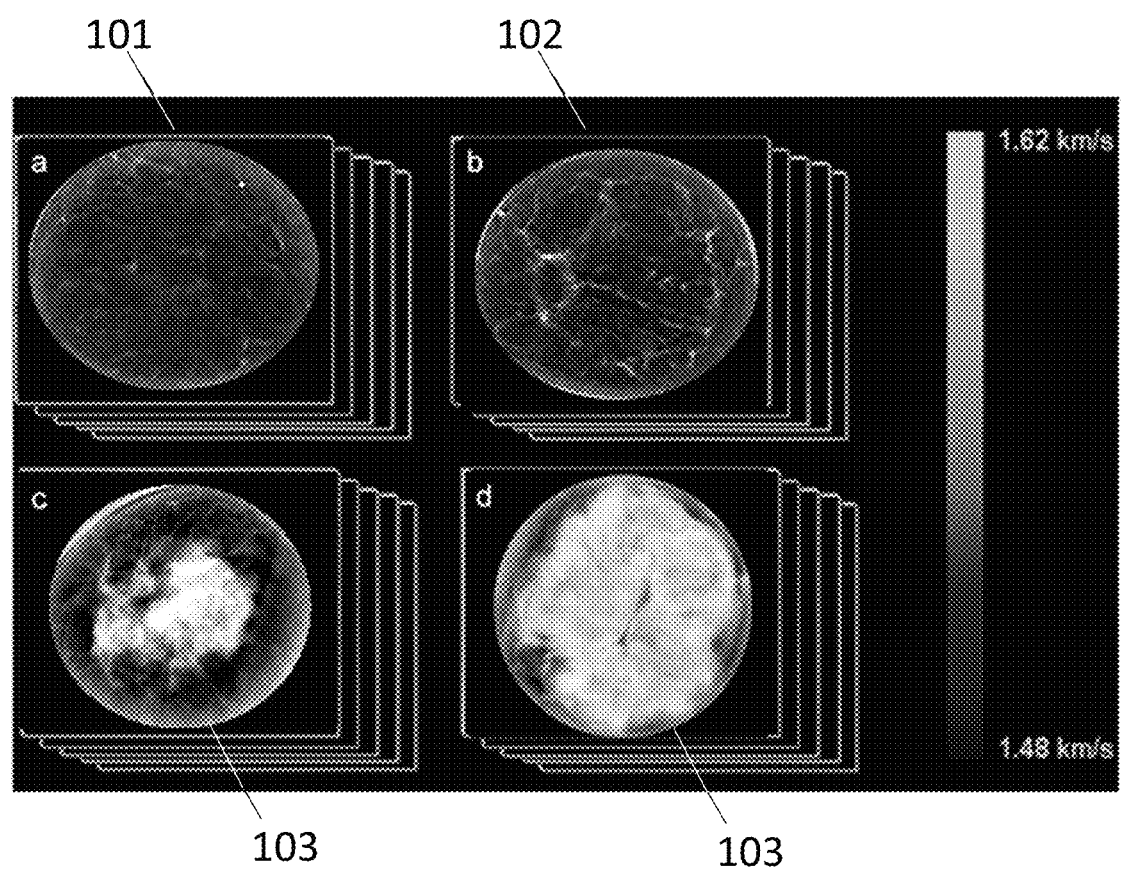
FIG. 1 shows examples stacks of sound speed measurements measured using ultrasound tomography (UST).

Reference will now be made in detail to various embodiments, examples of which are illustrated in the accompanying drawings. In the following detailed description, numerous specific details are set forth in order to provide a thorough understanding of the present disclosure and the described embodiments. However, the embodiments of the present disclosure are optionally practiced without these specific details. In other instances, well-known methods, procedures, components, and circuits have not been described in detail so as not to unnecessarily obscure aspects of the embodiments. In the drawings, like reference numbers designate like or similar steps or components.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is optionally construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" is optionally construed to mean "upon determining" or "in response to determining" or "in accordance with a determination" or "upon detecting" or "in response to detecting" that the stated condition precedent is true, depending on the context.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

As used herein, the terms "subject" and "patient" are used interchangeably. As used herein, the terms "subject" and "subjects" refers to an animal (e.g., birds, reptiles, and mammals), a mammal including a primate (e.g., a monkey, chimpanzee, and a human) and a non-primate (e.g., a camel, donkey, zebra, cow, pig, horse, cat, dog, rat, and mouse). In certain embodiments, the mammal is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or 95 to 100.

As used herein, the term "breast density" refers to the attenuation of x-rays as they penetrate the breast during mammographic imaging, also labeled as mammographic percent density. The higher attenuation denser tissue by mammography has histologic correlates of fibroglandular and/or stromal tissue, whereas the lower density tissues predominantly comprise fat. Therefore, imaging modalities that represent histologic correlates of those dense tissues can still be considered to represent the original use of the term "breast density". In the case of magnetic resonance imaging (MRI) brighter water signal from the fibroglandular and/or stromal tissues represent the denser tissues of mammography, also labeled as the volume and/or percentages of fibroglandular tissue. In the case of ultrasound tomography (UST), the visualization of these fibroglandular and/or stromal tissues are represented by higher measurements of the speed and/or attenuation of sound waves, also labeled as the volume and/or percentages of fibroglandular tissue.

Cancer Risk Assessment Using Volume Averaged Sound Speed

Clinical breast cancer risk assessment is based on models that include established breast cancer risk factors such as family history, reproductive and life cycle factors, and past radiologic findings. The Gail model and the Tyrer-Cuzick model are examples of two tools which may be used in combination with systems and methods of the present disclosure. See, for example, Gail M H, et al. (1989) Projecting individualized probabilities of developing breast cancer for white females who are being examined annually. Journal of the National Cancer Institute 81 (24): 1879-1886 and Brentnall, A. R., et. al, (December 2015), Mammographic density adds accuracy to both the Tyrer-Cuzick and Gail breast cancer risk models in a prospective UK screening cohort. Breast Cancer Research 17 (1), 147+, each of which is incorporated by reference herein in its entirety. While such models may provide accurate estimates of lifetime risk at the population level, individualized risk prediction is poor in at least some instances. An example measure of discriminatory power is the concordance (c)-statistic, which represents the area under the receiver operating characteristics curve. C-statistics for most breast cancer risk models average around 0.6, indicating that the risk prediction model is accurate only 60% of the time. Thus, there is interest in adding new risk factors to the current models, in the hope of improving their discriminatory accuracy.

Adding mammographic density (MD) to the Gail model may improve breast cancer risk prediction, and efforts to incorporate mammographic density in newer risk models are ongoing; however, the increase in the C-statistic has been modest, ranging from 0.01 to 0.06.

Current methods of BD measurement using mammography (including tomosynthesis) may be based on one or more 2-dimensional projected areas of the breast rather than the full uncompressed volumes of the breast. Attempts to measure volumetric breast density (BD) in mammograms have not improved risk assessment compared to the measurement of projected area. The difficulty of trying to recover volume information from the thickness of a compressed breast may limit the impact of mammographic percentage density (MPD) on the risk models.

Furthermore, elevated mammographic density may produce its strongest effect among young women who are below the mammographic screening age, but who might benefit from preventive interventions. Evaluating density without exposing young women to ionizing radiation may be beneficial because of concerns that mammography induces a small but significant number of cancers. However, currently no such approaches have been implemented in clinical practice. This is unfortunate, as increased density may be higher on average in young women, and risk prediction is especially important at early ages when prevention efforts may be most influential.

Magnetic resonance imaging (MRI) measures an analog of breast density, which is more a mammographic term (i.e., MPD), whereby the tissue can be segmented into 2 groups representing comparable categories of percentage fibroglandular tissue and fat, similar to density. While magnetic resonance imaging (MRI) is potentially superior to mammography for measuring BD, and for use with younger women, it has not been adopted widely because (i) it is not used routinely for screening, meaning that a BD assessment would require a separate exam, (ii) MRI continues to be expensive and therefore inaccessible to a lot of centers, and (iii) the exam times are long compared to mammography. An alternative approach that combines the benefits of radiation free, volumetric imaging with low cost and short exam times would be highly desirable. However, MR may be more accurate than mammographic percent density due to its 3D volumetric representations.

Disclosed herein in some aspects is an analog to BD based on speed of sound measurements of breast tissue derived from ultrasound tomography (UST), similar to MRI in representing categories of volumetric percentage fibroglandular tissue and fat. UST methods may use true volume measurements and unlike mammography, the measure is quantitative and non-ionizing.

FIG. 1 shows examples stacks of sound speed measurements measured using ultrasound tomography (UST). FIG. 1 shows images across the 4 Breast Imaging Reporting and Database System Score (BIRADS) breast density categories: (a) The breasts are almost entirely fatty 101; (b) There are scattered areas of fibroglandular density 102; (c) The breasts or heterogeneously dense, which may obscure small masses 103; (d) the breasts are extremely dense 104, which lowers the sensitivity of mammography. This wording is more functionally related to the associated process of breast cancer screening using mammography than a prior BI-RADS version which arbitrarily estimated breast density percentages of: (a) <25%; (b) 25-50%; (c) 50-75%, and; (d) 75-100%. UST technology also affords the opportunity to study breast density (BD) and breast cancer (BC) risk in younger women. As noted above, this is an understudied area because measures of BD using mammography expose young women to unacceptable lifetime levels of radiation. In the USA, 70 million women between the ages of 18 and 40, fall into this category.

Additionally, current methods of measuring BD based on mammography, either by radiologist's estimation or computer-assisted measurement, may limit the risk stratification achievable by inclusion of BD in risk models. At least one goal of this study was to assess VASS as a potential new UST-based risk factor for breast cancer. Having dense breasts (i.e., larger percentages of fibroglandular and/or stromal tissue) is very common, with patients having been mammographically categorized as heterogeneously or extremely dense breasts comprising up to 45% of the female screening population (e.g., 40-80 years old); thus, even small improvements in the accuracy of risk assessment may translate into a significant impact on the utility of sound speed for risk stratification at the population level.

Systems and method of the present disclosure provide assessments of breast sound speed as a risk factor for breast cancer. Sound speed may be a surrogate measure of breast density (BD) and, by inference, a potential risk factor for breast cancer. Systems and methods of the present disclosure demonstrate a direct association between sound speed and breast cancer risk.

Systems and methods of the present disclosure employ volume averaged sound speed (VASS), which may have a stronger dependence on breast cancer (BC) risk than mammographic density (MD) and therefore has the potential to increase precision in standard risk models (e.g. Gail or Tyrer-Cuzick). Potential benefits provided the present disclosure include, without limitation: identifying women at (i) extremely high risk, who are potential candidates for risk-reducing treatment or preventive therapy, (ii) moderately enhanced risk who might benefit from enhanced screening, and (iii) sufficiently low risk to warrant less frequent screening. Furthermore, the present disclosure provides risk stratification which may be expanded to younger women where UST assessments would enable risk-based screening without radiation concerns. The present disclosure provides methods that are radiation-free, which would be applicable and relevant to understanding breast density and detection patterns in younger women. Therefore, UST methods may have a wider range of application than mammography, especially in the area of longitudinal early-age risk stratification and long-term monitoring.

Comparison of Ultrasound Tomography Data and Mammography

Figure 2:
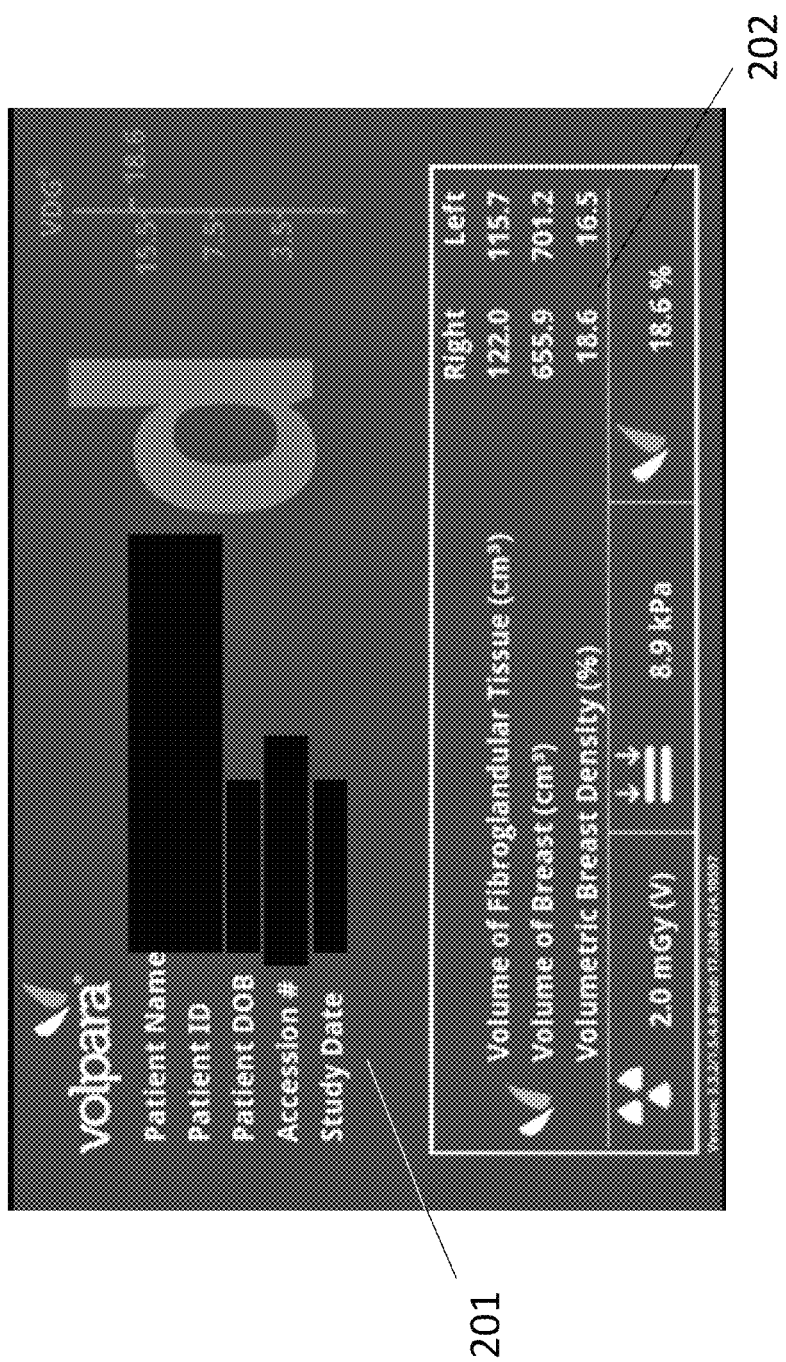
FIG. 2 shows an example of a mammogram along with an output after a Volpara reading.

FIG. 2 shows an example of a mammogram, 201, along with an output after a Volpara reading, 202. As shown the Volpara reading outputs some breast density information. Increased mammographic breast density (BD) may increase the risk of developing breast cancer. Disclosed herein in some aspects is a direct comparison of ultrasound tomography (UST) vs an established 3D method for density determination on mammography (Volpara) to assess the viability of sound speed as an imaging biomarker of BD.

Since UST is non-ionizing, BD could be studied in a broader population of women, including those below screening age. UST provides quantitative information obtained without compression and radiation that has the potential to provide more accurate BD information, leading to better stratification of breast cancer risk. Volumetric stiffness measurements may further stratify this risk, particularly for the denser fibroglandular/stromal tissues.

Increased breast density on mammography may reduce the sensitivity of breast cancer detection, such that in women with dense breast tissue up to 35% of breasts cancer are not detected. In addition, increased breast density is a strong independent risk factor for developing breast cancer with women who have extremely dense breasts having up to a 6-fold increased risk of developing breast cancer. Awareness of the clinical implications of breast density is increasing, including significant legislative impact regarding dense breast tissue. Thirty-six states and Washington DC have legislation that requires radiologists to inform women, in writing, about their individual breast tissue density and many include the need to discuss additional adjunct screening to detect mammographically occult cancer. As a result of these efforts there is now a federal bill under review to mandate dense breast notification nationally and the FDA has proposed new regulations that all women undergoing mammography will be informed of their density as well as the ability of adjunct screening to detect mammographically occult breast cancer. The scientific evidence, the growing social awareness and the required reporting are driving an urgent need to provide women with accurate, actionable breast density (BD) information.

Currently, computer-assisted methods of measurement (e.g. Cumulus, Libra, SXA, Quanta, iCAD, Volpara) based on interactive thresholding are the most accurate for mammography-based estimates of BD. Clinical risk assessment facilitates preventive strategies and improves clinical decision making. To date, breast cancer risk assessment is based on models that include established breast cancer risk factors such as family history, reproductive and life cycle factors, and past radiological and pathologic findings. The most widely used current methods of evaluating risk of breast cancer are the Gail model and the Tyrer-Cuzick model. BD is a biomarker associated with breast cancer risk. Indeed, the addition of BD to the Gail and Tyrer-Cuzick models increases the concordance statistic. Unlike most other risk factors for breast cancer, BD can be changed, suggesting that it may be a target for preventive interventions.

However, despite the advocacy efforts and the fact that BD is more strongly associated with breast cancer risk than the other variables in the risk models, BD is not routinely used in clinical settings for risk prediction. One potential reason is that BD is a population-based risk factor and the BD measurement is insufficiently accurate to stratify individual risk, especially when only using radiologists' qualitative quartile estimates. Limitation of the standard BD measurement may be significant (as discussed below). Improved accuracy in the measurement of BD is also likely to strengthen etiological associations, with genetic variants and blood levels of hormones, improve the accuracy of measurements of change in BD, and allow risk assessment using BD at ages before routine screening mammography is started.

Limitations of Current Methods of Measuring Breast Density

The radiographic appearance of the breast on mammography varies among women, and reflects variations in breast tissue composition, and the different X-ray attenuation characteristics of these tissues. Variations in BD on mammography reflect variations in the amounts of collagen and number of cells, both epithelial and non-epithelial, in the breast. Image processing is maximized to aid in the detection of breast cancer, which is the primary goal of mammography. The processing is spatially variant, meaning that the process is not uniform across the image. Furthermore, each manufacturer performs proprietary processing. Differences among manufacturers in the production of processed images, and the expected future evolution of the technology to further improve cancer detection, means that mammography is likely to remain a "moving target" for the measurement of BD.

Since mammography compresses the breast tissue, many of the past methods of measurement were based on the 2-dimensional projected area of the breast rather than the 3-dimensional volumes of the tissues. Software such as Volpara and Quanta were introduced as a way to estimate 3D density from mammograms by considering the thickness of the compressed breast and by using raw data to overcome the "moving target" effect noted above. Mammography combined with Volpara represents a gold standard for BD measurements today. However, while these methods are more user friendly by virtue of their operator independence and automated calculations, they do not improve risk estimation relative to previous 2D methods.

Alternative forms of X-ray imaging such as dual-energy X-ray absorption (DEXA), and single X-ray absorptiometry (SXA), have failed to impact available information on risk assessment. These methods use low dose radiation, but a radiation-free method is the goal as minimization of exposure to ionizing radiation is of use. A radiation-free method based on an actual volume measurement of an uncompressed breast is needed to improve accurate BD assessment.

Magnetic resonance imaging (MRI) has the advantage of imaging the whole volume of the uncompressed breast without ionizing radiation. While MRI is potentially superior to mammography for measuring BD, it has not been adopted widely because (i) it is not used routinely for screening; (ii) the high cost of MRI mast it inaccessible to many women and world-wide to many centers; and (iii) as compared to mammography the exam times are long, require the injection of intravenous contrast, and cannot be performed in women with implanted devices or whose body habitus makes MRI not feasible. Up to 20% of women may not or are not likely to have MRI examinations. An alternative approach that combines the benefits of radiation free, non-invasive volumetric imaging with low cost, short exam times that can be performed on virtually all women would be highly desirable.

Ultrasound Tomography (UST) as a Method of Measuring Breast Density.

Conventional whole breast ultrasound is radiation free and low cost compared to MRI. However, the breast is distorted during the exam and the ability to separate dense tissue from fat may be limited. We have proposed a new ultrasound method that uses transmission imaging. It is based on the principles of UST and measures the sound speed properties of breast tissue. This method uses true volume measurements and unlike mammography, the density measurement is quantitative. In this study, breast imaging data from UST and Volpara data from mammography, were used to compare the volumetric sound speed properties of the breast with volumetric MPD.

In contrast to MRI and X-ray methods, UST measures the biomechanical properties of tissue such as density and compressibility. The primary method by which to assess breast density with ultrasound tomography is through the measurement of Sound Speed. The average speed of sound (s) through human tissue is related to tissue density and elasticity as: s is proportional to $(c/\rho)^{1/2}$ where (c) is the elastic constant and ($\rho$) the material density of the tissue through which sound waves travel. In human breast tissue, the elastic constant scales as c is proportion to $\rho^3$. Substitution into the above equation for sound speed allows us to factor out the dependence on elasticity, thereby not only eliminating it as a confounding factor but also establishing a linear relationship between sound speed and tissue density (s is proportional to $\rho$).

The present disclosure may advance this field of study on at least 3 fronts: providing a direct volumetric comparison of UST and mammography; comparison of the percentage of high sound speed tissue (PHSST) of the breast with volumetric MPD utilizing Volpara; and use of a new algorithm that yields higher resolution sound speed images. We compared VASS with volumetric MPD utilizing Volpara. Volpara is an automated mammographic density measurement software tool that measures BD volumetrically and therefore provides a better external standard to compare with UST's volumetric sound speed measurements. It was chosen because it was the only volumetric measurement method available at our institution at the time the study was carried out. Volumetric PHSST was compared with Volpara for the first time, allowing one percentage measurement to be compared with another. This advance may allow more accurate estimation of the breast sound speed distribution compared to our previous work.

Since increased BD may increase the risk of developing breast cancer, sound speed images can potentially offer new insight into measurements of breast tissue without the use of ionizing radiation. At least one purpose of the study was to quantify the correlation between UST and Volpara measured MPD to (i) assess the viability of VASS and PHSST as independent measures of BD, (ii) to determine whether VASS and PHSST correlate better with 3D MPD vs 2D MPD measurements and (iii) discuss VASS and PHSST as possible supplement or alternative to MPD.

Risk prediction, and the associated activities of clinical decision-making, and breast cancer prevention, are likely to be improved by elimination of sources of error and variation in measurement by mammography. As described, UST has various non-limiting advantages including, being an objective measure of BD, that is relatively immune to variations in image acquisition and processing, does not involve breast compression or require knowledge of breast thickness, and measurements are referred to a fixed physical measure—the speed of sound. Improved accuracy in the measurement of BD is also likely to strengthen etiological associations, with genetic variants and blood levels of hormones, improve the accuracy of measurements of change in BD, and allow risk assessment using BD at ages before routine screening mammography is started. UST provides quantitative information obtained without compression and radiation that has the potential to provide more accurate BD information, leading to better stratification of breast cancer risk. Volumetric stiffness measurements may further stratify this risk, particularly for the denser fibroglandular/stromal tissues.

UST technology affords the opportunity to study BD patterns in younger women. This is an understudied area because measures of BD using mammography exposes young women to unacceptable lifetime levels of radiation. In the USA, 100 million women between the ages of 18 and 40, fall into this category. However, the hormonal changes that potentially lay the groundwork for the development of cancer, occur at this age. Having a technology that could track changes in breast density could be highly beneficial to prediction of disease development later in life.

Figure 8:
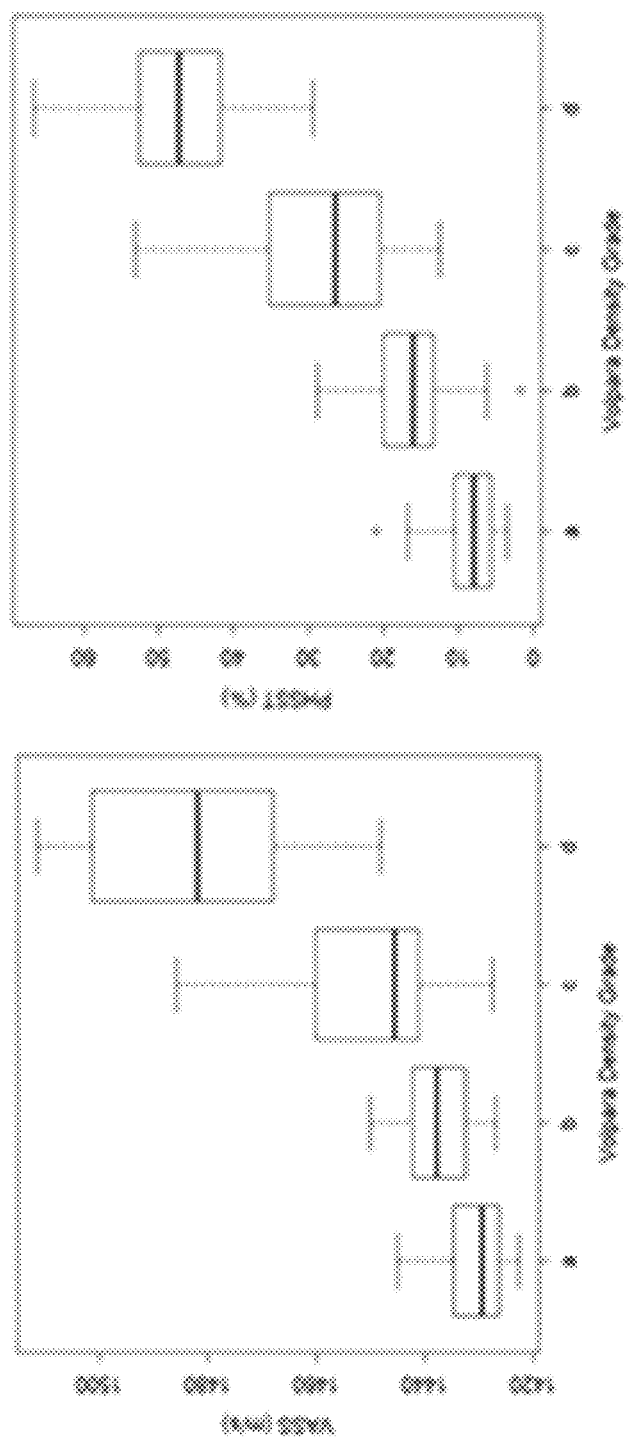
FIG. 8 shows boxplots of VASS (left) and PHSST (right) as grouped by the Volpara density graded.

Furthermore, since breast density is inversely related to age, these younger women would benefit from having their breast density assessed with UST. These younger women are more likely to have high breast density and as FIG. 8 shows, there is a wide range of possible VASS values for women with "dense" breasts (categories c or d). UST can therefore detect changes in breast density even at these higher densities that would likely go unnoticed in mammography.

Monitoring Response to Neoadjuvant Chemotherapy (NAC)

Imaging data to support clinical decision-making is also limited and not routinely used in a standardized manner. Although handheld ultrasound (HHUS) is often used to monitor tumor size, this approach does not measure intrinsic tumor properties and is therefore not a sensitive measure of response in the early stages of treatment. For example, the in-vivo tumor measurements from 162 breast cancer patients were compared with the pathologic residual tumor size after surgery and the best concordance of 67% (benchmark) was observed when standard mammography was combined with breast sonography, as described in Peintinger F, Kuerer H M, Anderson K, et al.

"Accuracy of Combination of Mammography and Sonography in Predicting Tumor Response in BC Pts After Neoadjuvant Chemotherapy," Ann Surg. Oncol 2006 November; 13:1443-9. Epub 2006 Sep. 21. However, accurate early evaluation of a tumor's response to therapy is needed to minimize side effects and optimize treatment and plan for surgery.

MRI and PET imaging have been shown to predict response as early as two weeks after treatment begins. Magnetic Resonance Imaging (MRI) has been used to help quantify the clinical response of breast cancer to NAC. Both diffusion weighted imaging (DWI) and dynamic contrast enhanced (DCE) MRI are very useful in evaluating early response to NAC. Similarly, positron emission tomography (PET) has helped quantify clinical response. PET imaging has shown great promise in predicting early response to chemotherapy and may have direct correlates to the higher tumor blood flow seen by MRI. Both imaging markers have allowed correlation with the surgical pathology findings to assess concordance and enhance the potential for pre-operative planning. Unfortunately, the high costs of imaging associated with both MRI and PET have impeded research needed to verify outcomes and widespread acceptance of these imaging modalities. Furthermore, radiation and comfort concerns, cost, logistical challenges to patient positioning, operator dependence (reproducibility of scans), long exam times, difficulties in longitudinal image reproducibility/registration and patient discomfort have also impeded the adoption of these imaging modalities.

Aspects of the present disclosure provide non-invasive, rapid identification of partial vs complete responders in women undergoing NAC. Methods may be performed without the use of either a radiotracer or gadolinium. Clinical decision making may improve by transitioning non-responders to alternative treatment quickly and by demonstrating effective response to NAC.

Decreased mammographic breast density in response to tamoxifen predicts a favorable response in the preventive or adjuvant settings. Assessment of serial changes in breast density requires precision and ideally a non-ionizing imaging modality. Currently there is no quick way to predict who respond to tamoxifen, let alone the multiple emerging hormonal therapies, such as raloxifene. Change in breast density may be a valuable biosensor of tamoxifen and/or hormonal therapies. Change in breast density may be a valuable biosensor of tamoxifen and/or treatment protocol adherence and early therapeutic response.

Whole Breast Stiffness Characterization

Systems and methods of the present disclosure may also aid in assessing the potential role of whole breast stiffness by ultrasound tomography (UST) in relation to dense parenchymal pattern distribution in benign and malignant masses. Systems and methods of the present disclosure improve display of UST compressibility imaging. Various image modalities have been assessed for improvement in display of diagnostic information. For patients with known benign and malignant masses, both quantitative and qualitative volumetric assessments of relative breast stiffness and parenchymal distribution are assessed herein. Improved imaging modalities may help guide training and future UST applications for dense breast screening and/or mass characterization. Systems and methods provided herein may provide additional stiffness volume parameters for computer-aided detection and/or diagnosis.

Ultrasound tomography (UST) as used herein provides whole breast and focal mass evaluation with a ring array, combining circumferential reflection with quantitative transmission properties of sound speed (SS) and attenuation (ATT). UST work demonstrated excellent correlation of mammographic breast density with SS, including marked improvements in SS resolution, as well as even better correlation with MR parenchymal distribution. Compressibility imaging using Stiffness Fusion images were originally defined as thresholded SS and ATT images overlaid upon their corresponding reflection image. To account for the relative lack of attenuation within cysts, Compressibility Imaging (or stiffness) has recently been defined as the product of SS and ATT, along with associated filtering options. Current compressibility imaging evaluation by UST raises the possibility for determining the spectrum of soft to stiff components within high SS parenchyma throughout the breast. Understanding the relative distribution of stiff parenchyma throughout the breast could potentially improve the conspicuity of suspicious stiff regions from the high SS dense parenchyma during screening. The whole breast assessment of relative stiffness by UST could also extend to underlying breast masses for improved differentiation, similar to current focal breast US elastography. Both whole breast and mass evaluation by UST may be improved by understanding of the relative percentages and distributions of stiffness.

Whole breast stiffness appears to be an independent breast cancer risk factor, separate from breast density. However, it has not been mapped locally, nor delineated the stiffer components of dense parenchyma. Greater interest in dense breast screening has been tempered by the operator dependent nature of standard handheld US, and/or the limited access and expense of breast magnetic resonance (MR) imaging. Whole breast stiffness cannot be adequately performed by standard US using localized elastography and has only been reported on a limited basis for breast MR. Breast MR elastography (MRE) has also been time-consuming and/or labor-intensive compared to standard breast MR, while only performed at a few research sites. Patients with dense breasts have higher breast stiffness by MRE than patients with lower density categories, but the relative stiffness of dense breast parenchyma has not been assessed on a per patient basis.

The multidimensional stress of palpation may be more similar to the 3D strain parameter of bulk modulus. Tissue properties expressed by the bulk modulus thus describe material resistance to uniform compression and associated volume changes. The bulk modulus also has a larger dynamic range than either Young's or shear modulus, allowing greater likelihood of tissue differentiation. In addition, metastatic potential of breast cancer in animal models has shown a strong inverse correlation with bulk tumor stiffness, which likely relates to the surrounding tissue reaction of the extracellular matrix and greater collagen in stiffer tumors. Moreover, multi-parametric use of sound speed, attenuation and backscatter coefficient produced better separation of hepatic fibrosis in vitro but has not reached clinical application.

Figure 27:
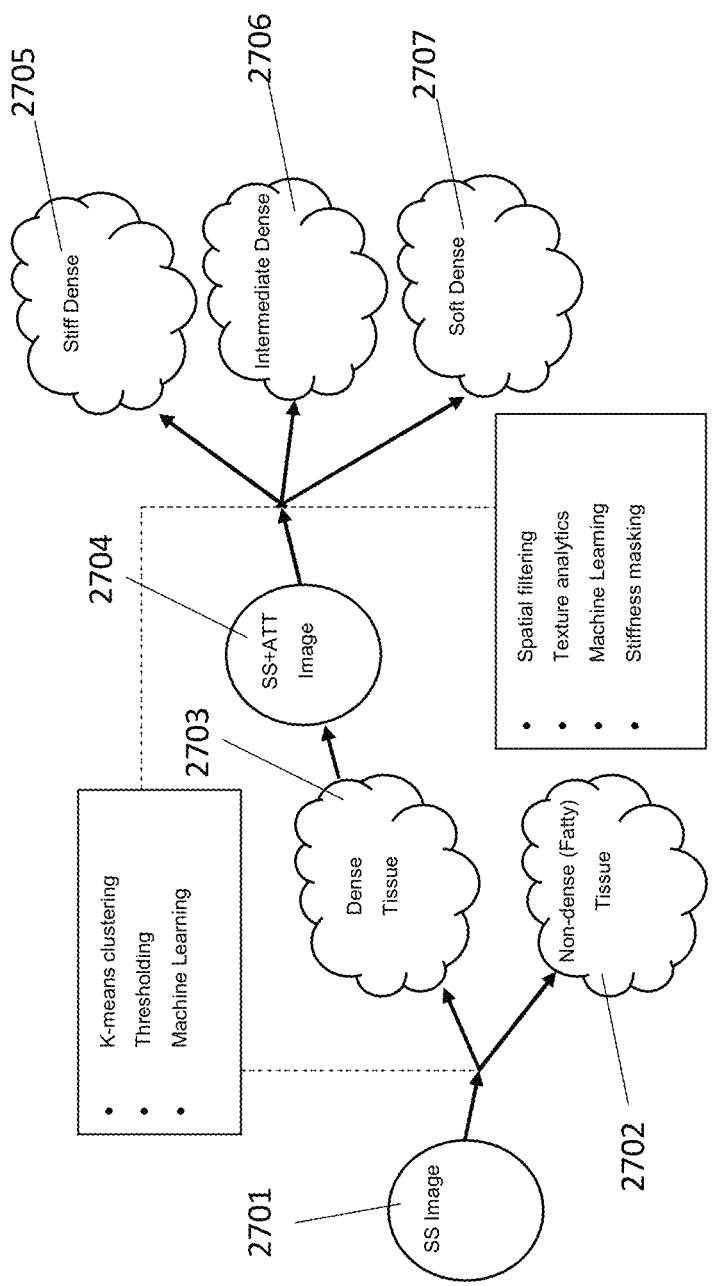
FIG. 27 shows a stiffness image process for both whole breast imaging and mass evaluation

FIG. 27 shows a stiffness image process for both whole breast imaging and mass evaluation. In step 2701, sound speed (SS) images may be used to separate denser breast tissues, 2703, (i.e., parenchyma and masses) from fat, 2702, using image separation/partitioning processes such as K-means clustering, thresholding and/or machine learning. In step 2704, sound speed (SS) and attenuation (ATT) images are combined to generate stiffness images, which can then be similarly partitioned into arbitrarily 3 groups of stiff (2705), intermediate (2706) and/or soft dense tissue (2707) (this also applies to fatty tissues, but not shown), similar to the fifth edition of BI-RADS (Mendelson, EB, Bohm-Velez M, Berg W A, et al., ACR BI-RADS Ultrasound, Reston, VA; American College of Radiology, 2013). These stiffness images can then undergo further imaging analytics to potentially enhance visualization of some masses (e.g., spatial filtering), describe stiffness patterns (e.g., texture analytics, 2nd/3rd order statistics or radiomics), machine learning and/or employing a mask to selectively identify more grouped regions of stiffness >5 mm (i.e., representing potential mass for evaluation).

Characterizing tissue may be performed by two processes that separate tissues into dense (i.e., parenchyma/stroma and all common breast masses) and non-dense tissue (i.e., fat), then apply the sound speed and attenuation images to produce stiffness images (SS+ATT).

In some examples, a whole breast stiffness, or compressibility, map may be generated, which can also be looked at on a smaller regional level once a mass is identified. In some examples, the methods and systems herein may visualize areas to initially detect a mass, as well as characterize it once it is found. Disclosed herein are a series of postprocessing analytics that may assist a radiologist with improved sensitivity (i.e., finding a potentially suspicious mass), while limiting regions of false positive and therefore improving specificity (i.e., characterizing a mass).

Processors

In some embodiments, the platforms, systems, media, and methods described herein include a digital processing device, or equivalent, a processor. In further embodiments, the processor includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the processor includes an operating system configured to perform executable instructions. The operating system is, for example, software, including programs and data, which manages the device's hardware and provides services for execution of applications. Those of skill in the art will recognize that suitable server operating systems include, by way of non-limiting examples, Free-BSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®.

Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the processor includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the processor is not powered. In further embodiments, the non-volatile memory comprises flash memory. In some embodiments, the non volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the processor includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the processor, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein. In some embodiments, the processor includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 28:
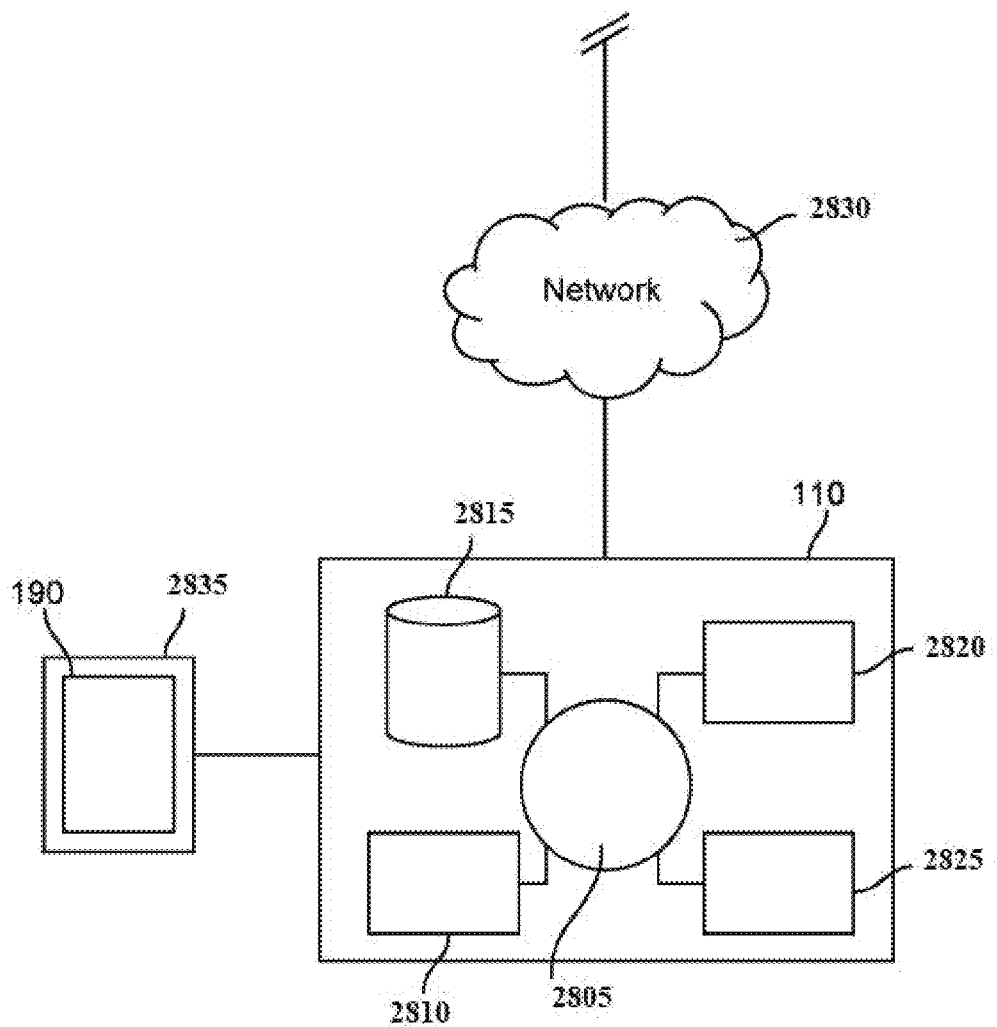
FIG. 28 shows an example of a computer system configured to execute the methods described herein.

Referring to FIG. 28, in a particular embodiment, an example processor 110 is programmed or otherwise configured to allow generation of ROIs, feature extraction, feature selection, classifier model generation or fitting, evaluation of model accuracy, online use of model, etc. The processor 110 can regulate various aspects of the present disclosure, such as, for example, feature selection, ROI generation, feature extraction, etc. In this embodiment, the processor 110 includes a central processing unit (CPU, also "processor" and "computer processor" herein) 2805, which can be a single core or multi core processor, or a plurality of processors for parallel processing. The processor 110 also includes memory or memory location 2810 (e.g., random-access memory, read-only memory, flash memory), electronic storage unit 2815 (e.g., hard disk), communication interface 2820 (e.g., network adapter, network interface) for communicating with one or more other systems, and peripheral devices, such as cache, other memory, data storage and/or electronic display adapters. The peripheral devices can include storage device(s) or storage medium which communicate with the rest of the device via a storage interface. The memory 2810, storage unit 2815, interface 2820 and peripheral devices are in communication with the CPU 2805 through a communication bus 2825, such as a motherboard. The storage unit 2815 can be a data storage unit (or data repository) for storing data. The processor 110 can be operatively coupled to a computer network ("network") 2830 with the aid of the communication interface 2820. The network 2830 can be the Internet, an internet and/or extranet, or an intranet and/or extranet that is in communication with the Internet. The network 2830 in some cases is a telecommunication and/or data network. The network 2830 can include one or more computer servers, which can enable distributed computing, such as cloud computing. The network 2830, in some cases with the aid of the device 110, can implement a peer-to-peer network, which may enable devices coupled to the device 110 to behave as a client or a server.

Continuing to refer to FIG. 28, the processor 110 includes input device(s) to receive information from a user, the input device(s) in communication with other elements of the device via an input interface. The processor 110 can include output device(s) that communicates to other elements of the device via an output interface.

Continuing to refer to FIG. 28, the memory 2810 may include various components (e.g., machine readable media) including, but not limited to, a random access memory component (e.g., RAM) (e.g., a static RAM "SRAM", a dynamic RAM "DRAM, etc.), or a read-only component (e.g., ROM). The memory 110 can also include a basic input/output system (BIOS), including basic routines that help to transfer information between elements within the processor, such as during device start-up, may be stored in the memory 2810.

Continuing to refer to FIG. 28, the CPU 2805 can execute a sequence of machine-readable instructions, which can be embodied in a program or software. The instructions may be stored in a memory location, such as the memory 2810. The instructions can be directed to the CPU 2805, which can subsequently program or otherwise configure the CPU 2805 to implement methods of the present disclosure. Examples of operations performed by the CPU 2805 can include fetch, decode, execute, and write back. The CPU 2805 can be part of a circuit, such as an integrated circuit. One or more other components of the device 110 can be included in the circuit. In some cases, the circuit is an application specific integrated circuit (ASIC) or a field programmable gate array (FPGA).

Continuing to refer to FIG. 28, the storage unit 2815 can store files, such as drivers, libraries and saved programs. The storage unit 2815 can store user data, e.g., user preferences and user programs. The processor 110 in some cases can include one or more additional data storage units that are external, such as located on a remote server that is in communication through an intranet or the Internet. The storage unit 2815 can also be used to store operating system, application programs, and the like. Optionally, storage unit 2815 may be removably interfaced with the processor (e.g., via an external port connector (not shown)) and/or via a storage unit interface. Software may reside, completely or partially, within a computer-readable storage medium within or outside of the storage unit 2815. In another example, software may reside, completely or partially, within processor(s) 2805.

Continuing to refer to FIG. 28, the processor 110 can communicate with one or more remote computer systems through the network 2830. For instance, the device 110 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Continuing to refer to FIG. 28, information and data can be displayed to a user through a display 2835. The display is connected to the bus 2825 via an interface 190, and transport of data between the display other elements of the device 110 can be controlled via the interface 190.

Methods as described herein can be implemented by way of machine (e.g., computer processor) executable code stored on an electronic storage location of the processor 110, such as, for example, on the memory 2810 or electronic storage unit 2815. The machine executable or machine readable code can be provided in the form of software. During use, the code can be executed by the processor 2805. In some cases, the code can be retrieved from the storage unit 2815 and stored on the memory 2810 for ready access by the processor 2805. In some situations, the electronic storage unit 2815 can be precluded, and machine-executable instructions are stored on memory 2810.

Non-Transitory Computer Readable Storage Medium

In some embodiments, the platforms, systems, media, and methods disclosed herein include one or more non-transitory computer readable storage media encoded with a program including instructions executable by the operating system of an optionally networked processor. In further embodiments, a computer readable storage medium is a tangible component of a processor. In still further embodiments, a computer readable storage medium is optionally removable from a processor. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the processor's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tel, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 29:
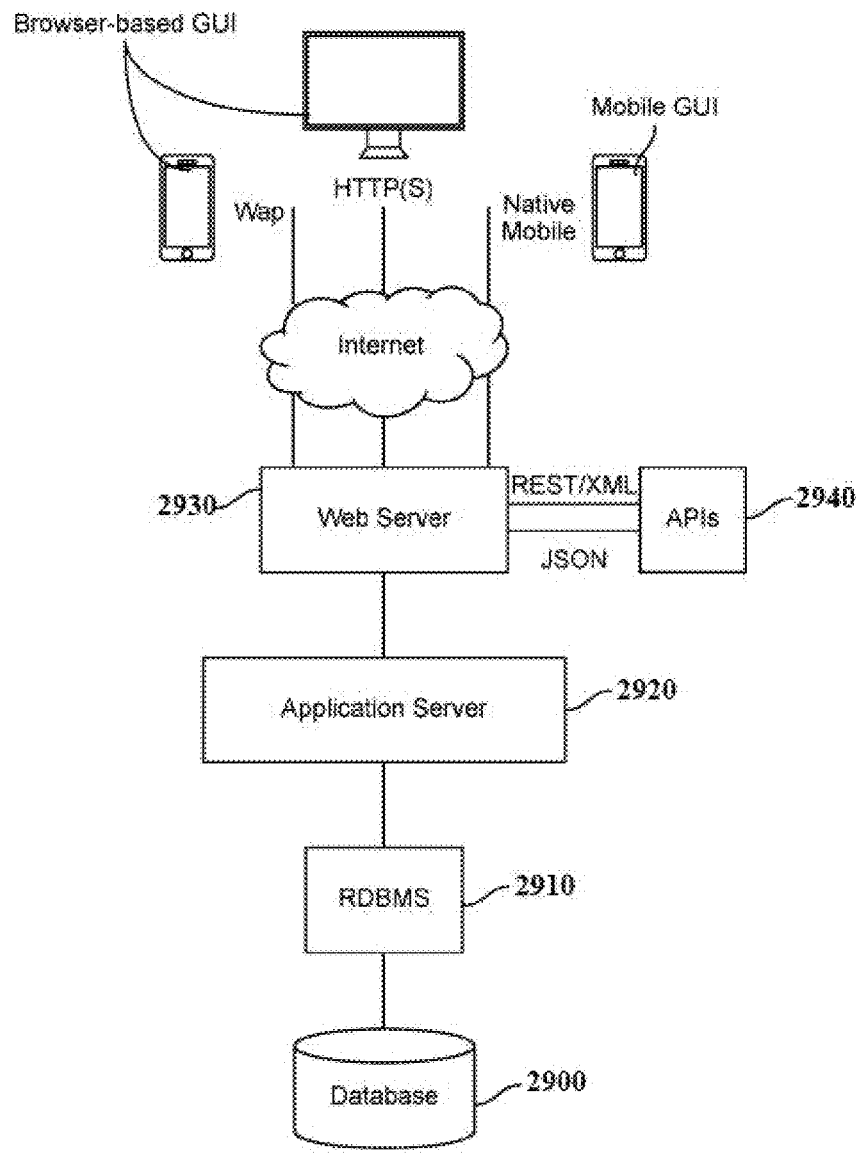
FIG. 29 shows an example of an application provision system configured to execute the methods described herein.

Referring to FIG. 29, in a particular embodiment, an application provision system comprises one or more databases 2900 accessed by a relational database management system (RDBMS) 2910. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 2920 (such as Java servers, .NET servers, PHP servers, and the like) and one or more web servers 2930 (such as Apache, IIS, GWS and the like). The web server(s) optionally expose one or more web services via app application programming interfaces (APIs) 2940. Via a network, such as the Internet, the system provides browser-based and/or mobile native user interfaces.

Figure 30:
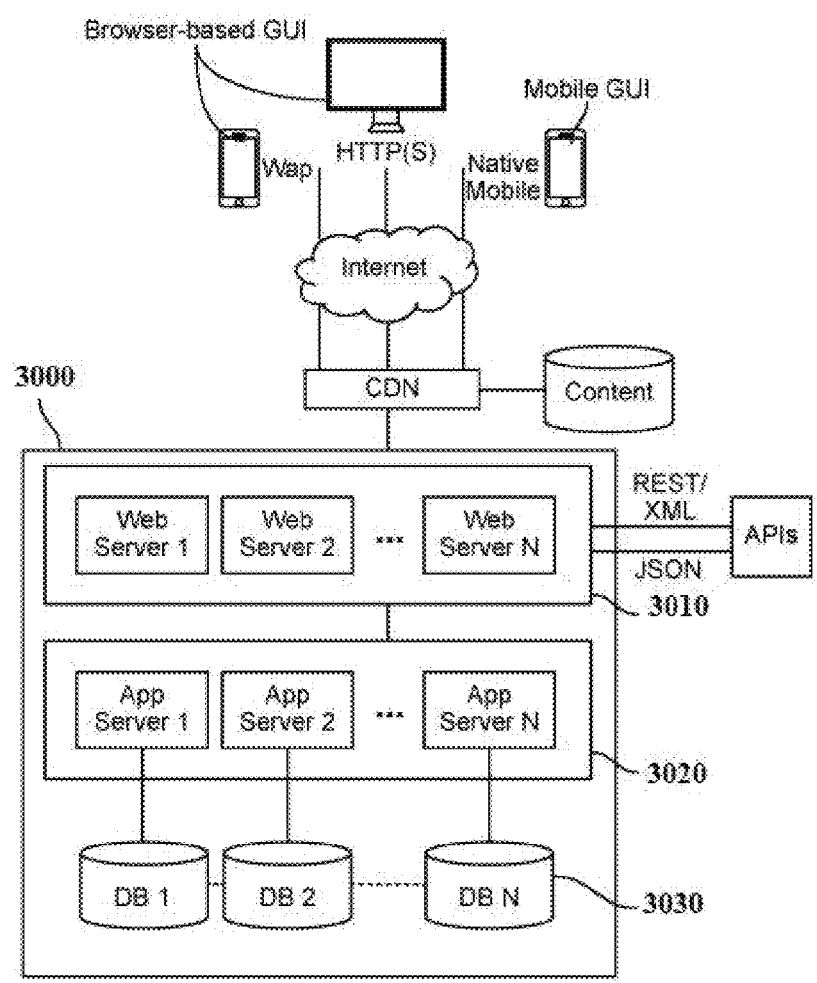
FIG. 30 shows an example of an application provision system configured to execute the methods described herein.

Referring to FIG. 30, in a particular embodiment, an application provision system alternatively has a distributed, cloud-based architecture 3000 and comprises elastically load balanced, auto-scaling web server resources 3010 and application server resources 3020 as well synchronously replicated databases 3030.

Mobile Application

In some embodiments, a computer program includes a mobile application provided to a mobile processor. In some embodiments, the mobile application is provided to a mobile processor at the time it is manufactured. In other embodiments, the mobile application is provided to a mobile processor via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of raw image data, reconstructed image data, ROIs, training data, label or classification, features, subcategory of features, machine learning algorithms, etc. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

Cancer Risk Assessment Using Volume Averaged Sound Speed

Example 1

Breast cancer risk associated with sound speed and MPD was studied in a case-control study involving 61 participants with recent breast cancer diagnoses (cases) and 165 participants with no history of breast cancer (controls). Odds Ratios (ORs) adjusted for matching factors and 95% Confidence Intervals (CIs) were calculated for the relation of quartiles of MPD and sound speed with breast cancer risk. MPD was associated with elevated breast cancer risk compared to controls, although the trend did not reach statistical significance (p=0.10). In contrast, elevated sound speed was significantly associated with breast cancer risk in a dose-response fashion (p=0.0003). The case-control study showed that whole breast sound speed was more strongly associated with breast cancer risk than MPD.

UST exams were performed at the Karmanos Cancer Institute (KICI) with the SoftVue system, manufactured by Delphinus Medical Technologies (Novi, MI, USA) and cleared by the FDA for clinical use. Mammograms were obtained from patients undergoing screening or follow-up at the Karmanos Cancer Institute.

Since each participant's mammogram was compared to her UST scans, a woman was scheduled for her UST visit within approximately one month of her screen-negative mammogram date. A one-month window is justified on the basis that breast density declines with age at a rate of 1-2% per year which translates to <0.2% per month, well below our uncertainty of BD measurement by either method. Race/ethnicity was classified as follows: white, non-Hispanic, or African American.

Identification and Selection of Cases

Cases were identified on the basis of a recent diagnosis of breast cancer after routine screening. Exclusion criteria were: 1) pregnant; 2) lactating; 3) with active skin infections or open chest wounds because of the open interface with the water in the imaging tank; 4) breast size more than 22 cm in diameter (limit of the size of the ring ultrasound transducer) and 5) over 350 pounds (lb.) of weight (weight limit, as specified by the manufacturer of the table). Furthermore, we excluded cases that have 6) bilateral synchronous breast cancer (a mammogram without radiological signs of cancer will not be available); 7) subjects who have received any systemic therapy for breast cancer; and 8) subjects who have breast implants or had reduction mammoplasty.

Identification and Selection of Controls

Controls were selected from participants who had no benign or malignant findings on either mammography or SoftVue. In addition, eligible controls had no previous or present history of breast cancer and none of the exclusion criteria given above for cases. We also excluded screen-negative women who are currently taking endogenous hormones (i.e., oral contraceptives and menopausal hormone therapy) since these may modulate breast density.

UST Imaging of Sound Speed

Data were reconstructed from the raw data collected by UST and output as DICOM images which were viewed on a standard display workstation. The volume averaged sound speed of the breast (VASS) was calculated using techniques summarized here.

Calculate the volume of the breast, V, through a direct pixel count using our previously developed automated scripts.

Calculate the volume averaged sound speed (VASS) for each stack by summing up all the pixel values and dividing by the volume determined above using our automated script.

Apply this calculation to image stacks of all cases and controls.

Mammography Defined BD Measures

Mammograms were analyzed using the Cumulus software package to generate estimates of mammographic percent BD. See Boyd N F, et al. (2007) Mammographic density and the risk and detection of breast cancer. The New England journal of medicine 356 (3): 227-236. doi:10.1056/NEJMoa062790 and Boyd, N. F., et al., (2014). Evidence that breast tissue stiffness is associated with risk of breast cancer. PloS one, 9 (7), p.e100937, each of which is incorporated herein by reference.

Epidemiological Data

Demographics (age, race, education), height, weight, screening and breast cancer history, menopausal status, nulliparity, and breastfeeding (ever/never) were obtained from questionnaires filled out by all study participants. These were used to match cases to controls and to adjust the data before comparing the trends of VASS and MD to BC risk.

Case-Control Study:

The data for the comparison of the UST measures and BD by mammography, as risk factors for breast cancer, consisted of case-control images. In order to "blind" the observers to case or control status we selected, for measurement, the unlabeled pairs of mammograms and UST image stacks from cases (contra-lateral breast) and controls (randomly selected laterality). The study was HIPPA compliant and approved by our local IRB.

We evaluated breast cancer risk associated with volume averaged sound speed (VASS) and MD in this case-control study involving 61 participants with recent breast cancer diagnoses (cases, aged 30-70 years) and 165 participants with no history of breast cancer (controls), who were frequency matched to cases on age, race, and menopausal status. In cases, breast density was measured pre-treatment in the contralateral breast to avoid potential influences of tumor-related changes on MPD or sound speed. For controls, we randomly selected a breast for UST assessment, since concurrent mammographic density measurements of left and right breasts from the same individuals have been reported to be highly correlated. Odds Ratios (ORs) adjusted for matching factors and 95% Confidence Intervals (CIs) were calculated for the relation of quartiles of MPD and sound speed with breast cancer risk. OR differences were tested using a bootstrap approach.

Statistical Analysis:

Associations between VASS and risk factors of menstrual (age at menarche and menopause) and reproductive variables (parity and number of live births), family history including the number and types of affected relatives and their ages of onset, both for breast and ovarian cancer, body mass index (BMI), use of hormone therapy and age at interview were evaluated using t-tests, Pearson correlation coefficients, or analysis of variance (ANOVA) as appropriate. The statistical evaluation of the association of VASS with breast cancer used unconditional logistic regression. Unadjusted and adjusted analyses were carried out. Adjusted analysis included the risk factors of menstrual (age at menarche and menopause) and reproductive variables (parity and number of live births), family history including the number and types of affected relatives and their ages of onset, both for breast and ovarian cancer, body mass index (BMI), use of hormone therapy and age at interview. Quartiles of VASS and BD were calculated based on the distribution of these variables in controls.

The correlations of these measures were assessed using linear regression models, adjusting for age, BMI, and other variables significantly associated with them. Transformations were applied as necessary for normality assumptions. We also explored the relationship between these measures and breast cancer risk in unconditional logistic regression models adjusting for appropriate confounders. Given the large number of comparisons in these analyses, we adjusted for multiple testing using the false discovery rate (FDR) method, where FDR-corrected p-values <0.05 was considered statistically significant.

Results—Patient Characteristics:

The epidemiological attributes of the cases and controls are summarized in Table 1. In Table 2, these characteristics are broken down according to quartiles of sound speed. These quartiles were determined by distributing the controls into 4 equally populated bins.

TABLE 1

Quartiles of MD and VASS for cases and comparison controls

| | Case (N = 61) | | Comparison (N = 165) | |
|---|---|---|---|---|
| | N | % | N | % |
| Quartiles of baseline mammographic density, % | | | | |
| <7.8 | 10 | 16.4 | 41 | 24.9 |
| 7.8-<16.9 | 9 | 14.8 | 42 | 25.5 |
| 16.9-<30.8 | 20 | 32.8 | 40 | 24.2 |
| ≥30.8 | 22 | 36.1 | 42 | 25.5 |
| Quartiles of baseline Sound speed, m/s | | | | |
| <1440.6 | 3 | 4.9 | 40 | 24.2 |
| 1440.6-<1445.6 | 11 | 18 | 43 | 26.1 |
| 1445.6-<1452.8 | 17 | 27.9 | 41 | 24.9 |
| ≥1452.8 | 30 | 49.2 | 41 | 24.9 |

TABLE 2

Multivariate Odds Ratios (ORs) and 95% Confidence Intervals (CIs) foe the elation of Quartiles of MD and VASS with breast cancer risk. Models are adjusted for age, race and menopausal status.

| | OR | 95% CI | P-trend |
|---|---|---|---|
| Quartiles of baseline mammographic density, % | | | |
| Q2 vs. Q1 | 0.82 | (0.3, 2.3) | |
| Q3 vs. Q1 | 1.75 | (0.7, 4.4) | |
| Q4 vs. Q1 | 1.76 | (0.7, 4.4) | |
| TREND (OR per quartile) | 1.27 | (0.9, 1.7) | 0.10 |
| Quartile of baseline sound speed, m/s | | | |
| Q2 vs. Q1 | 3.31 | (0.8, 12.9) | |
| Q3 vs. Q1 | 5.16 | (1.4, 19.4) | |
| Q4 vs. Q1 | 8.60 | (2.3, 31.7) | |
| TREND (OR per quartile) | 1.83 | (1.3, 2.5) | 0.0003 |

P-difference, comparing DR-MPD trend vs. OR-ss trend < 0.01

MPD was associated with elevated breast cancer risk compared to controls, consistent with previous studies, although the trend did not reach statistical significance (OR per quartile=1.27, 95% CI: 0.95, 1.70; p=0.10). In contrast, elevated sound speed was significantly associated with increased breast cancer risk in a dose-response fashion (OR per quartile=1.83, 95% CI: 1.32, 2.54; p=0.0003) (Tables 1-2, FIG. 3). The OR-trend for sound speed was statistically significantly different from that observed for MPD (p<0.01). Although these data were based upon preliminary findings from this pilot study, with limited sample size, we still observed a statistically significant trend between increasing quartiles of ultrasound tomography sound speed and increasing breast cancer risk.

Table 1 shows the raw distribution of cases and controls in quartiles defined by the controls. Even with this raw data, it is apparent that the distribution of cases across the VASS quartiles is highly differentiated from the controls with a strong trend toward the higher quartiles. In fact, the frequency of cases in Q4 is 10 times that of Q1. In the case of MD quartiles, the Q4/Q1 ratio is only 2, suggesting that cancer frequency trends more strongly with increasing VASS vs MD.

Table 2 summarizes the formal evaluation of that trend based on OR analysis. In this case, the Q4 vs Q1 OR is 8.3 for VASS vs 1.76 for BD. The magnitude of the OR for VASS is almost 5 times that of BD suggesting that VASS is much more strongly associated with occurrence of cancer, compared to BD. However, the significance of this large improvement is muted by the large CI's associated with these measurements. While the Q4 vs Q1 OR is large the actual value could be as low as 2.3 or as large as 31.7. Similarly, for BD, the actual value could be as low as 0.7 or as high 4.4.

Figure 3:
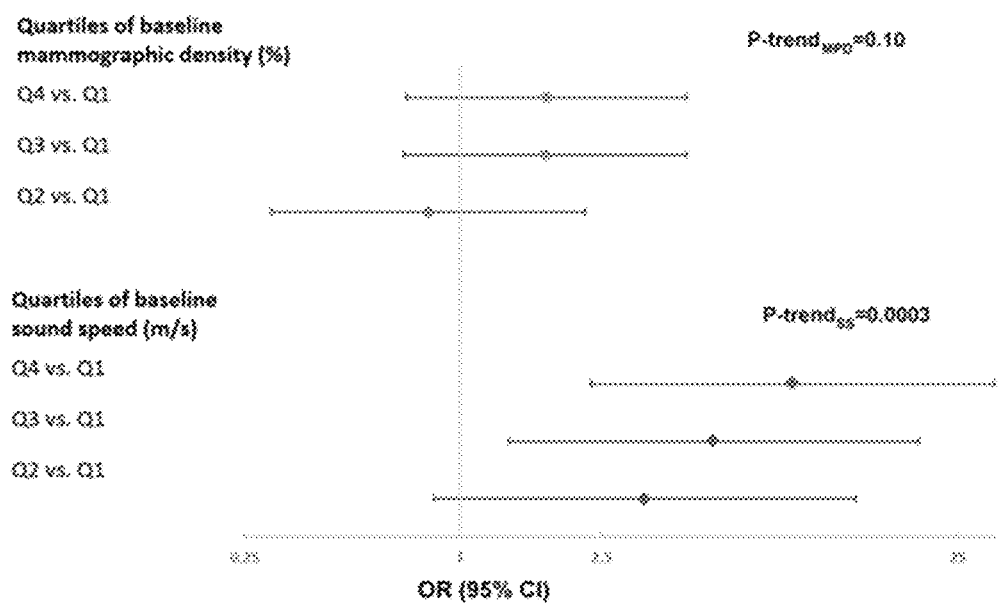
FIG. 3 shows multivariate odds ratios (OR) and 95% confidence intervals (CI) for the relation of quartiles of MPD (top) and VASS (bottom) with breast cancer risk associated with the data in Example 1.

FIG. 3 shows multivariate odds ratios (OR) and 95% confidence intervals (CI) for the relation of quartiles of MPD (top) and VASS (bottom) with breast cancer risk. Models were adjusted for age, race, and menopausal status.

Figure 4:
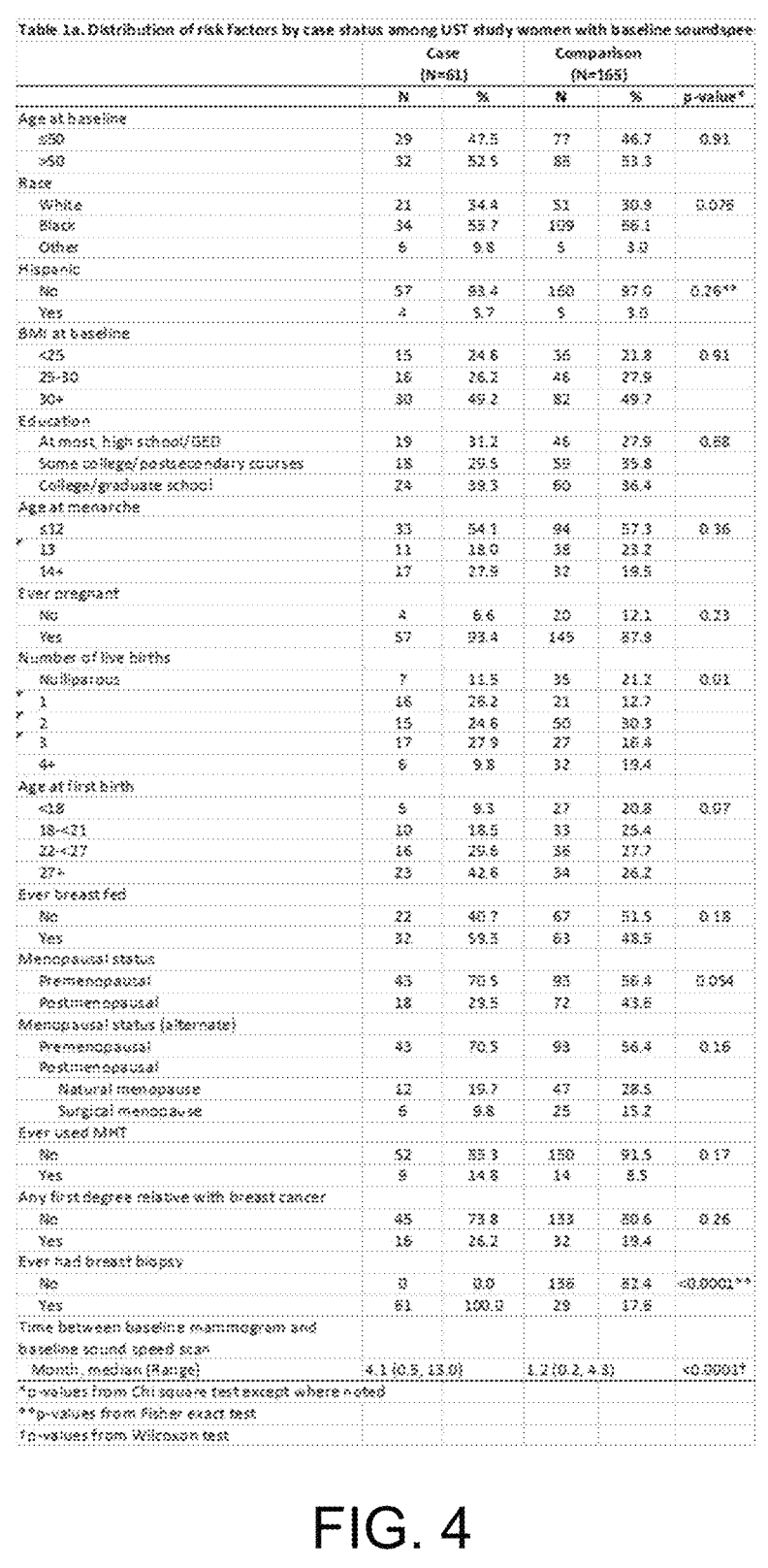
Figure 5:
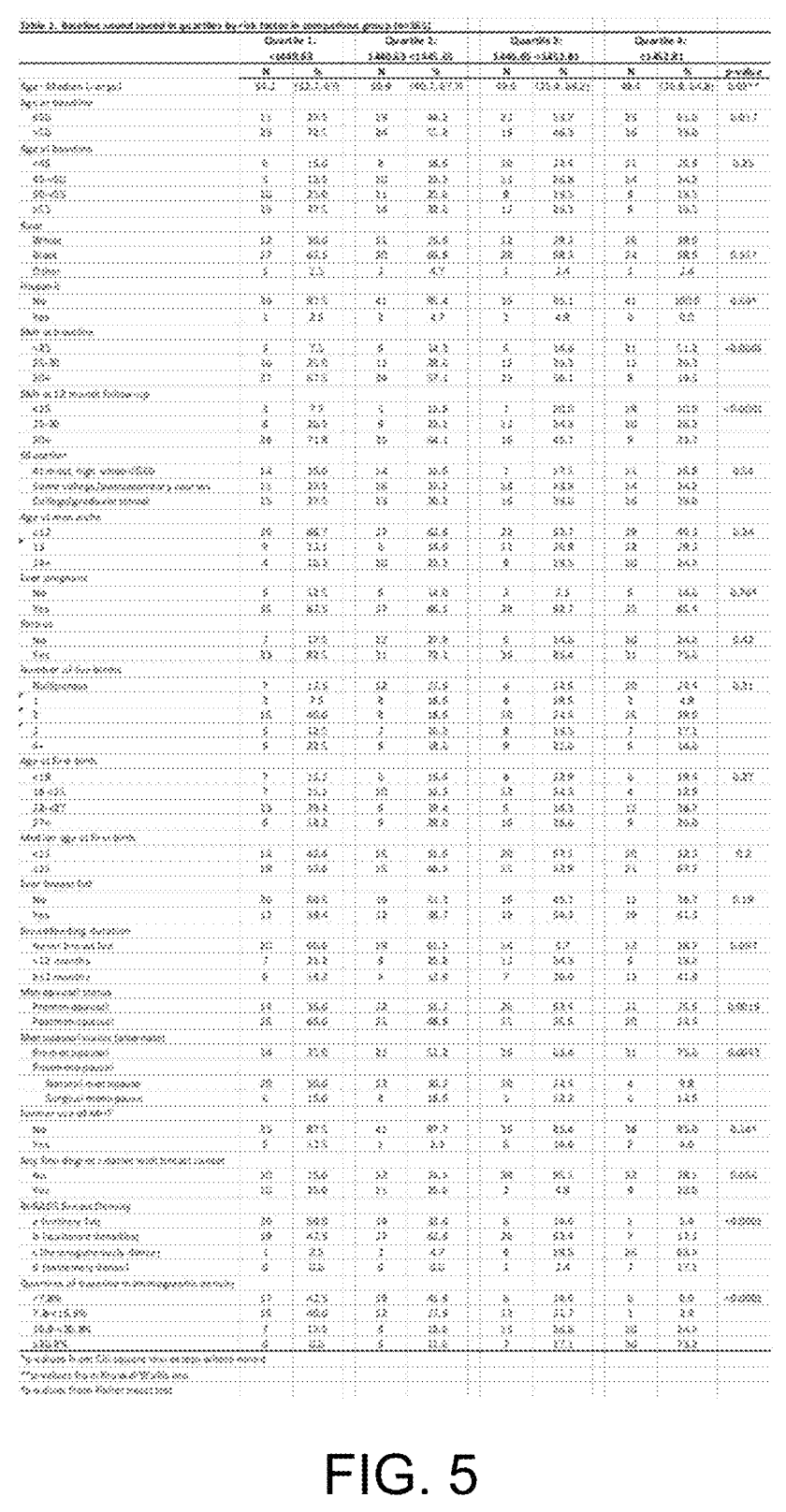

FIG. 4 and FIG. 5 show supplementary data for Table 1 and Table 2 respectively.

However, a better comparison of the two associations may be to compare the trends (ORs per quartile) in the two associations. Such an analysis utilizes information from all 4 quartiles which increases the precision of the comparison. In fact, as Table 2 shows, the trend for MD is 1.27/quartile and with a p=0.1, is not statistically significant. On the other hand, the trend for VASS is 1.83/quartile and with a p=0.0003, is highly statistically significant. Furthermore, the difference between the two trends is also statistically significant (p<0.01), indicating that VASS likely has a stronger dependence on BC risk than MD.

Example 2

Patient Recruitment and Data Collection

A group of 100 women underwent both a UST breast scan and had a Volpara reading of a mammogram at our local cancer center. Spearman correlation coefficients were calculated to determine the strength of the correlations between the Volpara and UST assessment of breast density. There is a correlation ($r_S$=0.85) between Volpara volumetric percent density and UST whole breast sound speed values. This correlation is significantly stronger than those from previous 2-D studies ($r_S$=0.85 vs $r_S$=0.7, respectively). The strong correlation suggests that UST sound speed is a viable imaging biomarker for measuring BD. This result strengthens the potential role of sound speed as a biomarker of BD.

A group of 100 women underwent both a UST breast scan and had a Volpara analysis of a mammogram at the Karmanos Cancer Institute (KCI) (Detroit, MI). In order to limit the temporal changes in breast density, only those patients with that received a UST scan within a 365-day period relative to the Volpara mammogram reading were selected. The UST scans occurred over a period ranging from May 2014 to February 2016 as Volpara. All imaging procedures were performed under an Institutional Review Board-approved protocol, in compliance with the Health Insurance Portability and Accountability Act, with informed consent obtained from all patients.

Subjects were initially recruited for a breast cancer diagnosis study which resulted in a data base of UST scans of the affected breast along with the associated mammograms. The breast density study presented here is based on a retrospective analysis of the archived data from the diagnostic study. Using these data, we calculated the VASS from the UST data and the MPD from the mammographic data. It should be noted that UST data of the contralateral breast were not available in this archive because the original diagnostic study was focused on scanning only the affected breast. Consequently, the BD measurements were influenced by the presence of masses. However, the masses were present in both the UST and Volpara studies and therefore would not constitute a bias in the comparison of the 2 modalities.

Volpara Measurements

As part of the normal screening protocol, during most of 2015, patients that underwent a mammogram also had a Volpara analysis. The measures of total dense volume, total breast volume, percent density and the density grade were recorded (FIG. 2) from the breast that was also scanned with UST.

UST Measurements

Figure 6:
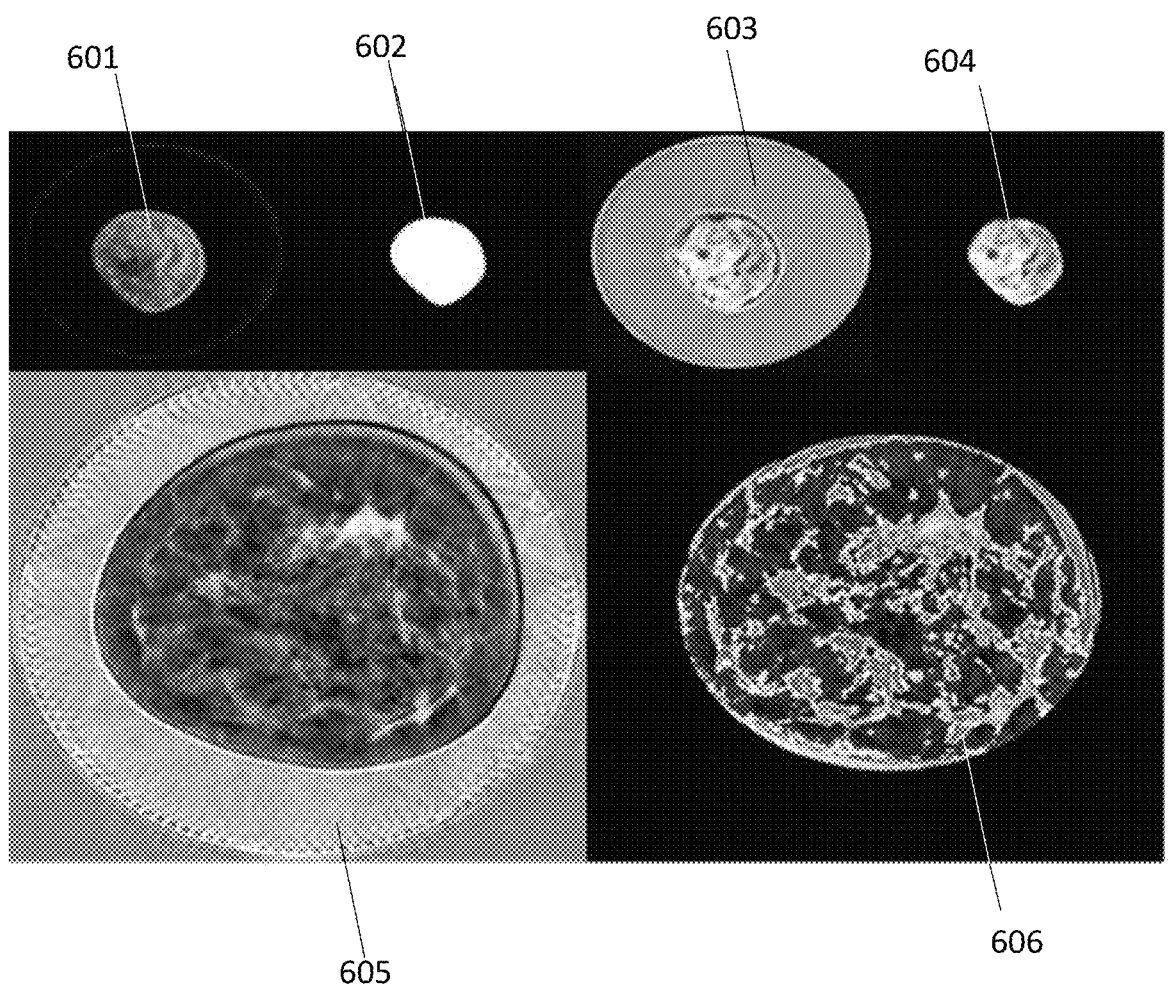
FIG. 6 shows a sequence of images showing analysis of the UST data.

FIG. 6 shows a sequence of images showing analysis of the UST data. FIG. 6 shows: (Top: from left to right)—a Wafer image from which the wafer bath can easily be thresholded, 601; the resulting mask after the morphological operators have been applied to the thresholding, 602; the original sound speed image, 603; and the masked sound speed image from which all subsequent measurements were made, 604 and (Bottom: from left to right)—the original sound speed image 605 and the masked UST image with the segmentation of the dense and non-dense tissue overlaid 606. Note a small clump of dense tissue at 1:00 o'clock.

The UST measurements were performed with SoftVue (FIG. 1), (Delphinus Medical Technologies Novi, MI, USA). As a BD measurement method, UST potentially overcomes several disadvantages of mammography, for example, sound speed (SS) is a quantitative and direct measure of physical tissue density; UST measures 3-dimensional breast tissue volumes by generating a stack of SS images, yielding a 3-D rendering of the SS distribution (FIG. 6); pixel values of SS images are in units of km/s, which represents an absolute scale that does not vary between scans and does not require phantom calibrations; UST is operator independent on both the exam side and the analysis side, unlike standard mammographic methods.

The patient lies prone on a table, with the breast suspended in an imaging tank filled with warm, water below the table. The ultrasound sensor in the shape of a ring, surrounds the breast and moves from the nipple to the chest wall, on a motorized gantry, gathering data at 2 mm intervals. A typical whole breast scan takes about 2-4 minutes to perform. The SoftVue system generates images at each position of the transducer, yielding bilateral image stack. The SS images (FIG. 1) are produced from waveform tomography algorithms yielding sub-mm spatial resolution. By comparison, in our previous work, SS images were produced from bent ray algorithms that yielded sub-cm resolution.

The speed of sound is a measure that is obtained by determining the arrival times of signals emitted by one portion of the transducer and received at another. Since the physical parameters of transducer shape and size are determined precisely at the time of manufacture, the absolute speed of sound can be calculated accurately. Consequently, the unit of choice, km/s, represents an absolute scale that can be easily replicated between current and future machines.

Calculating the density statistics for the sound speed images requires the image to first be segmented from the background water bath. In addition to creating higher resolution sound speed images, the waveform reconstruction also produced a slightly different reflection image known as Wafer (Waveform enhanced reflection). This image used the sound speed information to enhance the contrast at the breast tissue water bath boundary. Wafer images are therefore much easier to threshold to segment the breast tissue. Segmentation masks were created by first thresholding the Wafer image, and then applying a binary operator to create the final mask for each slice (FIG. 6). Once the sound speed images were masked, the mean sound speed, the total volume of tissue along with other basic statistics were easily pulled from the quantitative images for each scan.

Two parameters were calculated from the SS image stacks. VASS is the average SS of the breast expressed in units of meters/second. PHSST is analogous to mammographic percent density and is expressed as a percentage in the range 0% to 100%. VASS is calculated with an algorithm that sums all sound speed pixel values and divides by the total number of pixels counted within the breast boundary. This process yields a volume-averaged sound speed of the breast. PHSST is determined using a k-means segmentation algorithm that separates the sound speed image into dense and non-dense regions (FIG. 6). The volume of the segmented dense tissue was then calculated. Dividing by the entire volume of the breast (from the VASS calculation), the PHHST parameter was determined.

Comparison of VASS and PHSST vs MPD

Paired t-test were performed between the UST and Volpara measures. Spearman correlation coefficients were calculated to determine the strength of the correlations between the Volpara MPD and UST (VASS and PHSST) measurements of BD.

Error Estimation

The UST scan data used in this study were initially acquired from a parallel study which selected patients on the basis of having a suspicion following a mammogram. Consequently, most subjects had a mass in their breast which contributes to the VASS measurement independently of the breast density. A 1 cm3 lesion such as a fibroadenoma or cancer has sound speeds similar to dense fibroglandular tissue. For a typical breast whose volume is 1000 cm3 this represents a 0.1% perturbation on the volume of the breast and a 1.5 m/s perturbation the average sound speed. As shown later, the above uncertainties are well below the scatter in the observed correlations between the UST and MPD measurements.

Results—Patient Characteristics

The mean delay between UST scans and mammography was 27 days. For 66 patients, the UST scan occurred after the mammogram, while 32 patients received their UST scan first, with 4 patients having both on the same day. The average age, height, weight and BMI of the patients was 51.2 years, 179.7 lbs., 64.7 in and 30.2 kg/m$^2$, respectively, at the time of their UST scan. 74% of the participants were African American, 19% were white and 7% were other.

Results—Mammographic and UST Volume Comparisons

The average volumes of breast tissue that were measured in both mammography and UST were compared and the results are shown below in 1. UST found a smaller total breast volume and fatty volume but a larger volume of dense tissue which therefore results in a larger percent density value. All measures showed statistically significant differences in the average values with p<0.001.

TABLE 3

Direct Breast Volume Comparisons

| Volume Measure | Volpara Average | UST Average | Spearman Coefficient |
|---|---|---|---|
| Total Breast Volume (cm$^3$) | 1103 | 1003 | 0.803 |
| Dense Tissue Volume (cm$^3$) | 80 | 191 | 0.589 |
| Fatty Tissue Volume (cm$^3$) | 1023 | 812 | 0.824 |
| Percent Dense Tissue (%) | 8.8 | 22.6 | 0.859 |

Spearman correlations were also run between the Volpara and UST volume measurements. The results are also shown in Table 3. Very strong correlations were found between Volpara and UST total volume and fatty volume. However, there is only a moderate correlation between the Volpara and UST volumes of dense tissue.

Results—Mammographic and UST Density Measures Comparisons

Figure 7:
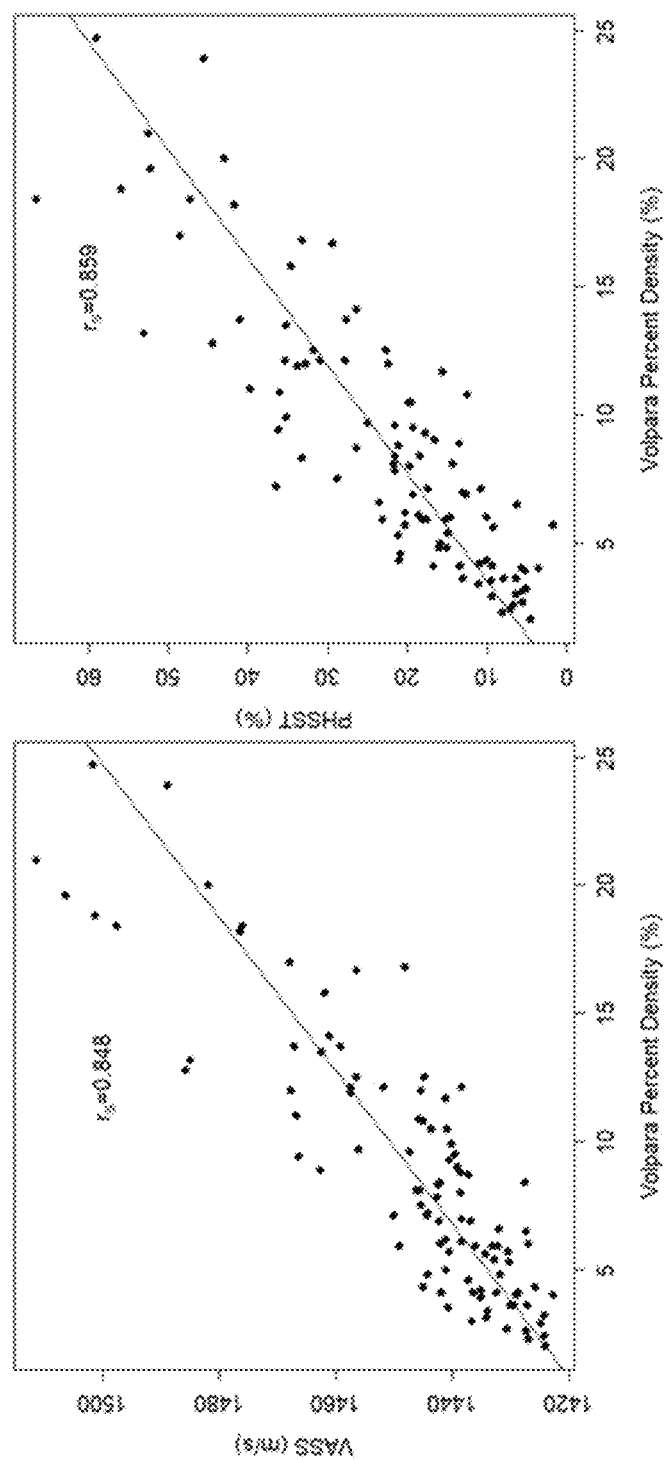
FIG. 7 shows (left) VAS compared to Volpara's volumetric measurement and (right) PHSST compared to Volpara.

FIG. 7 shows (left) VAS compared to Volpara's volumetric measurement and (right) PHSST compared to Volpara. Comparisons between the UST breast density measures of mean sound and percent density with Volpara measure of breast density were then taken. FIG. 7 shows a percent density comparison, showing a strong correlation between VASS vs MPD and PHSST vs MPD.

Results—Volpara Density Grade Comparisons

FIG. 8 shows boxplots of VASS (left) and PHSST (right) as grouped by the Volpara density graded. Volpara also scores each breast's density on a four-point scale based on its percent density measure. The mean sound speed, percent density and dense volume measurement were calculated for each group from the sound speed data. Boxplots of the results are shown in FIG. 8. The Volpara density score is most tightly correlated with the Volpara grade, although PHSST also shows strong correlations to the groupings. The UST volume was slightly lower than that measured by Volpara. The total volume of dense tissue rises as the density increases until the breasts get very dense, then there is a plateau. UST classifies more tissue as dense tissue than Volpara.

DISCUSSION

The average UST breast volume was slightly lower than that measured by Volpara. This difference is likely explained by the fact that the positioning of the breast is different for a UST image than for a mammogram as well as different segmentation methods used.

Table 3 also shows that UST classifies significantly more tissue as dense, leading to much higher percent densities compared to Volpara. This difference could be attributed to several factors: (i) UST sound speed is a measure of physical density (as described in methods) while x-ray absorption arises from both density and composition; (ii) The k-means clustering used for the PHSST estimation is likely different from the proprietary Volpara estimation leading to different effective thresholds; (iii) Volpara attempts to recover 3D information from a compressed volume which is likely to lead to both random and systematic errors compared to a true 3D estimation which is used by UST; etc. The breast density determined by Volpara may underestimate the true density due to the factors noted above.

VASS and PHSST correlate strongly with MPD (FIG. 7). The VASS measurement appears to be slightly less correlated with MPD than PHSST, most likely due to the fact that VASS vs MPD compares a quantitative value as compared to a percentage. Conversely, PHSST vs MRI compares a percentage versus another percentage, hence a more similar comparison, demonstrating small statistically insignificant differences.

The trends of VASS and PHSST with MPD strongly correlate with correlation coefficients of 0.85 and 0.86 respectively (FIG. 8). This comparison suggests that, despite the limitations in classifying dense tissue discussed previously, Volpara's ability to determine volumetric properties from a two-dimensional mammogram is more effective than relying only on two-dimensional measures.

A general observation that characterizes the association of VASS and PHST with MPD is the behavior of the scatter in the association between these parameters from low to high values. The scatter is least at low values of VASS and MPD and increases steadily toward higher values. This effect was even stronger in previous studies and could be understood in the context of comparing 2-D projection images (mammogram) with 3-D UST images. At low densities the breast is dominated by homogeneously distributed fatty tissue. Since breast compression preserves breast volume, one would expect a strong correlation between a single component volume and a single component area (compression of the same volume). Similarly, with breasts that have only scattered regions of dense tissue the compressed breast will show a similar number of localized dense regions as any volumetric image and the correlation is retained. However, as the number of dense regions increases and the overall density of the breast increases, compression of the breast will invariably lead to overlap of dense tissues in the projection image. Regions of dense tissue can occlude each other thereby underestimating the MPD and the degree of occlusion can lead to variable MPD values, depending on the specific 3-D distribution of the dense tissue. These effects introduce a greater variance in the comparison of MPD with VASS since the latter does not measure a compressed quantity. In the current results, the scatter also increases with increasing density, but the effect is not as pronounced, suggesting that Volpara's volumetric estimate reduces but does not eliminate this type of scatter. As shown in FIG. 8, the UST data can be binned into four density categories based on the Volpara breast density grade. It confirms the earlier observation that the variance in the correlation increases with increasing breast density.

TABLE 4

Comparison of UST and MRI with multiple BD Models

| UST vs | Correlation coefficient | MRI vs | Correlation coefficient |
|---|---|---|---|
| 2D mammo | 0.7-0.75 [45,46] | 2D Mammo | 0.70-0.80 [22-35] |
| 3D mammo | 0.85-0.86 [this work] | 3D Mammo | 0.80-0.88 [21,36] |
| UST vs MRI | | | 0.94-0.96 [50] |

Finally, if we compare UST methods against modalities that produce progressively more accurate volumetric measurements, Table 4, we see that the correlation coefficient for UST increases steadily. This result is consistent with UST being a more volumetric measure of BD compared to any mammographic methods. Comparison of MRI with 2-D and 3-D MPD shows a remarkably similar trend with r values of 0.85 when comparing MRI vs Volpara and UST vs Volpara. These similarities suggest that UST methods of measuring BD may be effective, low cost surrogates for MRI measurements. In fact, in a previous study we showed that UST corelates with non-contrast MRI with a correlation coefficient as high as 0.96. Should UST be accepted as a screening modality in the future, it will have the potential to be a viable and more accurate alternative to mammographic measures of BD by removing the barriers that prevented MRI from becoming an effective alternative. Furthermore, it may be possible to address discrepancies in the literature about the correlation of breast density and background parenchymal enhancement (BPE) where some literature suggests that BPE is a biomarker of risk independently of breast density.

Example 3

We evaluated repeated measures of the volume averaged sound speed (VASS) biomarker in response to tamoxifen therapy in a case-control study. We recruited 74 participants referred by a health professional to undergo tamoxifen therapy (cases) and 150 controls with no history of breast cancer in Detroit, MI. Controls were matched to cases on age, race, and menopausal status. Cases were imaged at baseline, 3 months, 6, months, and 12 months post-tamoxifen initiation. Controls were imaged at baseline and 12 months.

Figure 9:
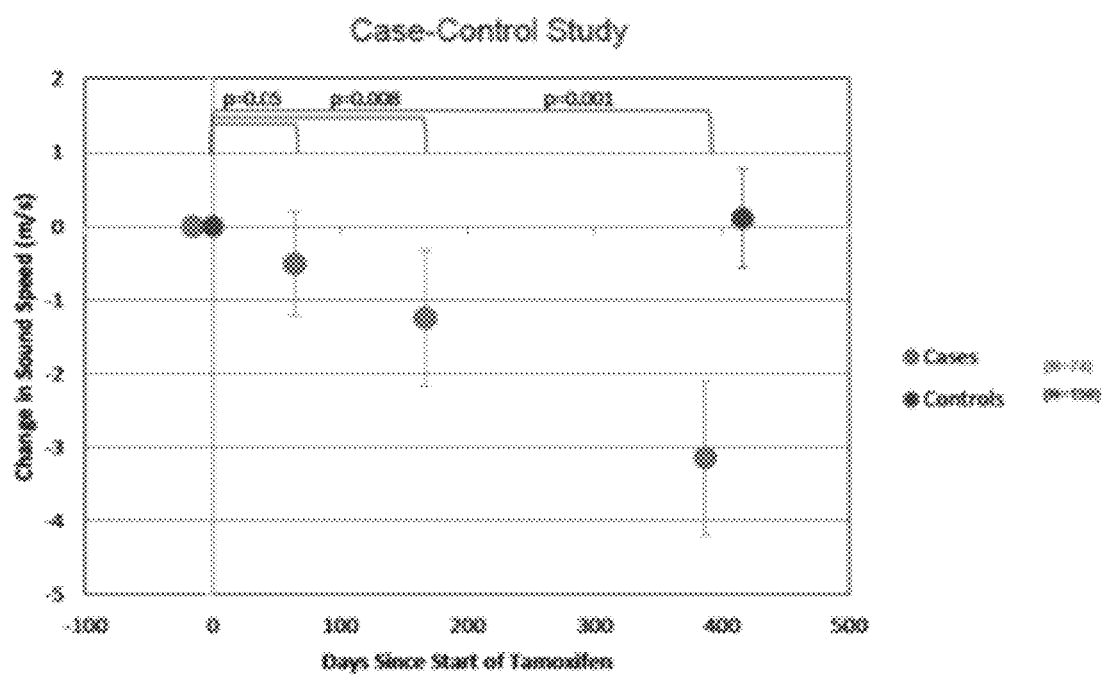
FIG. 9 shows results of the case-control study of Example 3.

FIG. 9 shows results of the case-control study. The change in volume averaged sound speed in cases and in controls are shown as a function of time.

FIG. 10 shows a summary of correlation between Tamoxifen Metabolites and 12-month change in volume averaged sound speed. VASS shows a rapid and statistically significant decline over a 12-month period post-initiation of tamoxifen therapy. VASS was stable in matched controls over the same time period. Change in VASS may be a potential surrogate marker of treatment response. The experiment demonstrates a role for monitoring VASS in clinical management to discriminate tamoxifen responders from non-responders.

Monitoring Response to Neoadjuvant Chemotherapy

Example 4

Patients at the Alexander J. Walt Comprehensive Breast Center at the Karmanos Cancer Institute in Detroit were recruited under a Wayne State University Institutional Review Board (IRB) approved protocol (#056707MP4F). Patients were first identified as prospective NAC patients through a HIPAA compliant inspection of electronic medical records (EMR's). Patients who appeared likely to receive NAC and consented to be in this study were identified as potentially eligible to participate. Eligibility criteria were as follows: a) ≥18 years old; b) confirmed diagnosis of locally advanced breast cancer; c) eligible for but not yet receiving NAC; d) ability to read and write in English; and e) no physical or mental condition preventing the ability to lie down on the UST device. A baseline measurement (day 0) was defined as the first study visit where a UST scan was performed on the same day and just before their first chemo visit. If a patient was scanned at their initial physician meeting and scanned on that day, they were assigned a negative day number (e.g. −10 days means they were scanned 10 days before their first chemo visit).

Figure 11:
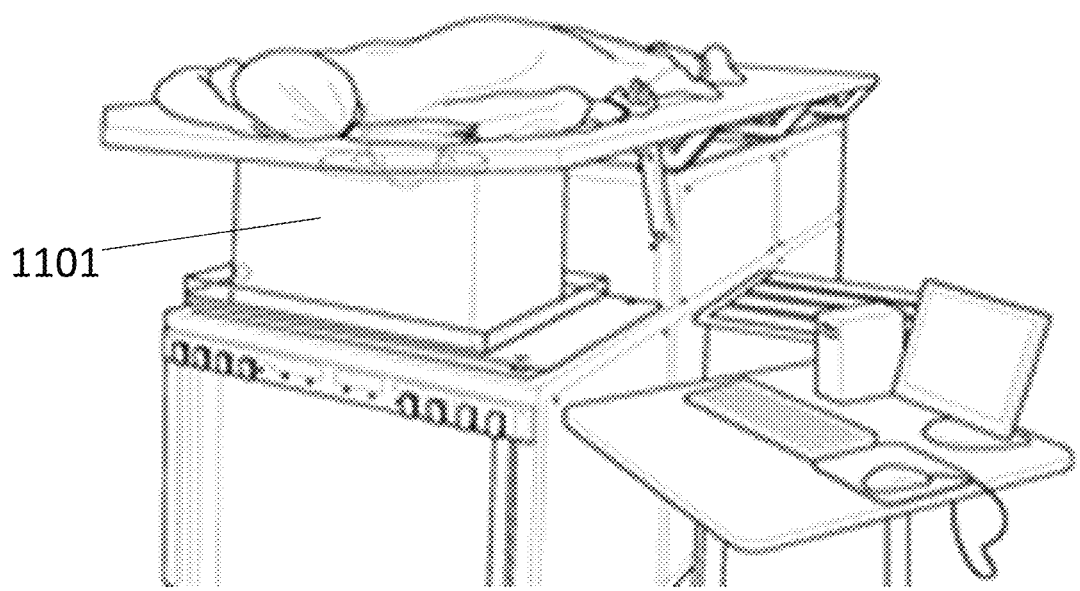
FIG. 11 shows an ultrasound tomography scanner, in accordance with some embodiments.
Figure 12:
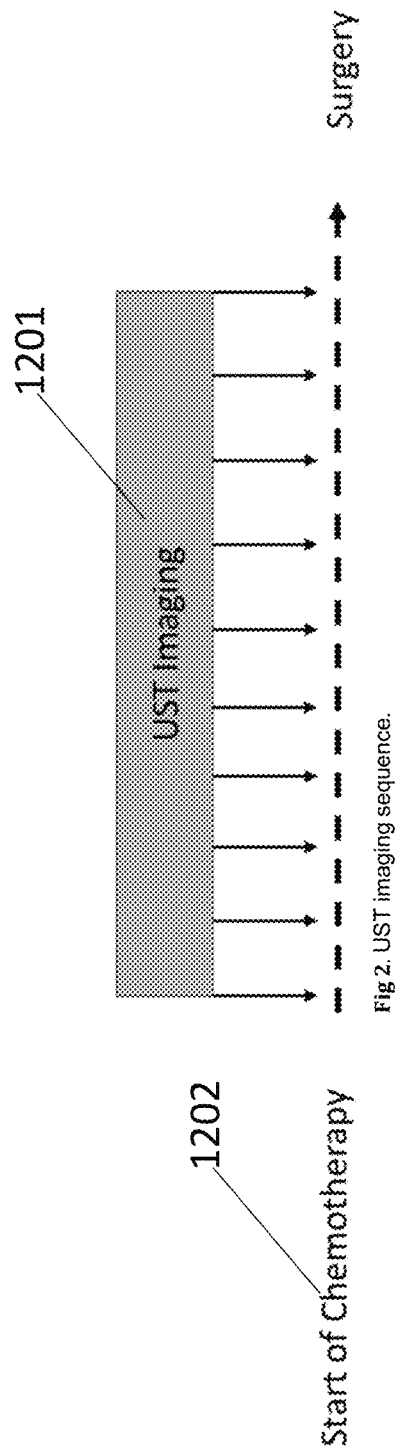
FIG. 12 shows an imaging sequence for use with a treatment plan, in accordance with some embodiments.

The patients enrolled in this study also were scanned with a prototype scanner 1101 (FIG. 11), a breast imaging system that is based on UST. UST was used over the course of the Neoadjuvant Chemotherapy (NAC therapy) 1202, yielding multiple time points for each patient 1201 (schematically shown in FIG. 12). Patients were scanned with UST each time they administered NAC (either weekly or bi-weekly).

Surgical pathology reports were used to assess whether patients achieved pathologic complete response (pCR) or not. No attempt was made to assess degree of response because the small number of patients would have precluded meaningful statistical analysis.

Initially, twenty-one patients were recruited for the study. UST was used to generate stacks of cross-sectional sound speed images using the technique of bent-ray tomography. These images were used to quantify the volume and sound speed of all foci of cancer in 3-D and determine changes over time. Initial results from that study were limited by the relatively poor spatial resolution of the ray-based sound speed images (resolution of 5 mm). Our group has developed a reconstruction method based on waveform tomography that has improved the spatial resolution by almost an order of magnitude (0.7 mm). With these improvements, we attempted to reconstruct new images from the raw data that were saved from the original study. While largely successful, the reconstruction for 7 of the 21 patients did not yield usable images because of poor signal quality (the waveform reconstruction method is more sensitive to signal quality because the smaller pixels it reconstructs contain less signal energy). Consequently, the study proceeded with a total of 14 patient data sets corresponding to 182 patient exams (average of 13 exams per patient).

At the completion of the study the data were compiled for each patient into a time series of sound speed image stacks. A board-certified breast imager (PL) examined the data sets to determine the location and extent of the cancer within the image stack at each time point.

Figure 13:
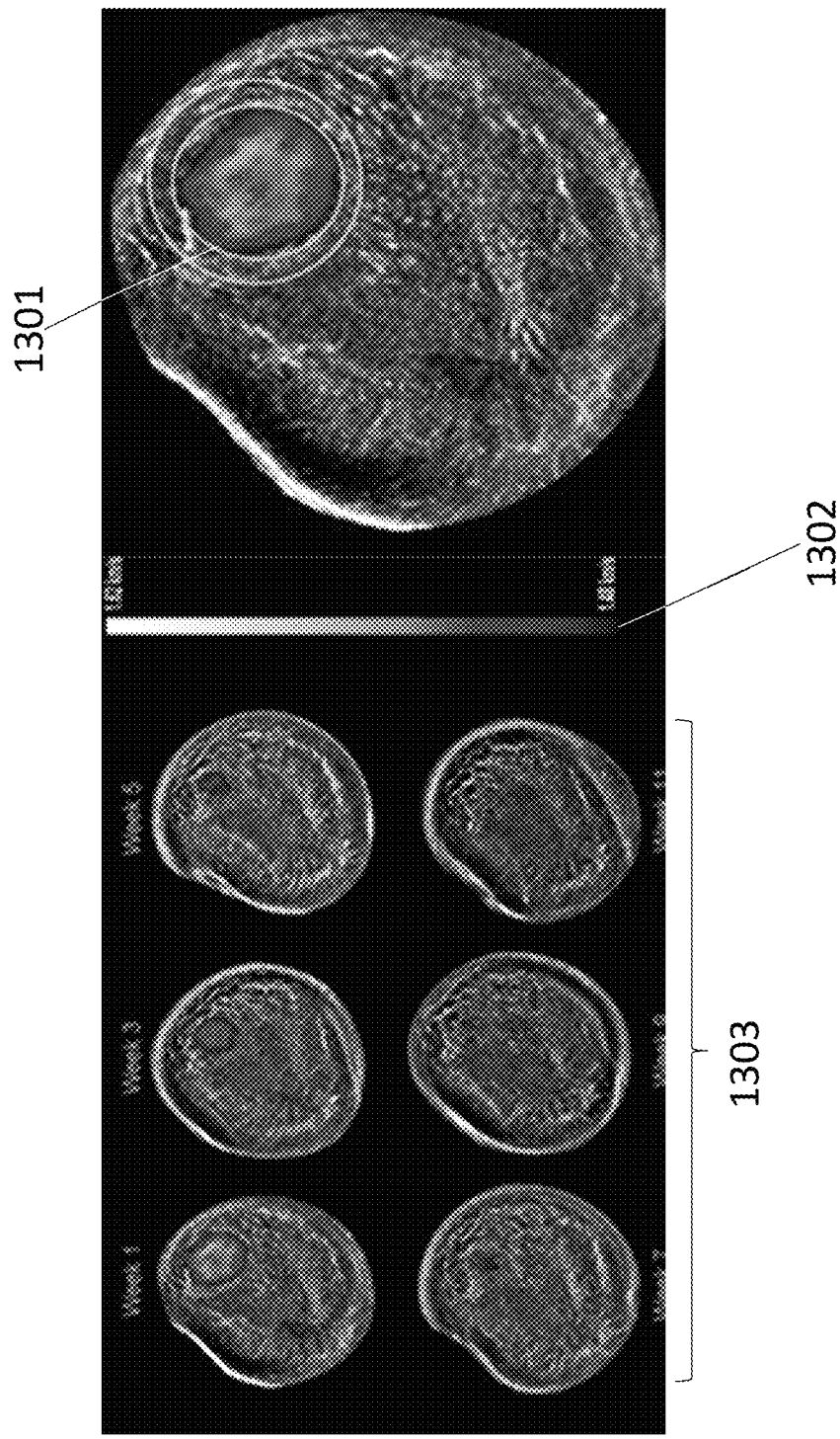
FIG. 13 shows overlays of UST sound speed images over reflection images for 6 time points during neoadjuvant chemotherapy of a responsive region of interest.

Relative sound speed measurements. (1) The volume of the tumor was calculated automatically through a pixel count of the segmented tumor images; 2) a peritumoral volume was calculated by defining a thin annulus (1 cm wide) using elliptical regions of interest 1301 in each image slice to define an annular region whose inner boundary enclosed the tumor and whose outer boundary defined the extent of the peritumoral region (FIG. 13) average tumor sound speed was calculated automatically by summing pixel sound speed values in the segmented tumor and dividing by the tumor volume; 4) the peritumoral region was assessed similarly; 5) the difference between the volume averaged tumor sound speed and its peritumoral region was used to determine the relative sound speed of the tumor 1302. Monitoring of a tumor over time can be seen in the figures on the left, 1303.

Characterization of time-dependent changes: 1) volume, and relative sound speed of the tumor were determined as a function of time for each patient; 2) these time-dependent response curves were characterized individually for each patient by fitting exponential functions of the form $V \sim \exp(-t/\tau)$. The exponential decay time, $\tau$, represents the time it takes for the tumor to change its V/VASS by a factor of 1/e (i.e. to 37% of its initial value). It was extracted from the best fit exponential curve to quantify the long term (entire course of treatment) response by fitting all the data while the short-term response was assessed by fitting exponentials to only the first 60 days of treatment. In addition to characterizing the response curves of individual patients, group responses were also evaluated. Patients were divided as partial responder's vs complete responders based on whether they achieved pathologic complete response (pCR).

The group averaged decay times were determined for both sound speed and volume. The significance of any differences in group values were assessed using t-tests.

Similarly, the group-averaged response curves for volume and relative sound speed were calculated. The curves were generated by first interpolating individual patient data into equal increments of 10 days and then averaging the data from all patients at those time points in the pCR and partial responder groups respectively. The error bars were calculated as standard errors of the mean from the average of all patient data at a particular time point within each group.

To determine any differences in the response curves, a Kolmogorov-Smirnov (KS) test was used. Differences were deemed significant if they formed 2 distinct trends with $p<0.05$.

Figure 14:
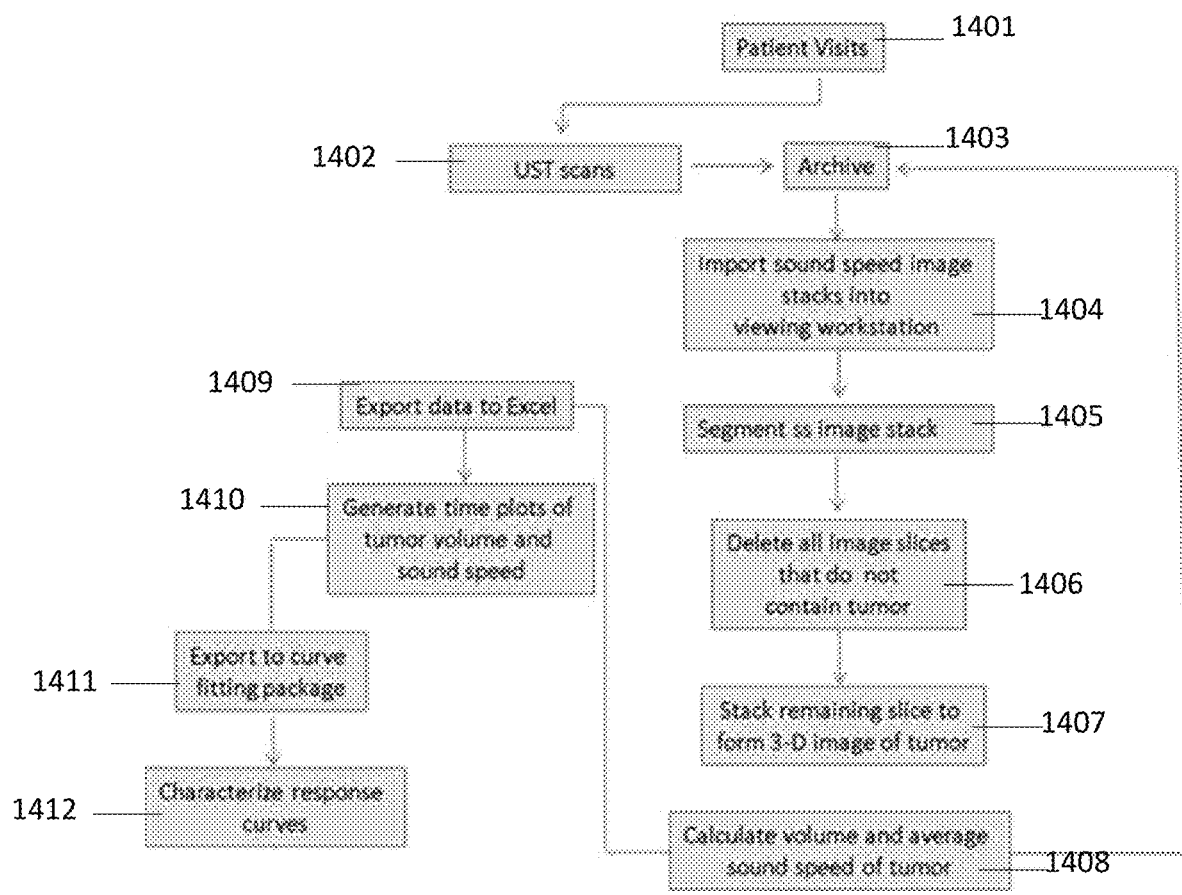
FIG. 14 an example data analysis workflow, in accordance with some embodiments.

The basic steps followed in this study, from data acquisition to prediction of response, are illustrated schematically in FIG. 14. At step 1401, a patient can undergo a UST scan 1402. In step 1403, the UST scan is then stored in an archive. In step 1404, a physician can import the sound speed image stacks into a viewing workstation from the archive. In step 1405, the sound speed image stack is segmented. In step 1406, the image slices without a tumor are deleted. In step 1407, the remaining images are used to form a 3-D image of the tumor. In step 1408, the volume and average sound speed of the tumor is calculated. In step 1403, the volume and average sound speed of the tumor is stored in the archive. In step 1409, the calculated volume and average sound speed of the tumor is exported to a program such as excel. In step 1410, the program is used to generate time plots of tumor volume and sound speed. In step 1411, the generated plots are exported to a curve fitting algorithm package. In step 1412, the program is used to characterize the response curves 1412.

Figures 15A, 15B:
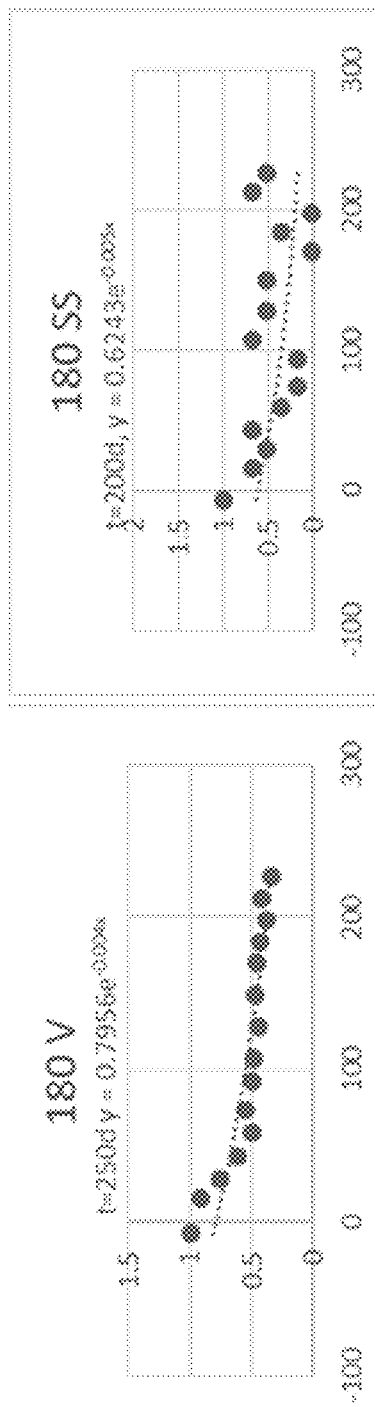
FIG. 15A shows an example of (left) volume change during a treatment plan and FIG. 15B (right) sound speed change during a treatment plan.

Examples of volume and sound speed time curves are shown in FIG. 15A and FIG. 15B. Each time curve shows the relative volume (volume divided by baseline volume–vertical axis) and relative sound speed (relative sounds speed divided by the baseline sound speed) as a function of time (shown in days on horizontal axis) for each chemotherapy and/or clinic visit. The results for the relative sound speed data are similarly shown. FIG. 15B also shows the fitted exponential function and the decay time in days. Table 5 summarizes the exponential decay times for the volume and sound speed responses for every patient in the study over (i) the entire course of their treatment and (ii) for the first 60 days of treatment. In addition to individual decay times for each patient, Table 6 also shows the group averaged decay times for the partial and complete responders respectively. Also noted are the number of case that exhibited negative decay times, when the tumor grew and/or hardened.

Figure 16B:
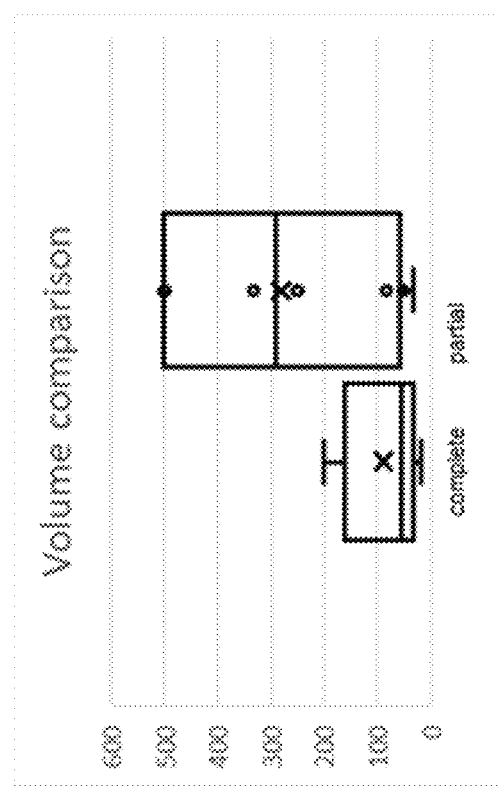
FIG. 16A shows an example of a box plot comparing volume change (left) and FIG. 16B shows sound speed change (right) during a treatment plan.

The various combinations of positive and negative changes are shown in Table 6 and Table 7. FIG. 16B shows a box plot comparing the decay times for the partial and completer responders.

TABLE 5

| Partial responders | Fit to all data | | Fit to first 60 days | |
|---|---|---|---|---|
| | Volume (days) $\tau v$ | Sound Speed (days) $\tau s$ | Volume (days) $\tau v$ | Sound Speed (days) $\tau s$ |
| 172 | 91 | 100 | 250 | 200 |
| 173 | 56 | 125 | −2000 | 333 |
| 180 | 250 | 200 | 83 | 71 |
| 252 | 45 | −222 | 34 | −19 |
| 297 | 333 | −111 | 333 | −37 |
| 320 | 250 | 1250 | 500 | −400 |
| 337 | 111 | 333 | −50000 | −147 |
| 338 | 71 | 100 | 59 | 250 |
| 339 | 111 | −106 | 53 | −59 |

| | Tumor shrinkage ($\tau v$) | Number of tumor growth cases | Tumor softening ($\tau s$) | Number of tumor hardening cases | Tumor shrinkage ($\tau v$) | Number of tumor growth cases | Tumor softening ($\tau s$) | Number of tumor hardening cases |
|---|---|---|---|---|---|---|---|---|
| Average partial responders | 146 | 0 | 351 | 3 | 187 | 2 | 214 | 5 |
| | Shrunk and softened = 6/9 (66%) | | | | Shrunk and softened = 3/9 (33%) | | | |

| Complete responders | | | | | | | | |
|---|---|---|---|---|---|---|---|---|
| 152 | 20 | | 12 | | 20 | | 12 | |
| 258 | 91 | | 40 | | 56 | | 15 | |
| 259 | 91 | | 125 | | 45 | | 59 | |
| 324 | 333 | | 2000 | | 200 | | 67 | |
| 334 | 200 | | −476 | | 125 | | 111 | |

| | Tumor shrinkage ($\tau v$) | Number of tumor growth cases | Tumor softening ($\tau s$) | Number of tumor hardening cases | Tumor shrinkage ($\tau v$) | Number of tumor growth cases | Tumor softening ($\tau s$) | Number of tumor hardening cases |
|---|---|---|---|---|---|---|---|---|
| Average complete responders | 147 | 0 | 544 | 1 | 89 | 0 | 53 | 0 |
| | Shrunk and softened = 4/5 (80%) | | | | Shrunk and softened = 5/5 (100%) | | | |

When fitting exponentials to data from the entire course of treatment, it was found that all patients exhibited tumor shrinkage with an average decay time of 146+103 days for the partial responders and 147+123 days for the complete responders, indicating no statistical difference between them. In the case of sound speed, 3 of the 9 partial responders exhibited an increase in sound speed while 1 out for the 5 complete responders showed an increase. Of those with declining tumor sound speeds, the average decline time was 351+449 days for partial responders and 544+971 days for complete responders (p=0.4). These results suggest that there is no meaningful difference in decline times between the two groups with the sound speed declines showing an extremely large range of values.

TABLE 6

Positive and negative changes for partial responders.

| Partial | $\Delta V > 0$ | $\Delta V < 0$ |
|---|---|---|
| $\Delta SS > 0$ | 1 | 4 |
| $\Delta SS < 0$ | 1 | 3 |

It was noted that changes in volume and sound speed begin to level off after about 60 days, which biases the exponential fits to larger values of t when the larger time points are used.

TABLE 7

Positive and negative changes for complete responders.

| Complete | $\Delta V > 0$ | $\Delta V < 0$ |
|---|---|---|
| $\Delta SS > 0$ | 0 | 0 |
| $\Delta SS < 0$ | 0 | 5 |

Figure 16A:
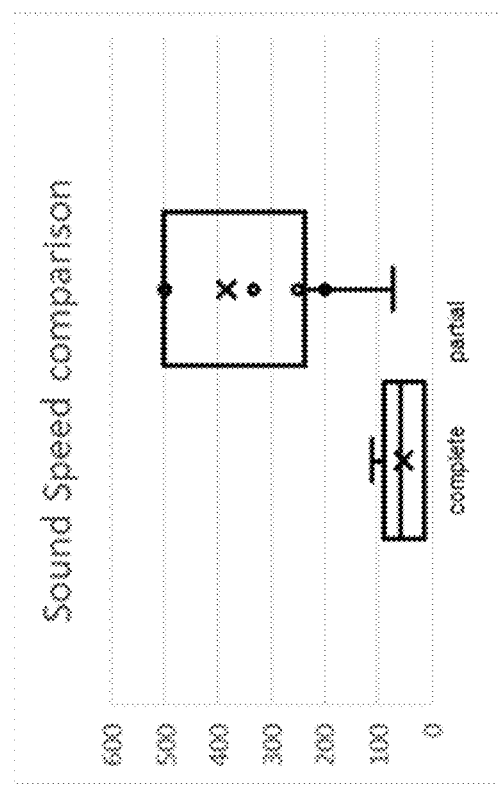

Since the primary goal of this study was to discern changes early in the treatment cycle, the analysis was repeated by fitting exponentials only to the data corresponding to the first 60 days of treatment. Inspection of Table 5, shows that, indeed, the decline times showed a different behavior. Two of the 9 partial responders showed an increase in tumor volume in the first 60 days while none of the complete responders did. For those with declining volumes, the tumor shrinkage was characterized by an average decline time of 187+179 days for the partial responders and 89+73 days for the complete responders, a marginally significant difference (p=0.1). The box plot in FIG. 16A and FIG. 16B shows the two distributions. In the case of sound speed, 5 of the 9 partial responders exhibited an increase sound speed while none of the 5 complete responders showed an increase. Of those with declining tumor sound speeds, the average decline time was 214+110 days for partial responders and 53+41 days for the complete responders, a statistically significant difference (p<0.05). The box plot in FIG. 16A and FIG. 16B shows the two distributions. The combination of positive and negative tumor changes is summarized in Table 6 and Table 7. Inspection of Tables 5-7 suggest that sound speed offers greater discriminatory power than volume and that when both decline the complete responders are well differentiated from the partial responders.

Figures 17A, 17B:
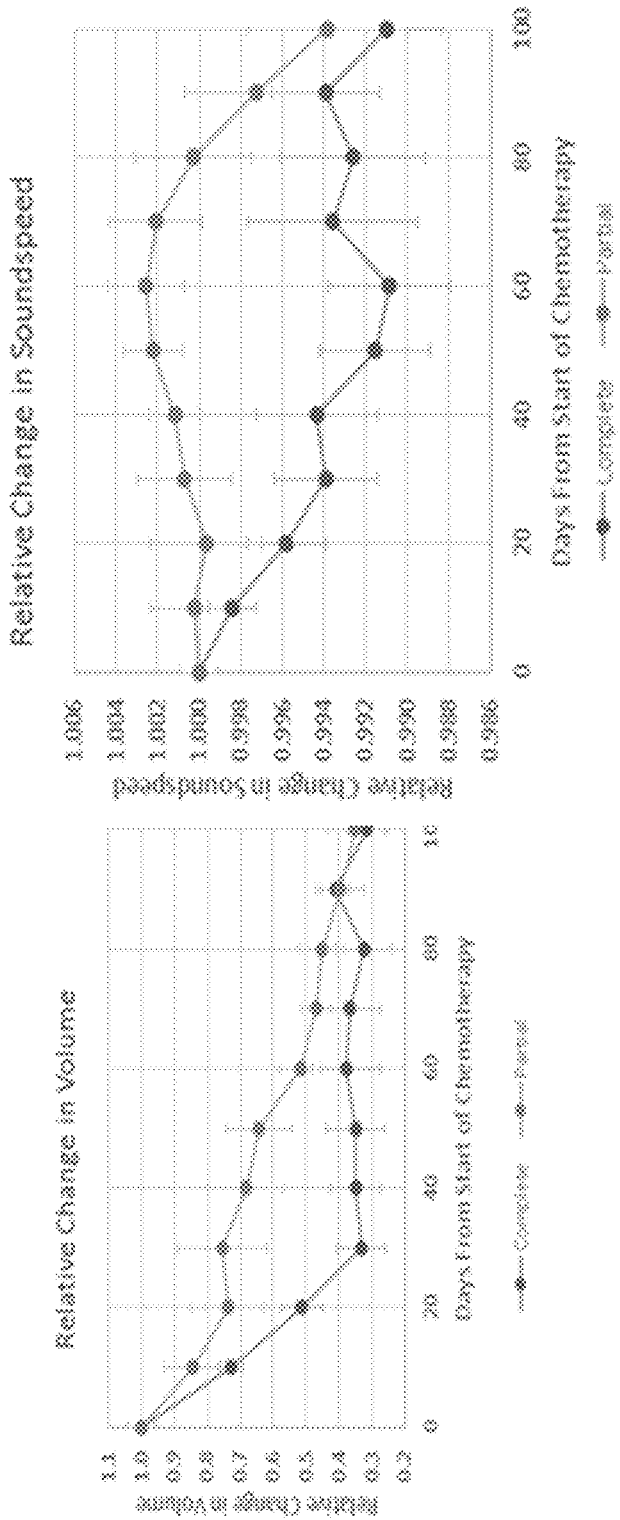
FIG. 17A shows an example of (left) a change in relative tumor sound speed (VASS) and FIG. 17B (right) a change in relative sound speed during a treatment plan.

The group averaged response curves for volume data are shown in FIG. 17A. The light grey data points represent the average, tumor volume relative to baseline for all patients who did not achieve pCR. The dark grey data points represent the complete responders. Similarly, the group averaged tumor sound speed data are shown in FIG. 17B. To assess the statistical significance of the above differences in response, we performed a KS test (see, http://www.physics.csbsju.edu/stats/KS-test.html, which is incorporated herein by reference). The complete and partial response groups were determined to be statistically different. The volume distributions were distinct at p=0.047 and the sound speed data were distinct at p=0.003.

The results presented demonstrate that almost all patients exhibited some degree of response as measured by declines in tumor volume and/or tumor sound speed. In contrast to the long-term data (Table 5), the short-term data show a significant difference between the partial response and compete response groups. The latter result suggests that patients with quick initial responses in both volume and sound speed are more likely to belong to the group that achieved pCR.

The empirically observed decline in tumor sound speed is likely to be associated with the changing biomechanical properties of the tumor in its response to the chemotherapy. The speed of sound, c, and breast tissue density, p, are linearly correlated, such that c (km/s)=1.12 ρ (g/cm3)+0.39. If this relationship applies to tumors, it is biologically plausible that measured changes in sound speed may be driven by changes in tumor density which would be analogous to tumor assessment by palpation.

Figure 18:
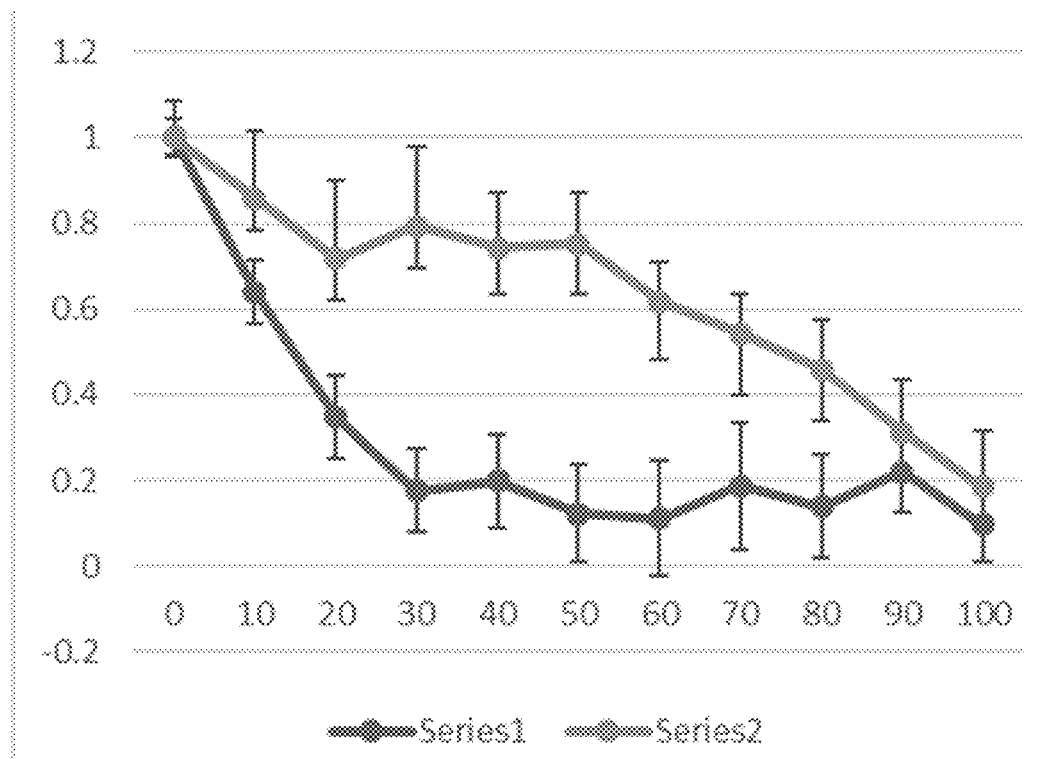
FIG. 18 shows an example of a change in the product of volume (V) and volume averaged sound speed (VASS) (V×VASS) during a treatment plan.

Inspection of the two independent volume and sound speed trends shown in FIG. 17A and FIG. 17B suggests that the combination of both trends may increase the differentiation of the two groups. We defined a new parameter (UST-c) that represents a multiplication of the volume and sound speed values. The results are shown in FIG. 18. Complete responders show a faster initial response compared to partial responders. Differences arise rapidly in early phases of treatment (first 2 weeks), begin to level off at 30 days and reach their peak at around 50 days. The responses of the two groups are significantly different (p=0.012)

Comments from KCI oncologists suggest that an early prediction of non-response would allow them to (1) send the patient off to surgery for more definitive treatment if the tumor is not responding to NAC, and (2) identify disease progression early in order to quickly alter regimen or send the patient to surgery right away. Non-response or tumor progression would thus lead oncologists to either adopt an alternate NAC regimen or move up the time of surgery before any further disease progression occurs. In pursuit of such considerations, we hypothesize that the combined rate of declines of tumor volume and sound speed can predict nonresponse (including progression) early in the treatment process (FIG. 18). The hypothesis is motivated by our encouraging preliminary results and by the results from MRI and PET as documented in the literature by us and other groups. The hypothesis will be tested in a future study by grouping patient outcomes and using ROC analysis to determine how early and how accurately non-response can be predicted.

The long-term goal is to provide a safe, cost-effective and comfortable imaging strategy to measure locally advanced breast tumor response to neoadjuvant chemotherapy (NAC), to predict clinical and pathologic response (pCR) early in the treatment process. This new resource for end users would be enabled by the safe (radiation free), fast, repeatable and frequent measurements that provide a practical low-cost method for informing clinical decision making.

Example 5

We evaluated repeated measures of the volume averaged sound speed (VASS) biomarker in response to tamoxifen therapy in a case-control study. We recruited 74 participants referred by a health professional to undergo tamoxifen therapy (cases) and 150 controls with no history of breast cancer in Detroit, MI. Controls were matched to cases on age, race, and menopausal status. Cases were imaged at baseline, 3 months, 6, months, and 12 months post-tamoxifen initiation. Controls were imaged at baseline and 12 months.

Figure 19:
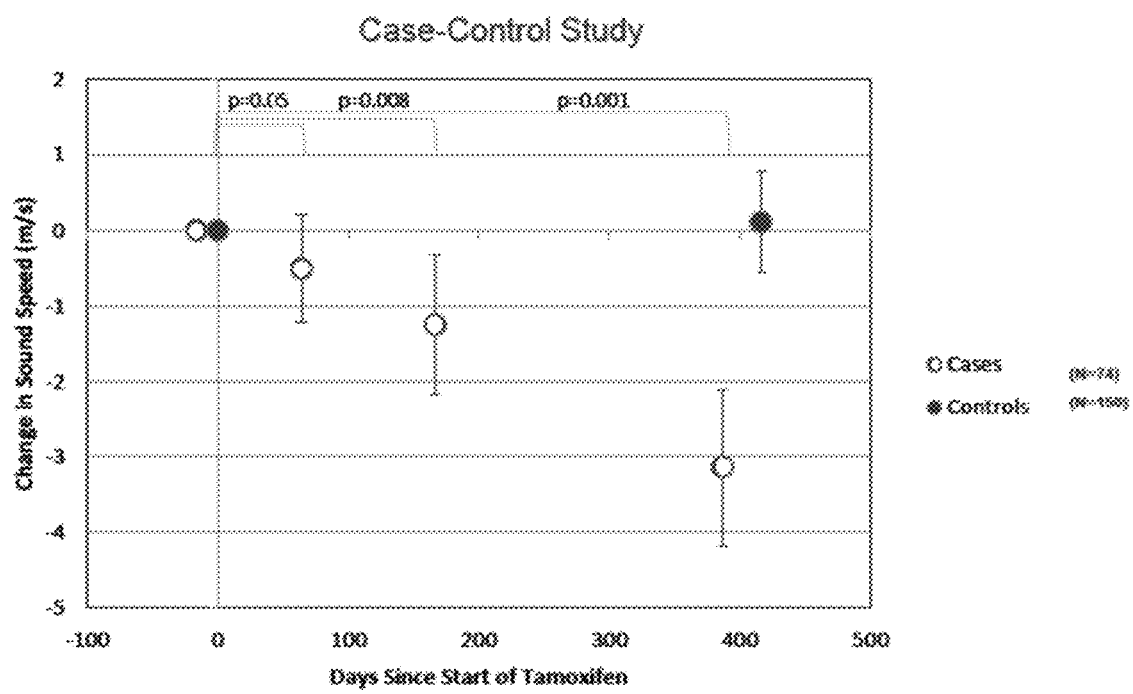
FIG. 19 shows results of the case-control study of Example 5.

FIG. 19 shows results of the case-control study. The change in volume averaged sound speed in cases and in controls are shown as a function of time.

FIG. 20 shows a summary of correlation between Tamoxifen Metabolites and 12-month change in volume averaged sound speed. VASS shows a rapid and statistically significant decline over a 12-month period post-initiation of tamoxifen therapy. VASS was stable in matched controls over the same time period. Change in VASS may be a potential surrogate marker of treatment response. The experiment demonstrates a role for monitoring VASS in clinical management to discriminate tamoxifen responders from non-responders.

Whole Breast Stiffness Characterization

Example 6

Materials and Methods Summary-Patients with findings on mammography during the time period of January 2017 to November 2018 were scanned with SoftVue. Patients were selected on the basis of having either palpable or visible masses by standard breast imaging evaluation prior to biopsy. Notable exclusion criteria were age <18, body weight >350 pounds (i.e., SoftVue scanning table projected limit), inability to give informed consent, inability to lie prone on the UST table, and any open sores or wounds on the breast precluding immersion into the UST water bath for their own safety (i.e., sanitized water is exchanged by the system between each patient). Pathology and/or radiology reports were used as the ground truth for verifying lesion type, which included 240 masses <1.5 cm in size, (79 cancers, 88 fibroadenomas, 52 cysts and 21 other benign findings). Lesion localization and UST assessments were provided by a board-certified breast radiologist. UST stiffness measurements by SoftVue extracted information on the tissue bulk modulus which was then converted to an index of relative tissue stiffness (from 0=very soft to 1=extremely stiff) and grouped by K-means clustering into three percentage groups (i.e., soft, intermediate and stiff). Additionally, the mean homogeneity of the stiffness was calculated for each mass using the Gray-Level Co-Occurrence Matrix (GLCM) approach.

Total breast volume for each patient first included underlying masses that were then subtracted from the total volume, as well as their mass stiffness sub-volumes to initially assess the impact on whole breast distributions. In subsequent graphic analysis, masses were not excluded from the total breast volume because they showed minimal contribution to the overall breast volume stiffness distribution due to their small mass volume compared to the total breast volume of this series (i.e., average breast vol.=737 cc, compared to the average tumor volume=1.1 cc). Conversion of mass surface area to volume were noted for each mass's region of interest. Mass volume estimates were derived from the mass size measurements, d1 and d2 of the traced ROI, then assuming a spheroid volume calculation:

$$V=\pi/6[d_1 * d_2 * L],$$

where L was the average of the ROI diameters. This volumetric approach was used to avoid the potential inaccuracies of planimetry volume techniques (i.e., summation of hand-trace surface area contours at each slice associated with multiple splices spaces ~2.5 mm rather than using the submillimeter coronal plane resolution.) The SoftVue UST Operating Parameters were as can be seen in Table 11.

TABLE 11

| SoftVue UST Operating Parameters | |
|---|---|
| Number of transducer elements | 2048 |
| Maximum breast diameter | 22 cm |
| Anatomic coverage-visualized | Pectoralis muscle to nipple |
| Operating frequency | 3 MHz |
| imaging resolution (volume) | 0.8 × 0.8 × 2.5 mm |
| Data acquisition time per breast | ~2 min. |
| Reconstruction time per slice | 4 sec. |
| Patient throughput (projected) | 4/hr. |
| Radiologists review time (~complexity) | 2-4 min. |
| #Slices per stack (~breast size) | ~30-60 |
| Image stacks-type: | Reflection |
|  | Sound Speed |
| (SS-corrected Reflection) | Water |
| (SS + ATT overlaid on Reflection) | Stiffness Fusion |

Figure 33:
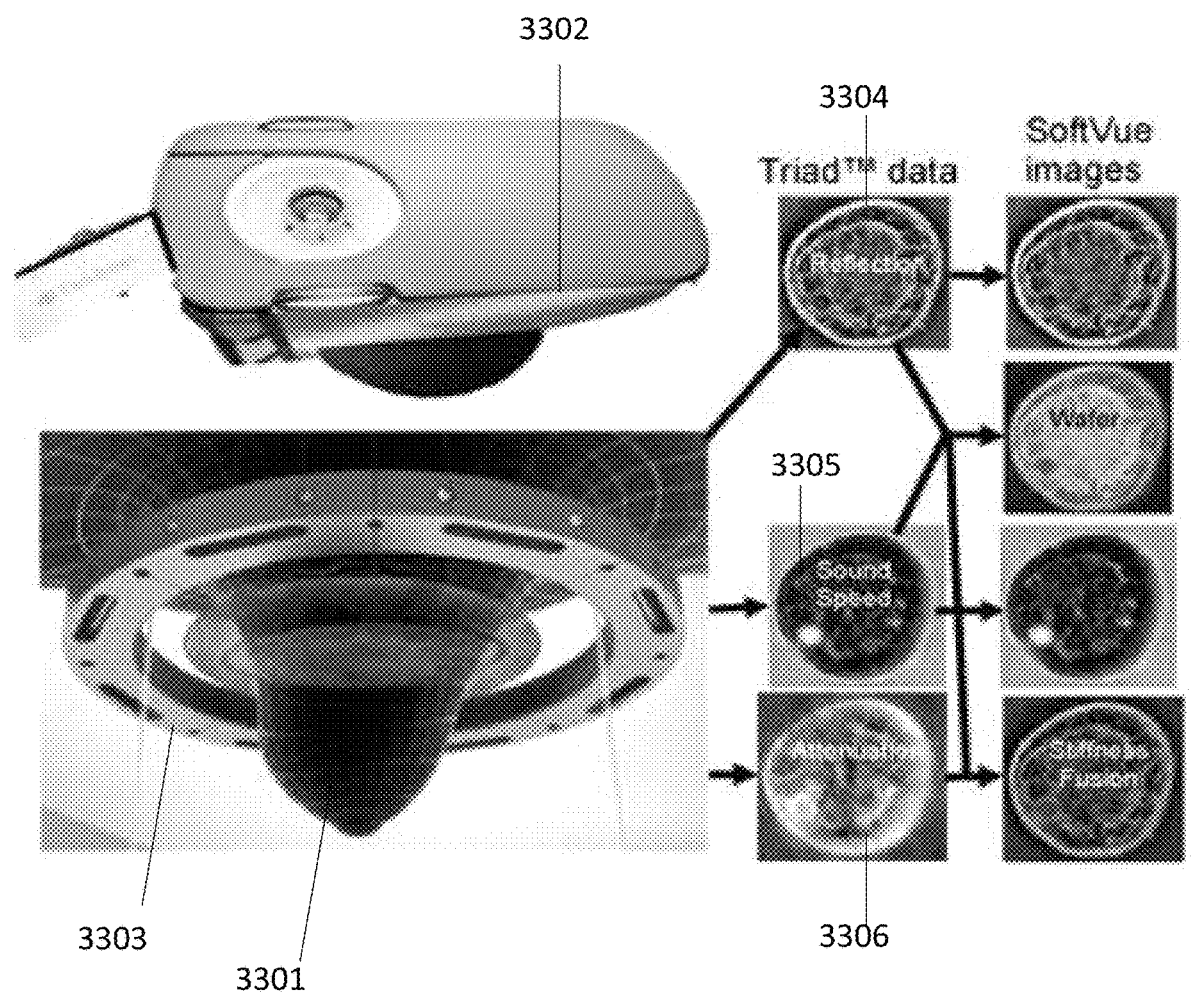
FIG. 33 shows an example of an imaging device use to produce reflection, sound speed, and attenuation data.

Image acquisitions were performed in the coronal plane with the clinically relevant performance parameters of Table 11. As can be seen in FIG. 33, a patient lies prone with their breast 3301 extended in a water bath 3302 while a ring array 3303 scans from chest wall to nipple producing coronal acquisitions of reflections 3304, sound speed 3305 and attenuation 3306 data. Reconstructions for clinical review produced four SoftVue image stacks: reflection, sound speed, waveform enhanced reflection (wafer; a sound speed-corrected reflection image with reduced contrast from fat) at a stiffness fusion image stack consisting of mapping of stiffness measurements overlaid upon reflection.

All patients received informed consent for participation in the clinical arm of a multicenter dense breast screening trial. 208 patients with clinical breast findings (i.e., palpable or mammographic abnormalities) separate from the screening arm were evaluated by whole breast UST (i.e., SoftVue by Delphinus Medical Technologies, Inc; Novi Michigan). A total of 298 masses were noted within 239 individual breasts from 206 patients. The 298 breast masses consisted of 78 cancers, 105 fibroadenomas, 91 cysts, and 24 other benign findings. The 24 other benign findings contained mixed histologic findings of focal fibrosis (N=5), fibrocystic changes (N=4), atypical ductal hyperplasia (N=2), pseudo-angiomatous stromal hyperplasia (N=2) and other singular findings. Average tumor diameter was larger for cancers as compared to fibroadenomas and cysts (1.3 cm, 1.1 cm, and 1.0 cm respectively, p=0.007 ANOVA). All masses were biopsy-confirmed by subsequent or prior histology, unless considered as a characteristic cyst by standard ultrasound (US) evaluation, then separated according to size (1.5 cm) (Table 8). The majority of patients had heterogeneously dense breasts (N=133 or 64.6%) or extremely dense (N=55, or 26.7%) noted by mammography. Patients with suspicious masses were included from women noted to have scattered breast density (N=18 or 8.7%) in order to better sample cancers for mass characterization. Available data from the 78 cancers showed their breakdown as: invasive ductal carcinoma [IDC; N=60, containing 1 mucinous, 1 papillary, 2 IDC with ductal carcinoma in situ (DCIS)], invasive lobular carcinoma (N=10), invasive mammary (N=2), and DCIS alone (N=2). Multicenter consensus review of additional pathologic features, such as hormonal markers, was not currently available with the trial database. The relatively small number of cancer subtypes precluded significant sub-analyses.

TABLE 8

| Finding | Count | <1.5 cm | >1.5 cm |
|---|---|---|---|
| Cyst | 91 | 79 | 11 |
| Fibroadenoma | 105 | 88 | 18 |
| Cancer | 78 | 52 | 26 |
| Other benign | 24 | 21 | 3 |
| Totals | 298 | 240 | 58 |

Qualitative Tumor Locations

The four-quadrant anatomic distribution (Table 13) showed significantly greater cancer occurrence of 43.6% (34/78) within the upper outer quadrant compared to the other quadrants (chi-squared, p=0.001). Similarly, 37.1% (39/05) of fibroadenomas and 42.9% (39/91) of cysts were also more commonly seen in the upper outer quadrant (Chi squared p=0.003 and p=1×10$^{-5}$, respectively), such that no significant trend was noted separating tumor types in the upper outer quadrant (p=0.66). All tumors were at least commonly located in the lower inner quadrant.

TABLE 13

| | FGI Tissue Locations | | | | Anatomic Quadrants | | | | |
|---|---|---|---|---|---|---|---|---|---|
| | At FGI | In Fibro-glandular | In Fat | Totals | Upper Outer | Upper Inner | Lower Outer | Lower Inner | Totals |
| Cancer | 74 | 0 | 4 | 78 | 34 | 17 | 17 | 10 | 78 |
| Fibroadenoma | 66 | 37 | 2 | 105 | 39 | 25 | 29 | 12 | 105 |
| Cyst | 33 | 98 | 0 | 91 | 39 | 15 | 29 | 8 | 91 |
| Other Benign | 21 | 3 | 0 | 24 | 7 | 6 | 6 | 5 | 24 |
| Totals | 194 | 96 | 6 | 298 | 119 | 63 | 81 | 15 | 298 |

Figure 37:
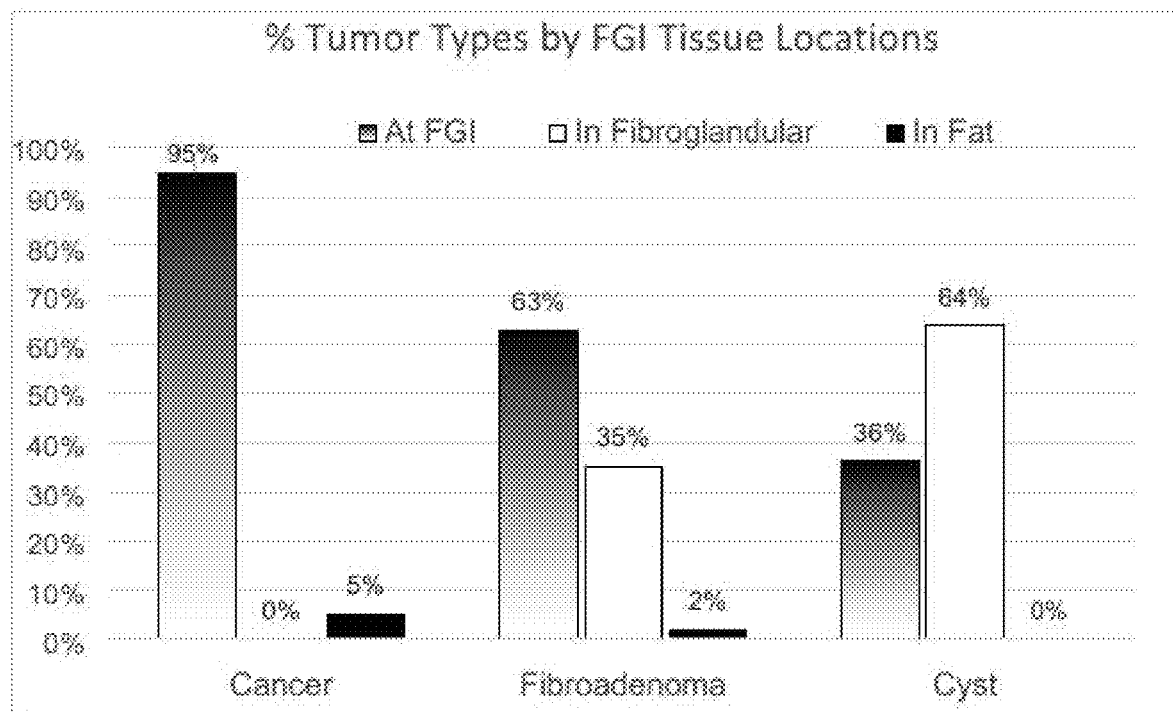
FIG. 37 shows a graph of tissue locations for identified tumor types in which significant opposing trends are noted for masses at the interface of fat tissue and fibroglandular tissue (FGI).

Cancers were visually classified at the FGI in 94.9% (74/78) of cases which was highly significant compared to being completely surrounded by fat or fibroglandular tissue (chi-squared, p=1.2×10$^{-29}$). For benign masses at the FGI, 62.9% (66/105) of fibroadenomas and 36.3% (33/91) of cysts occurred there (p=1.8×10$^{-13}$ and p=7.6×10$^{-13}$ respectively). Moreover, 63.7% (58/91) of cysts and 25.0% (37/105) of fibroadenomas were fully surrounded by dense tissue, which was much more than cancers (0%=0/78) with those opposing trends best visualized in FIG. 37. Few cancers, fibroadenomas or cysts were completely surrounded by fat (i.e., 5.1%, 1.9%, and 0%, respectively). Overall, cancers had a different distribution relative to the FGI location compared to benign histologies (p=2.7×10$^{-16}$). Using cancer location for possible test performance criteria (Table 13) showed that the FGI had ~95% sensitivity (i.e., TP/(TP+FN)=74/78) and ~38% positive predictive value (i.e. PPV=TP/(TP+FP)=74/120) which were both higher than the upper outer quadrant having ~44% sensitivity (34/78) and 29% PPV (34/85). For any particular anatomical location, there was no preferred FGI location (p=0.19).

Figure 21:
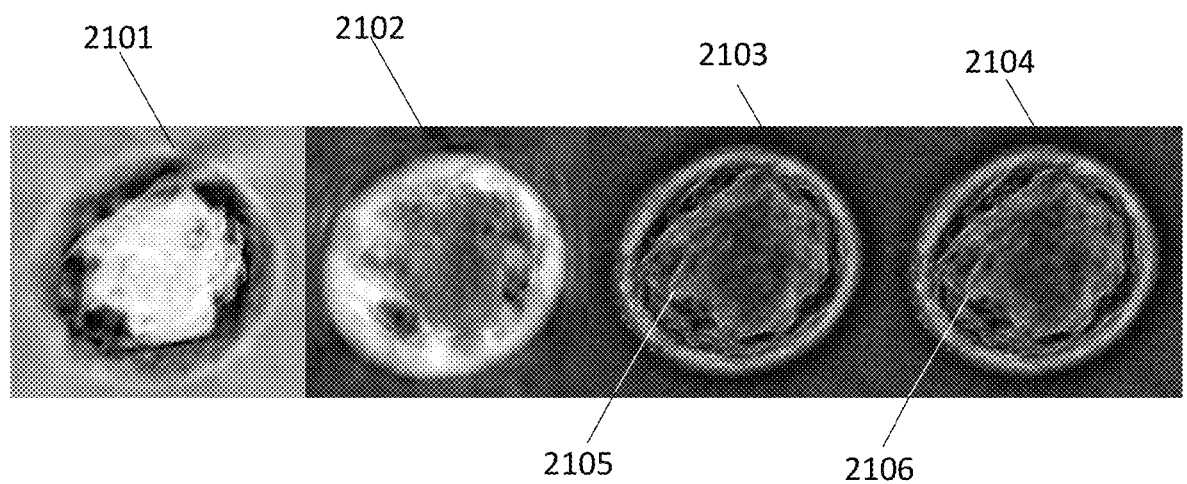
FIG. 21 shows the multimodality ultrasound tomography images from a woman with dense breasts: sound speed (left), attenuation (left-middle), unfiltered Stiffness Fusion and spatially filtered Stiffness Fusion.

FIG. 21 shows various images modalities of a patient with dense breast tissue. Combined value of stiffness fusion-Patient with extremely dense tissue shows the relative extent of bright fibroglandular tissue, nearly filling the Sound Speed image 2101 (left). The vast majority of the high SS dense parenchyma showed very little attenuation 2102 (mid-left), making it difficult to assess their combined effect. However, the Stiffness Fusion images unfiltered 2103 (mid-right) and filtered 2104 (right) combine sound speed and attenuation without and with spatial filtering, respectively, allowing a simplified localization of relative tissue stiffness. Namely, the limited amount of stiff fibroglandular tissue corresponds to an anatomic Cooper's peak at the 8 o'clock junction of fat and fibroglandular tissue 2105/2106 Conversely, the majority of high SS parenchyma 2101 (left) corresponds with low "water-level" ATT 2102 (mid-left) and thus "soft" parenchyma at low risk 2104 (i.e., right; dark grey). Most smaller cancers appear red on consecutive stiffness fusion images near the junction of parenchyma and fat, thereby excluding a large majority of dense parenchyma evaluation. The focal stiffness at 8:00 showed no associated suspicious mass on SS or reflection.

The principles of UST allow multi-parametric comparisons of image stacks, derived from algorithms producing representative data from Reflection, SS, ATT, and a surrogate of bulk modulus, called Compressibility imaging, using filtered and/or unfiltered Stiffness Fusion images. FIG. 21 demonstrates a patient with extremely dense breast parenchyma. For visualizing stiffness, visual comparison between SS and ATT images alone is problematic, whereas rapid visualization of focal stiffness within dense parenchyma emerge with Compressibility imaging. FIG. 21 also shows two versions of stiffness images (2103/2104 and 2103/2104). While it is impressive how little of the dense parenchyma reaches the higher stiffness range (i.e., red), this this view also allows for mitigation of peripheral, high attenuation skin and fat layer.

Figure 35:
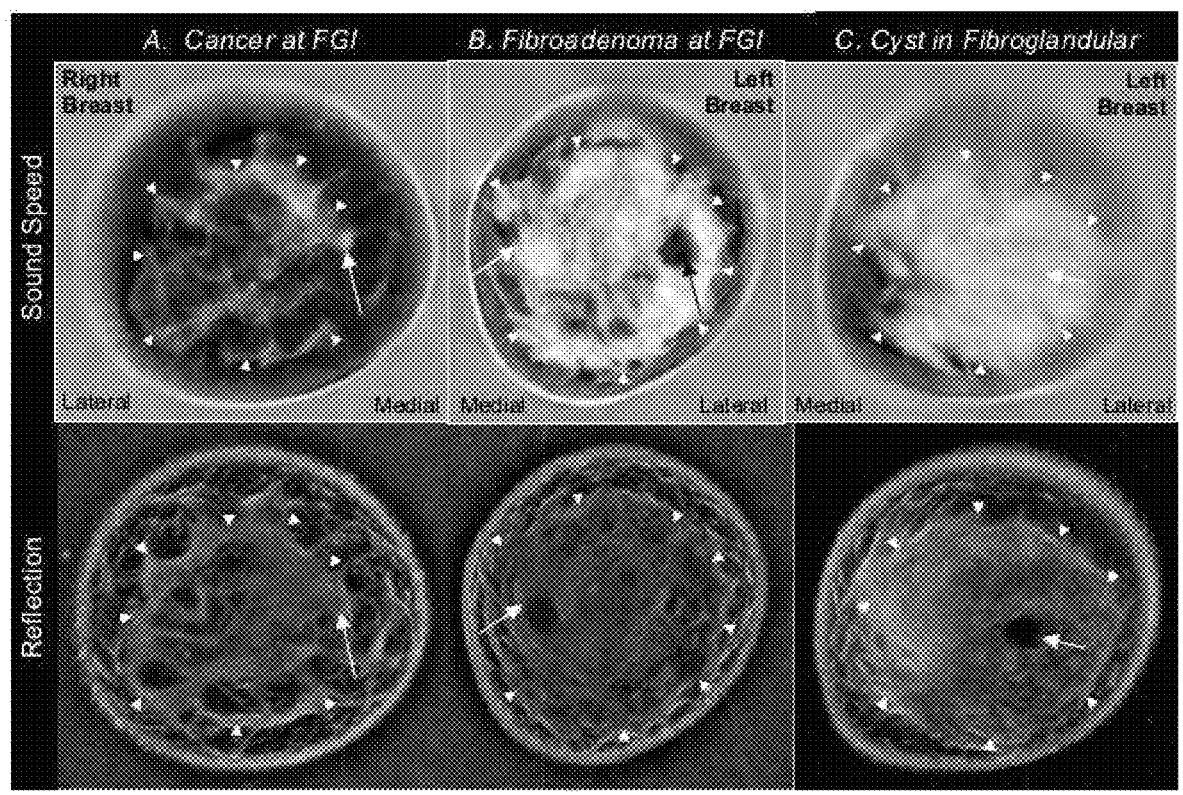
FIG. 35 shows an example of ultrasound tomography images from three women with dense breast parenchyma.

FIG. 35 shows qualitative locations of a cancer, a fibroadenoma, and a cyst using UST sound speed (top row) and reflection (bottom row) images. Arrowhead indicate the interface of fat tissue and fibroglandular tissue (FGI) and masses are indicated by white arrows. Column A shows sound speed and reflection images of a breast of a 45 year old woman with heterogeneously dense breast parenchyma and a mildly spiculated 0.7 cm cancer in the right upper inner quadrant at the FGI which is best seen in the sound speed image (top left; arrow) and ill-defined in the reflection image (bottom left; arrow). Column B shows sound speed and reflection images of the breast of a 52 year old woman with extremely dense breast parenchyma and a 1.6 cm fibroadenoma in the left lower inner quadrant at the FGI (white arrow denotes abutting fat on a small margin-top middle) which is more conspicuous in the reflection image (bottom middle). A black arrow shows a fat lobule surrounded by parenchyma (top middle). Column C shows sound speed and reflection images of a 40 year old woman with extremely dense breast parenchyma and a left 1.5 cm simple cyst, best seen in the reflection image (bottom right) and obscured by the diffuse white parenchyma in the sound speed image (top right). The upper sound speed image shows refraction artifacts blurring the upper and lateral skin margins, compatible with its posterior level as the breast extends toward the axilla, seen only as a thicker skin line in the reflection image (bottom right).

Quantitative Tumor Locations

Mean quantitative sound speed and percent fibroglandular tissue were grouped according to mass type for the tumoral and peritumoral regions in Table 14.

TABLE 14

| | | Mean TumorSS (m/s) | Mean Peritumor SS (m/s) | Tumor to Peritumor SS Difference (m/s) | Tumor to Peritumor SS Ratio | Mean Tumor PFG (%) | Mean Peritumor PFG (%) |
|---|---|---|---|---|---|---|---|
| Mass Type | Cancer | 1525.8 | 1476.7 | 50.1 | 1.034 | 83.5 | 47.1 |
| | Fibroadenoma | 1534.3 | 1495.8 | 38.6 | 1.026 | 92.5 | 65.3 |
| | Cyst | 1535.5 | 1517.7 | 17.8 | 1.012 | 94.3 | 84.0 |
| | Benign | 1526.7 | 1486.3 | 40.4 | 1.027 | 81.7 | 53.2 |
| | p-value | 0.073 | 1.0E−15 | 6.5E−24 | 4.7E−24 | 8.2E−05 | 2.0E−13 |

Figure 38:
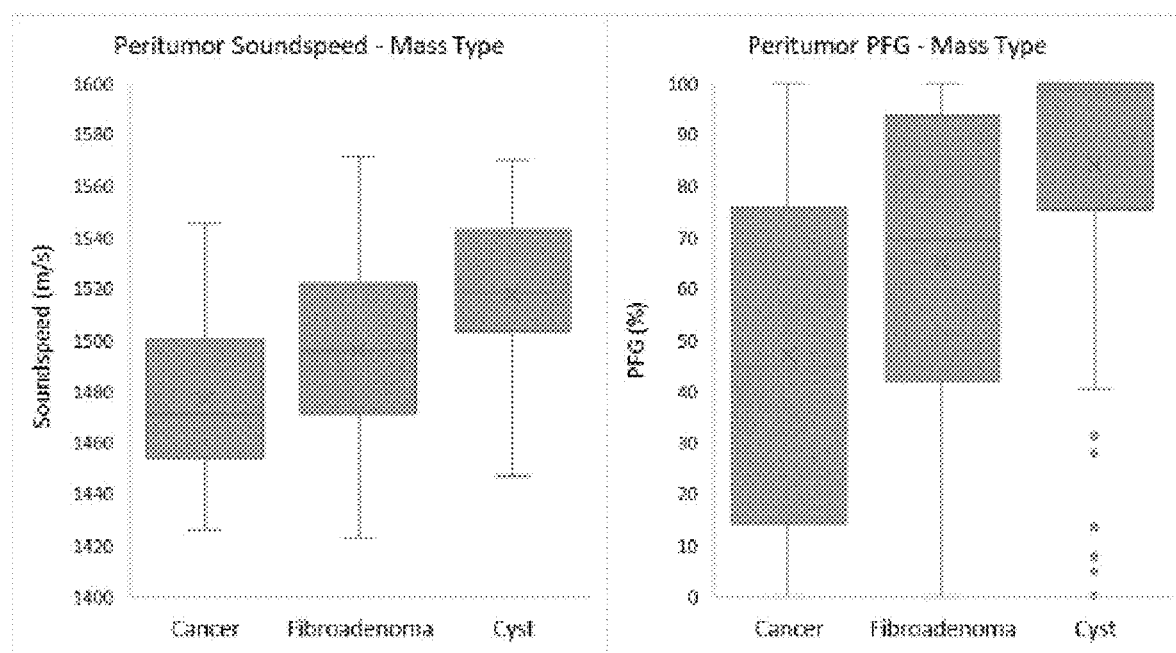
FIG. 38 shows boxplots of the quantitative mean peritumoral sound speed (left) and percent fibroglandular tissue (PFG, right).

The peritumoral region of cancers had the lowest mean sound speed and percent fibroglandular tissue (1477 m/s and 47.1%) whereas cysts had the highest values (1518 m/s and 84.0%) and fibroadenomas were intermediate (1496 m/s and 65.3%). These quantitative results support the qualitative location results and were indicative of cancers at the FGI being surrounded by both fatty and dense tissue while cysts were more frequently surrounded by dense tissue. Considering all masses, those located at the FGI had lower mean peritumoral sound speed and percent fibroglandular tissue than masses located in dense tissue (1484 m/s vs. 1524 m/s, $p=2.1 \times 10^{-26}$; and 53.3% vs 90.7%, $p=1.4 \times 10^{-23}$, respectively). Boxplots of the peritumoral sound speed and percent fibroglandular tissue grouped by mass type are seen in FIG. 38. Although there is overlap between cancers and fibroadenomas, in particular the median peritumoral percent fibroglandular tissue for cysts and cancers are 98.5% and 44.7% respectively. The majority of the cysts are thus almost entirely surrounded by dense tissue, while cancers are surrounded more by fat.

Results

Details of UST quantifying whole breast volumes of dense and non-dense tissue components has been described. However, the relative distribution of their stiffness subcomponents has not been assessed until now. Since this series includes different mass types, the overall volume stiffness distribution was considered with and without each mass' volume distribution. Once the proportions of the masses were subtracted from the total stiffness volume distributions, additional occurrences of the different mass types within the parenchymal patterns was considered, as below. Cysts were more likely to be multiple throughout the breast, but only a few were considered representative for mass evaluation, such that not all cyst stiffness contributions were subtracted from the overall volume. This was deemed appropriate since cysts had minimal higher stiffness contributions relative to the total volume.

Compressibility Imaging (i.e. stiffness fusion) image sets were reviewed for all patients, encompassing the whole breast (i.e., Food and Drug Administration ref), including masses encountered in this clinical arm. UST stiffness measurements by SoftVue extracted information on the tissue bulk modulus which was converted to an index of relative tissue stiffness (from 0=very soft to 1=extremely stiff). While UST stiffness is a quantitative measure, the absolute value (i.e., no actual stiffness units, such as Pascals or m/sec) introduced unnecessary uncertainty and made relative stiffness within each patient's breast more appropriate to localize relative stiffness categories. Thresholds for 3 levels of relative stiffness (i.e., stiff, intermediate and soft) were selected by K-means clustering techniques for volume averaged sound speed, then applied to the whole breast image stacks.

The 3 levels of stiffness were then analyzed according to their associated volumes in relation to extent and distribution of the volume averaged sound speed (VASS), generating volumes of average stiffness (VAStiff), intermediate (VAInter), and soft tissue (VASoft). These stiffness distributions were calculated for each patient and then reported as an average percentage for all patients.

Total breast volume for each patient first included underlying associated masses that were subtracted from the total volume, as well as their mass stiffness sub-volumes. Following a similar volumetric distribution of the masses noted below, their individual separate volumes were subtracted from their corresponding distributions within the total breast volume. Conversion of the surface area to volume are noted below for each mass's region of interest. The relative occurrence of the different breast masses was then assessed within the six different, non-mass breast volumes of: stiff, intermediate and soft distributions within both dense and non-dense total breast tissue.

Stiffness proportions of dense and non-dense breast tissues (i.e., fibroglandular/stromal and fat) were assessed. Also, qualitative observations of tissue type and location by the breast radiologist were noted, thereby providing more anatomic context than the simple relative volume distributions that are the focus of this paper. These observations were noted to provide anatomic localization of fat/parenchymal patterns, especially as they related to stiffness distributions for both the whole breast and their associated locations of target masses (fat-glandular interface, see Kim W H, Li M, Han W, Ryu H S, Moon W K. The spatial relationship of malignant and benign breast lesions with respect to the fat-gland interface on magnetic resonance imaging. Nature Sci Rep. 2016 Dec. 14; 6:39085, and Zhu W, Harvey S, Macura K J, Euhus D M, Artemov D. Invasive breast cancer preferably and predominantly occurs at the interface between fibroglandular and adipose tissue. Clin Breast Cancer 2017; 17 (1): e11-e18.). Using sound speed thresholding, the peritumoral region could be segmented into fibroglandular/stromal tissue and fat, thereby also quantifying the location of a cancer arising more frequently at the fat-glandular interface, whereas cysts were much more likely to be surrounded by fibroglandular tissue. Particular attention was given to relative stiffness volumes, distribution and location of stiff foci throughout the breast and their underlying masses.

Figure 36:
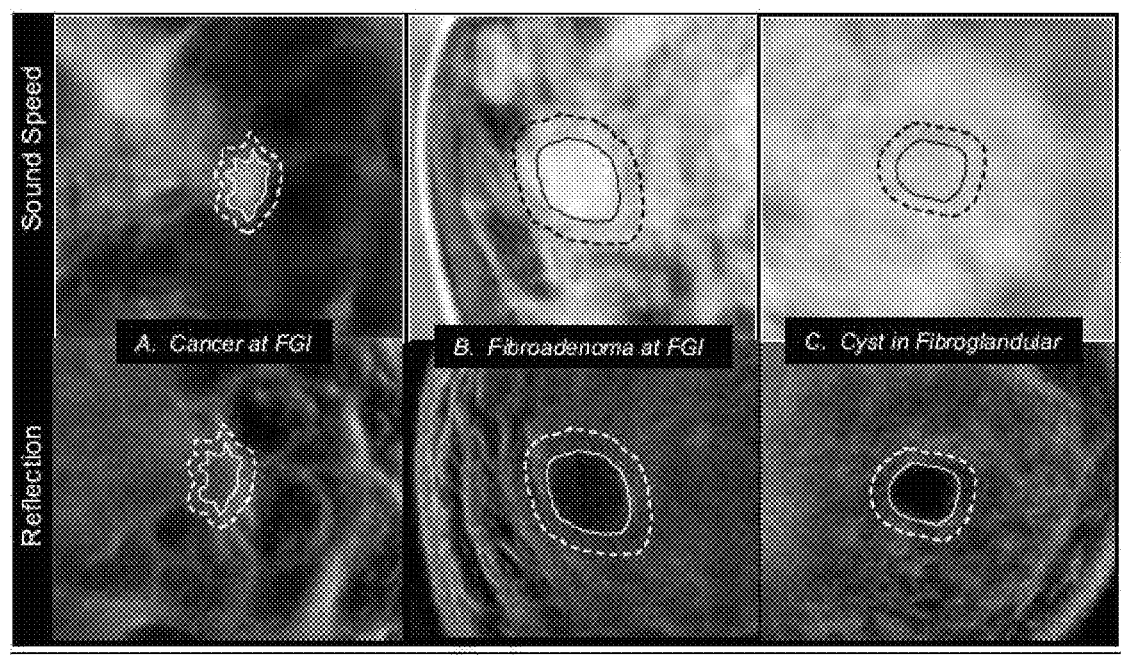
FIG. 36 shows a representation of an evaluation of a tumor (solid line) and peritumoral (dashed line) regions.

To generate regions of interest (ROI) surrounding all detected masses by UST, mass boundaries were hand-traced by a breast imaging certified radiologist using MIM software (MIM Software Inc., Cleveland, Ohio) as can be seen in FIG. 36. Mass margins were defined on the single best visualized/representative image upon a combination of sound speed and reflection image stacks to trace their contours, generating a surface area and not a volume. Once tumor margins were traced, a peritumoral ROA was computer-generated by dilating the tumor margins by 20% of the average tumor diameter, comparable to a symmetric peritumoral "band." The 20% diameter expansion was arbitrarily chosen to make it proportionate for every tumor. A mass could be considered as being at the interface of fat tissue and fibroglandular tissue (FGI) if it was surrounded by fibroglandular tissue but abutted a small margin of fat, or conversely if it was surrounded by fat by abutted adjacent fibroglandular tissue.

Mass volume estimates were derived from the averaged diameters of the traced ROI, then assuming a spheroid volume calculation (i.e., $8A^2/3\pi L$ whereby L was the average of the ROI diameters). This volumetric approach was used to potentially avoid the inaccuracies of planimetry volume techniques (i.e., summation of surface area contours associated with the lower resolution of UST in the non-coronal planes.

To generate an estimate of mass conspicuity by compressibility imaging compressibility imaging relative to the normal background, the average stiffness index of the mass ROI was compared with the proportions of VASS, VAStiff, VAInter, and VASoft, determined by K means clustering. First, the average relative stiffness distribution for each of the three major mass types (i.e., cancer, fibroadenoma, cyst) were derived for each patient's mass, then subtracted from their individual total breast volume stiffness distributions as noted above. The percentages of these stiffness components in relation to dense and non-dense mass components were also graphically compared.

Similar to the whole-breast volume evaluation, qualitative observations of mass stiffness components were also noted. These observations of stiffness distribution within masses also provided clinical context to the quantitative volume data, thereby entering the realm of texture evaluation of stiffness within masses. Particular attention was given to relative stiffness distributions in relation to the mass contents and/or its margins. To compare the future potential of quantitative texture evaluations over absolute stiffness values, the mean homogeneity of stiffness was calculated for each mass using the Gray-Level Co-Occurrence Matrix (GLCM) approach.

SoftVue demonstrated the ability to measure tissue stiffness throughout the breast and to characterize mass stiffness in all 206 patients. Whole breast evaluation demonstrated 11.2% total stiffness, and 80% confined to dense parenchyma. Masses showed size dependence of stiffness, whereby all masses <1.5 cm had greater percentage of stiff components than those >1.5 cm. Cancers had significantly greater percentage stiffness than fibroadenomas or cysts. Stiffness indices and homogeneity texture differences between the mass types were significant for both filtered and unfiltered stiffness images, respectively (p=0.035).

Figure 22:
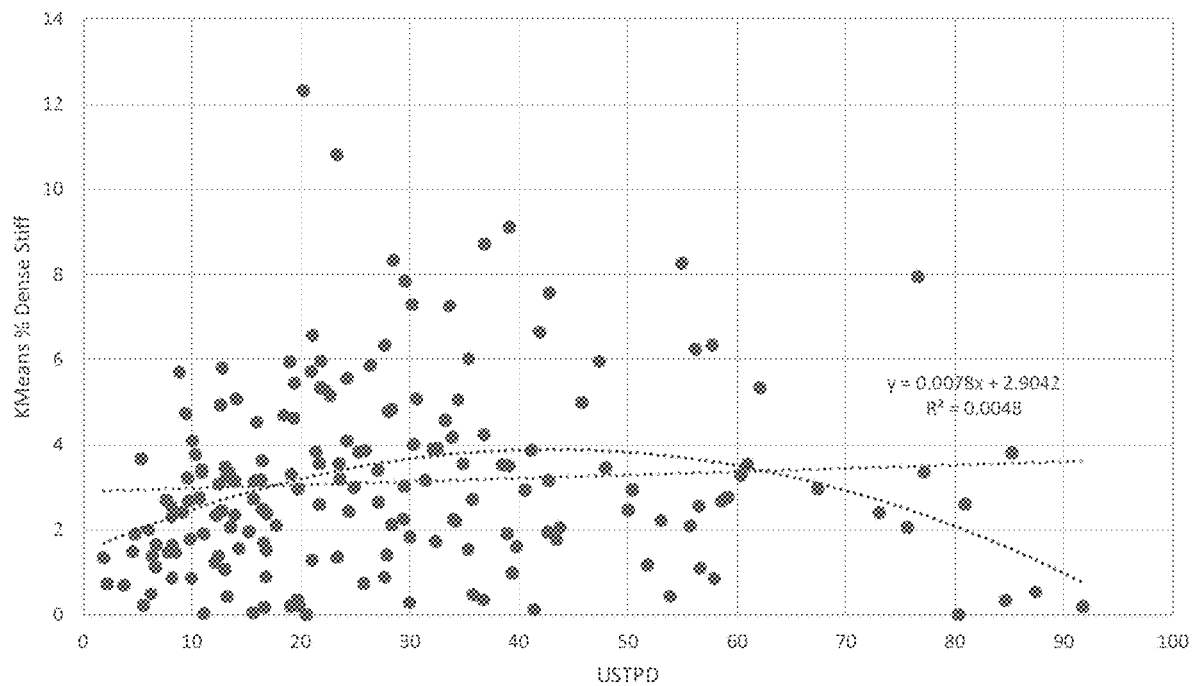
FIG. 22 shows a scatterplot of the relative volume percentage of dense tissue versus stiff components by K means clustering.

FIG. 22 demonstrates a scatterplot of the relative volume percentage of dense tissue versus stiff components by K means clustering. FIG. 22 is a scatter plot of the volume percent of the stiff dense tissue versus the USTPD score (stiffness segmentation vs SS segmentation) for the left breast only. With a correlation coefficient of 0.0048, tissue density by whole breast VASS (i.e., USTPD) appeared independent of stiffness volume distributions. The distribution of the three stiffness categories according to dense and non-dense tissues are noted in Table 9, both with and without the underlying masses.

TABLE 9

Average Breast volume distribution including/excluding masses (N = 239 pairs)

|  | Fibroglandular | Fatty | Total |
| --- | --- | --- | --- |
| Stiff | 9.0% | 2.2% | 11.2% |
| Intermediate | 11.8% | 21.7% | 33.4% |
| Soft | 8.3% | 47.1% | 55.4% |
| Total | 29.1% | 71.0% | 100.0% |

Table 9 shows total breast stiffness volume distributions as approximately 11% stiff, 33% intermediate, and 55% soft, as determined by K-means clustering separation of the whole breast volume. However, the VASS threshold basically separates fat (i.e., non-dense) from all other tissues, including or excluding, the underlying masses. The vast majority of stiff tissue volume was associated with dense breast parenchyma (i.e., 80%=9.0/11.2), while the small amount of stiff fat (i.e. non-dense=2.2%) occurred in association with adjacent parenchyma. Yet, only 30.9% of dense parenchyma had a stiff component (i.e., 9.0%/29.1%). Qualitative observations of their potential relative distribution throughout the breast were then assessed.

Given the average breast volume of 725 mL (i.e., over an average of 44 slices per breast), the average total volume of stiff tissue per breast was reduced to ~65 mL (i.e., 725*9.0%), which was generally distributed along the periphery of dense tissue (i.e., parenchyma/fibroglandular tissue). As also noted below in qualitative assessments, circumferential evaluation is expedited by the native coronal imaging plane of UST. The averaged individual breast volume distributions after subtraction of the individual mass contributions in Table 9 showed minimal effect of excluding masses. The much larger overall volume of non-mass breast tissue (i.e., average breast volume of ~725 cc) dwarfed the average mass size of 1.24 cm diameter (or average mass volume of ~1.0 cc), let alone their associated stiffness sub-volumes, regardless of whether it was cancer, fibroadenoma or cyst. Qualitative generalizations also helped localize these relative distributions.

Qualitative anatomic tissue assessments suggested a diffuse, or scattered, distribution of these stiff tissue volumes on multiple slices throughout the breast. Stiff tissue up to ~1 cm diameter (i.e., ~0.52 cc) was frequently seen at Cooper's peaks, likely related to the higher attenuation of the associated fibrous bands/ligaments, which in part conferred stiffness. With UST's primary coronal imaging plane, Cooper's peaks (2105/2106) were readily recognized as stiff pointed extensions of the fat-fibroglandular boundary into the peripheral subcutaneous fat (FIG. 21).

Even with parenchymal regression or atrophy in certain regions with age, the prior boundary of fat-fibroglandular tissue could still be seen as white fibrous bands on SS along the circumferential periphery, several of which were still associated with residual parenchyma at some Cooper's peaks. Considering that most images throughout a very dense breast (e.g., ~40/breast) may have at least one stiff Cooper's peak, the average stiffness volume of ~20 cc theoretically could be evenly distributed between 40 small stiff foci (e.g., 0.5 cc ~ 0.8 cm average diameter). As opposed to stiff masses considered later, stiff Cooper's peaks were best recognized as normal, non-mass tissue by noting the continuous slice-to-slice extension of underlying parenchyma, or "flow" of normal tissue across images (i.e. on SS and/or Reflection image stacks). While this generalized approach also emphasized minimal stiffness of most parenchymal tissue, Cooper's peaks were not the only common non-mass foci of stiffness.

Stiff foci of parenchyma not associated with Cooper's peaks were occasionally noted, ranging from ~0.5-3 cm maximal diameter. Identification of target masses as separate from these clusters of stiff dense tissue, first required awareness of whether the underlying tissue was normal, whereby it flowed from slice to slice on SS and/or Reflection. Focal mass effect was thus identified by either their smooth benign-appearing margins, or their irregular asymmetry. Suspicious asymmetry was most frequently identified along the fat-fibroglandular interface, again on either SS and/or Reflection.

Figures 23A, 23B:
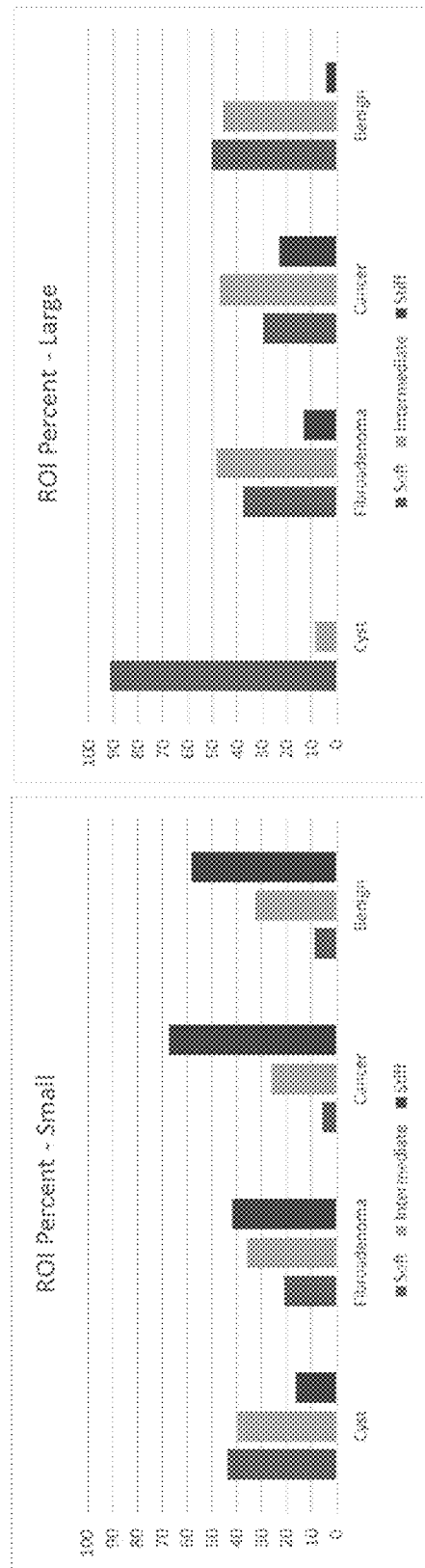
FIG. 23A and FIG. 23B show bar charts of the relative stiffness distributions for each mass type, separated according to mass size below and above 1.5 cm, respectively, using a first image modality.

FIG. 23A and FIG. 23B demonstrate the relative stiffness distributions for each mass type, separated according to mass size below and above 1.5 cm, respectively. FIG. 23A and FIG. 23B is a graphic distribution of relative stiffness components (%) for masses≤1.5 and >1.5 cm. All smaller masses had greater percentages of stiff components, especially cancers (67%). Conversely, larger masses had significantly greater percentages of softer components.

In general, all smaller masses (i.e., <1.5 cm) had a greater percentage of the stiff component, regardless of tumor type. Conversely, larger masses (i.e., >1.5 cm) had significantly greater percentages of the softer components.

Figure 24A:
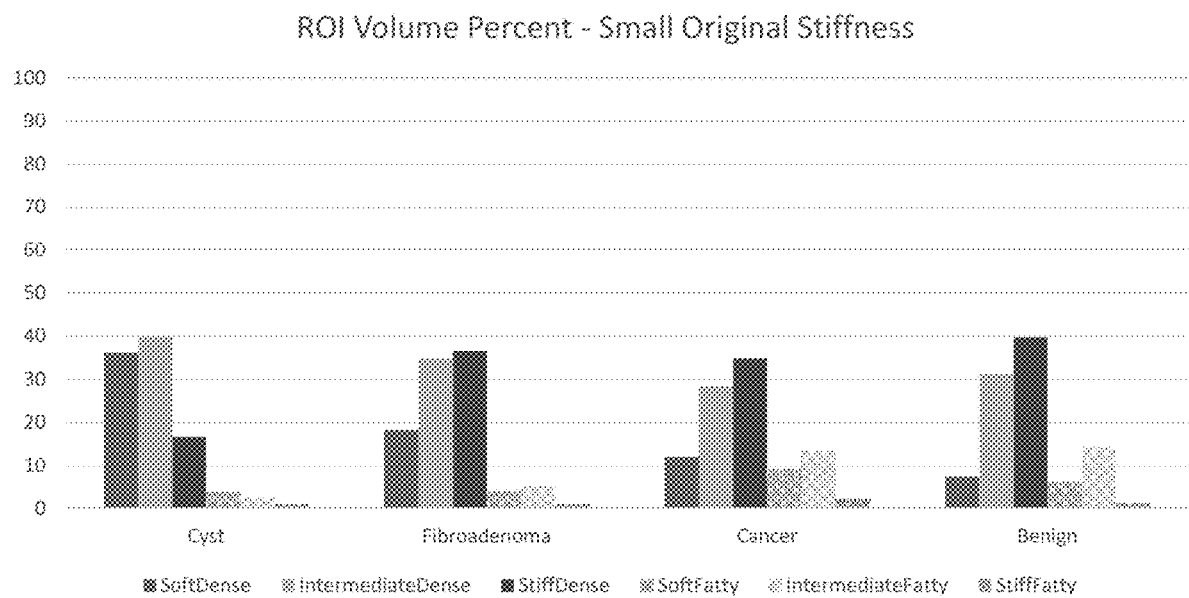
FIG. 24A and FIG. 24B show bar charts of the relative stiffness distributions for each mass type, separated according to mass size below and above 1.5 cm, respectively, using a second image modality.
Figure 24B:
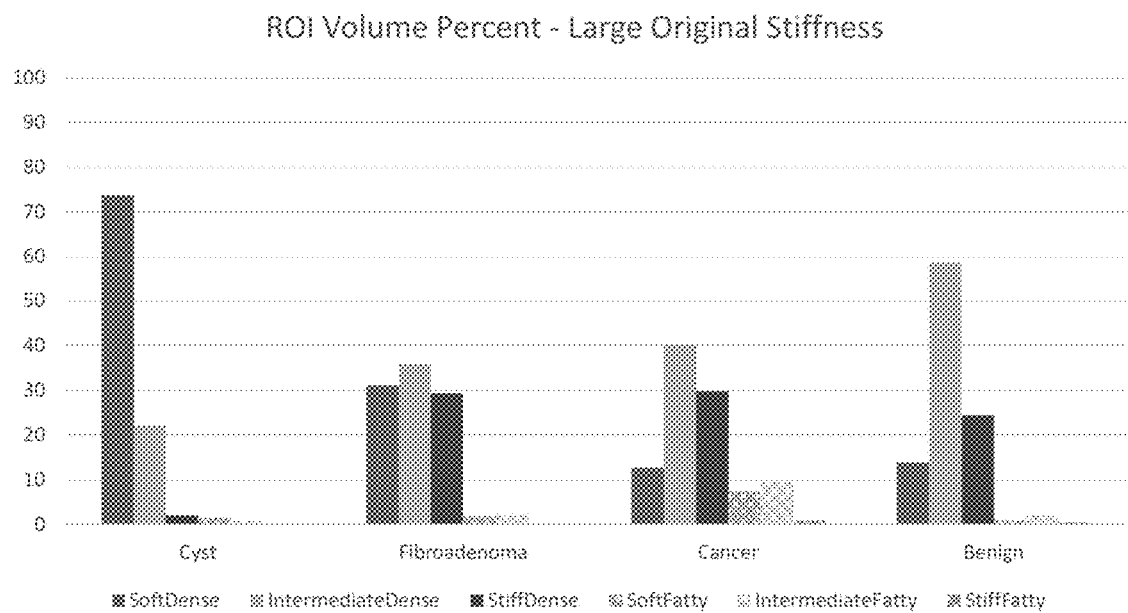

FIG. 24A and FIG. 24B show the relative stiffness distributions for each mass type, separated according to mass size below and above 1.5 cm, respectively, using a second image modality.

Figure 25A:
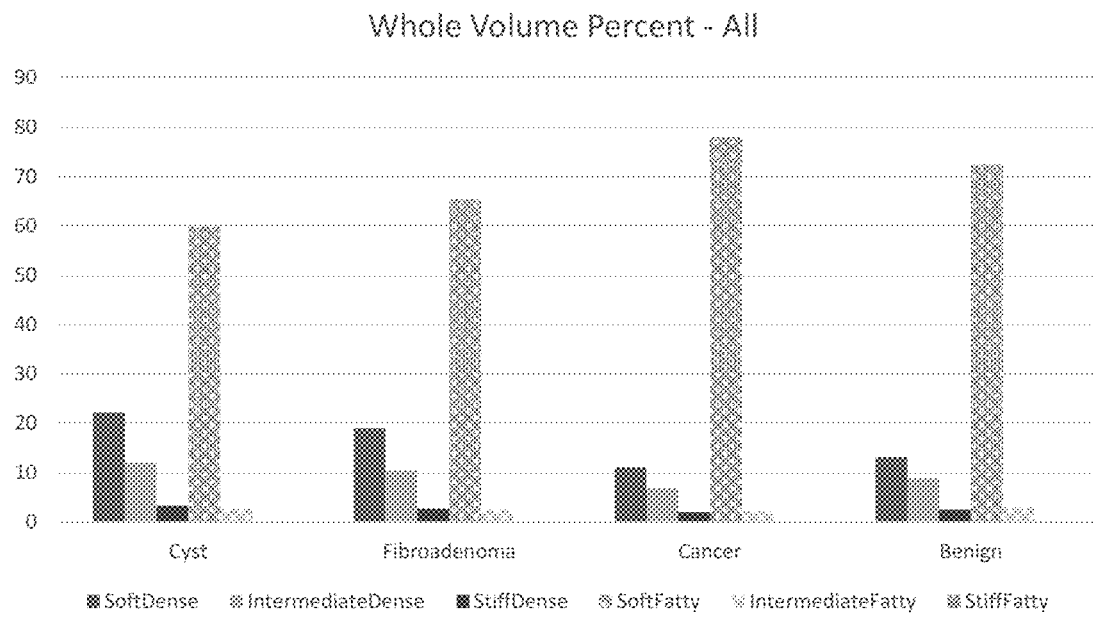
FIG. 25A and FIG. 25B show bar charts of the relative stiffness distributions for a whole breast separated by mass type, for a first image modality (FIG. 25A) and a second image modality (FIG. 25B).
Figure 25B:
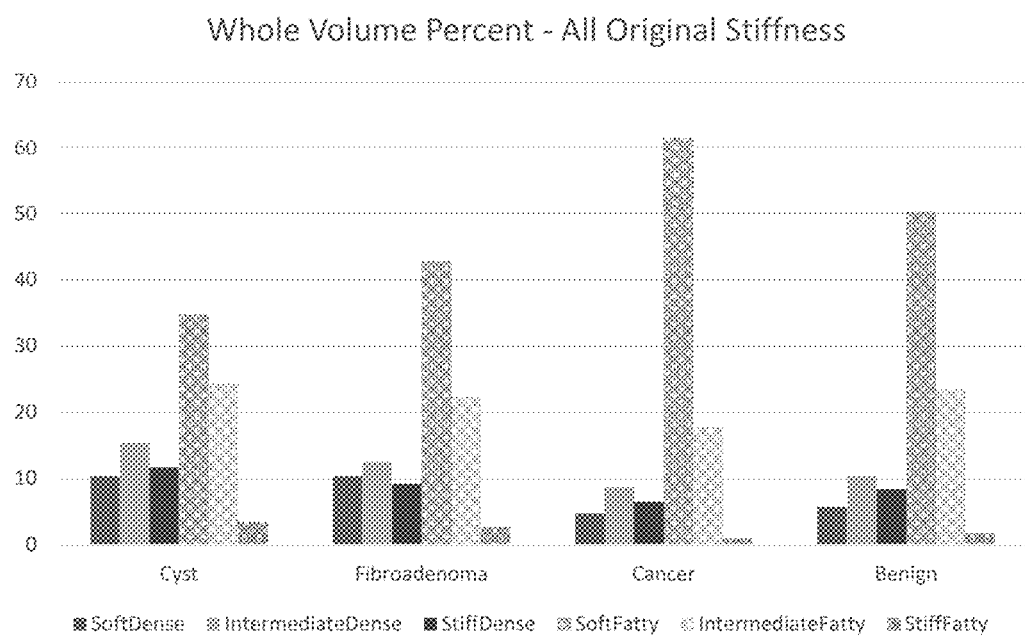

FIG. 25A and FIG. 25B show the relative stiffness distributions for a whole breast separated by mass type, for a first image modality (FIG. 5A) and a second image modality (FIG. 25B).

Figure 26A:
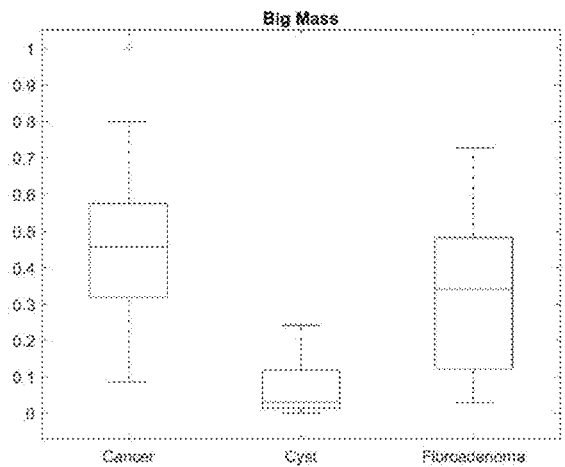
FIG. 26A, FIG. 26B, FIG. 26C, and FIG. 26D show bar graphs of confidence intervals for percent stiff components values for mass size above 1.5 cm (FIG. 26A and FIG. 26B) and below 1.5 cm (FIG. 26C and FIG. 26D) using a first image modality (FIG. 26A and FIG. 26C) and a second image modality (FIG. 26B and FIG. 26D).
Figure 26B:
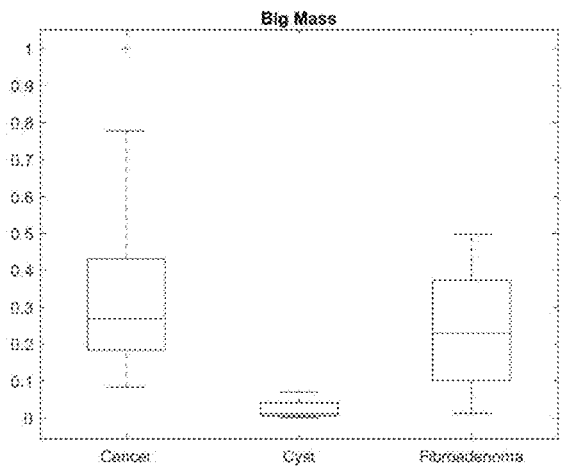
Figure 26C:
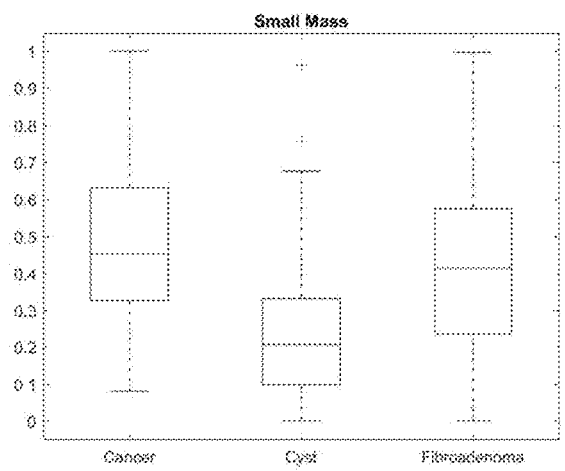
Figure 26D:
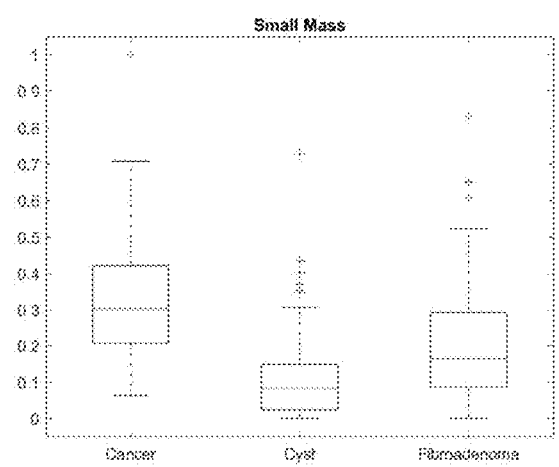

FIG. 26A, FIG. 26B, FIG. 26C, and FIG. 26D show confidence intervals for percent stiff components values for mass size above 1.5 cm (FIG. 26A and FIG. 26B) and below 1.5 cm (FIG. 26C and FIG. 26D) using a first image modality (FIG. 26A and FIG. 26C) and a second image modality (FIG. 26B and FIG. 26D). The following list provides confidence intervals and P values for cancer versus FA:

Confidence Intervals:
Filtered Small Mass 5%-95% Confidence Intervals
   cancer: 0.1247-0.6967
   FA: 0.1704-0.5303
   cyst: 0.001-0.3618
Filtered Big Mass 5%-95% Confidence Intervals
   cancer: 0.0826-0.8104
   FA: 0.0197-0.4830
   cyst: 0.00005-0.0691
Original Small Mass 5%-95% Confidence Intervals
   cancer: 0.1256-0.8585
   FA: 0.0021-0.8634
   cyst: 0.00012-0.6499
Original Big Mass 5%-95% Confidence Intervals
   cancer: 0.1916-0.8288
   FA: 0.036-0.7005
   cyst: 0.00034-0.2364

P Values:
Original Small:
   cancer vs cyst: 0.000000001
   cancer vs FA: 0.08
   cyst vs FA: 0.0000017
Orig Big:
   cancer vs cyst: 0.0000000002
   cancer vs FA: 0.037
   cyst vs FA: 0.00013
Filtered Small:
   cancer vs cyst: 0.00000000006
   cancer vs FA: 0.000036
   cyst vs FA: 0.00028
Filtered Big:
   cancer vs cyst: 0.00000021
   cancer vs FA: 0.127
   cyst vs FA: 0.000025

The p values show that the filtered stiffness image has much better differentiation power (p value for cancer vs FA: 0.000036 vs 0.08) for masses smaller than 1.5 cm, while the original stiffness has moderately better differentiation power (pvalue for cancer vs FA: 0.037 vs 0.127) for bigger mass (>1.5 cm).

Considering the histologic types, smaller Cysts containing stiffer components were commonly associated with complex cyst contents (i.e., by standard handheld US) and underwent aspiration/biopsy, whereas larger cysts were simple. Stiffness within Fibroadenomas were generally associated with heterogeneous blending of the stiff component along the mass periphery, especially posterior (i.e., out-of-plane transmission artifacts with artificially greater SS/ATT are often projected along the posterior aspect of masses).

Cancers showed the greatest percentage of stiff component, whereby smaller cancers are predominantly stiff compared with larger cancers (i.e., 67% versus 38%, respectively). Smaller cancers often had their stiff component centrally, whereas larger cancers often had an asymmetric clustered portion, rather than the heterogeneous blending noted for fibroadenomas. The fourth histologic category of "benign" had lower representation (i.e., N=24), with only 3 larger masses showing a stiffness pattern similar to cysts, of which 2 were histologically fibrocystic change and 1 granulomatous mastitis. Conversely, the majority of the smaller benign category suggested similar stiffness distribution as the cancer category with histologic outcomes commonly showing underlying fibrosis (i.e., biopsy report descriptions).

Table 10 lists the absolute stiffness indices and their texture homogeneity for each type of mass. Cysts, fibroadenomas and cancers were found to have highly significant differences in mean stiffness indices (p<0.0005). Even greater separation of mass type was noted for GLCM homogeneity (p<0.0001), compatible with greater irregularity in the stiffness texture of cancers than fibroadenomas or cysts.

TABLE 10

| Type of Mass | Stiffness Index | Standard deviation | 5%-95% CI | Mean Homogeneity | Standard Deviation | 5%-95% CI |
|---|---|---|---|---|---|---|
| Cyst | 0.10 | 0.20 | 0.05-0.30 | 0.83 | 0.05 | 0.73-0.91 |
| FA | 0.35 | 0.24 | 0.25-0.77 | 0.77 | 0.06 | 0.65-0.85 |
| Cancer | 0.61 | 0.19 | 0.41-1.00 | 0.66 | 0.09 | 0.52-0.19 |

Soft Vue UST is unique in its ability to display a whole-breast distribution of tissue stiffness, including masses. Methods and systems disclosed herein quantify relative stiffness percentages of dense and non-dense tissue (i.e., fibroglandular/stroma and fat, respectively) from chest wall to nipple, while providing insights to tissue histology for available masses. Provided herein are stiffness data from a clinical series of UST mass evaluations as part of a clinical arm for an ongoing FDA PMA screening trial for women with dense breasts. Qualitative aspects of stiffness distributions contributed early clinical insights that may facilitate learning and future quantitative analyses.

Whole breast stiffness by UST showed that most stiff foci resided within underlying dense tissue, yet most of this dense tissue is not stiff (i.e., 76% soft or intermediate stiffness). Excluding underlying masses, normal stiff regions were frequently seen at Cooper's peaks, or clustered together within dense parenchyma along the fat-fibroglandular junction. The relatively random and/or diffuse distribution of larger stiff foci (i.e., >0.7 mm diameter) impacts the visibility, or conspicuity, of masses within the breast volume (i.e., for early detection/screening). Qualitative discernment of normal tissue from actual underlying masses was thus required by radiologists' evaluation.

Assessment of masses by the Compressibility imaging (i.e., stiffness fusion) image stack first required correlation with the similar anatomic location on comparable sequential Reflection and SS images. A stiff region arising from underlying normal tissue showed smooth/continuous 3D movement, or "flow", of parenchymal tissue from image-to-image on the Reflection and/or SS image stacks. Conversely, an actual underlying mass was identified predominantly by more discrete margins on Reflection and/or SS.

Whole breast volumes: As a unique whole-breast imaging sequence, the Compressibility imaging (i.e., Stiffness Fusion) sequence provided new insight for dense breast evaluation. FIG. 22 confirmed that percent volume stiffness appeared relatively independent of sound speed (SS) alone, despite SS comprising a part of the stiffness calculation. The majority of soft regions on Compressibility imaging images (i.e., stiffness fusion) were thus virtually transparent to the underlying Reflection images and normal tissue flow from slice-to-slice. Despite extremely dense breast tissue throughout a breast volume (i.e., ~27% of patients in this series), which can obscure dense masses on SS similar to mammography, only ~9% of that dense volume was stiff and resided almost entirely in the periphery of that dense volume. Moreover, much of that limited stiffness could be accounted for by normal tissue, such as Cooper's peaks. This left few foci of larger stiffness foci (e.g., >7 mm diameter) requiring careful confirmation of underlying flowing normal tissue from slice-to-slice on SS and Reflection. While preliminary, relative conspicuity of stiff foci from the background whole-breast volume may have both quantitative and qualitative implications for dense breast screening for suspicious masses.

Breast density and whole breast tissue stiffness have already been shown to be independent risk factors for breast cancer (references) but have not been localized together. UST ability to localize nearly all stiffness to underlying parenchyma may provide finer detail to future risk analyses and potential associated chemoprevention measures, such as tamoxifen and/or dietary changes.

Mass volumes: Smaller cancers had the greatest percentage of the stiffest component, but all mass types showed a size dependence of percent stiffness, whereby all mass types <1.5 cm had significantly greater stiffness than their larger mass counterparts. While larger cancers may have more central components of necrosis that confer greater softness of the overall mass, larger fibroadenomas or cysts require other considerations. For these benign larger masses, greater surrounding tissue compliance for internal histology may be considered. Namely, fibroadenomas may have more scirrhous components but are not routinely mentioned on biopsy pathology reports and are beyond the scope of this paper. Similarly, larger cysts may have less relative internal pressure and are less likely to be refilled or complex than smaller cysts. It is interesting to note that the small group of Benign tissue histology suggested a pattern of greater focal fibrosis for the smaller masses and more fibrocystic or inflammatory changes for larger masses.

Stiffness distribution within masses also had qualitative differences, whereby cancers had more central or clustered stiffness, compared with the more blended stiffness distribution within some fibroadenomas. These relative distributions of internal mass stiffness also suggest these may contribute to texture differences. Initial texture evaluation of stiffness within masses also suggested greater irregularity in the stiffness texture of cancers, more than fibroadenomas and cysts (Table 10).

Figure 34:
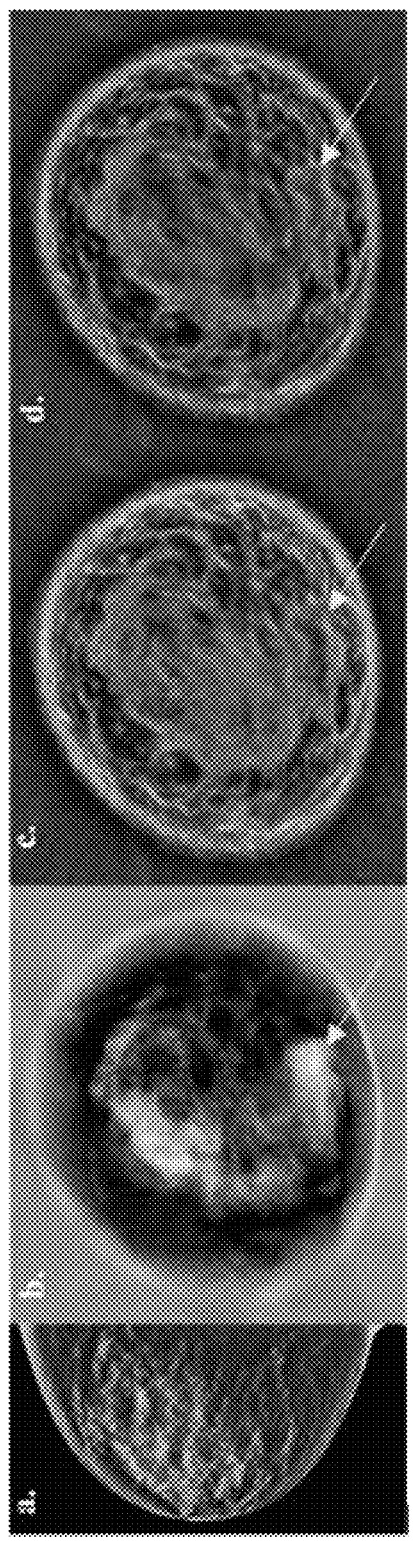
FIG. 34 shows an example of a unfiltered stiffness image, a sound speed image, and a spatially filtered stiffness image of a breast with cancer.

Optimal visualizations of stiffness for mass differentiation as explored for both the default unfiltered and a single spatially filtered stiffness algorithm (i.e., <1.5 cm). Selected images of a mammographically occult cancer are shown in FIG. 34. The default unfiltered stiffness image (c) partially obscures the underlying mass effect due to the larger structural stiffness of adjacent parenchyma. The underlying small cancer is better defined in the sound speed and spatially filtered stiffness images (b, d respectively), the latter of which suppressed noise contributions from larger stiff structures, such as adjacent fibroglandular tissue and skin. The cancer also lies along the fat-glandular interface, a characteristic that has been noted for 94-99% of cancers by breast MRI, and especially notable when visualized in the native coronal plane of UST.

Figure 31:
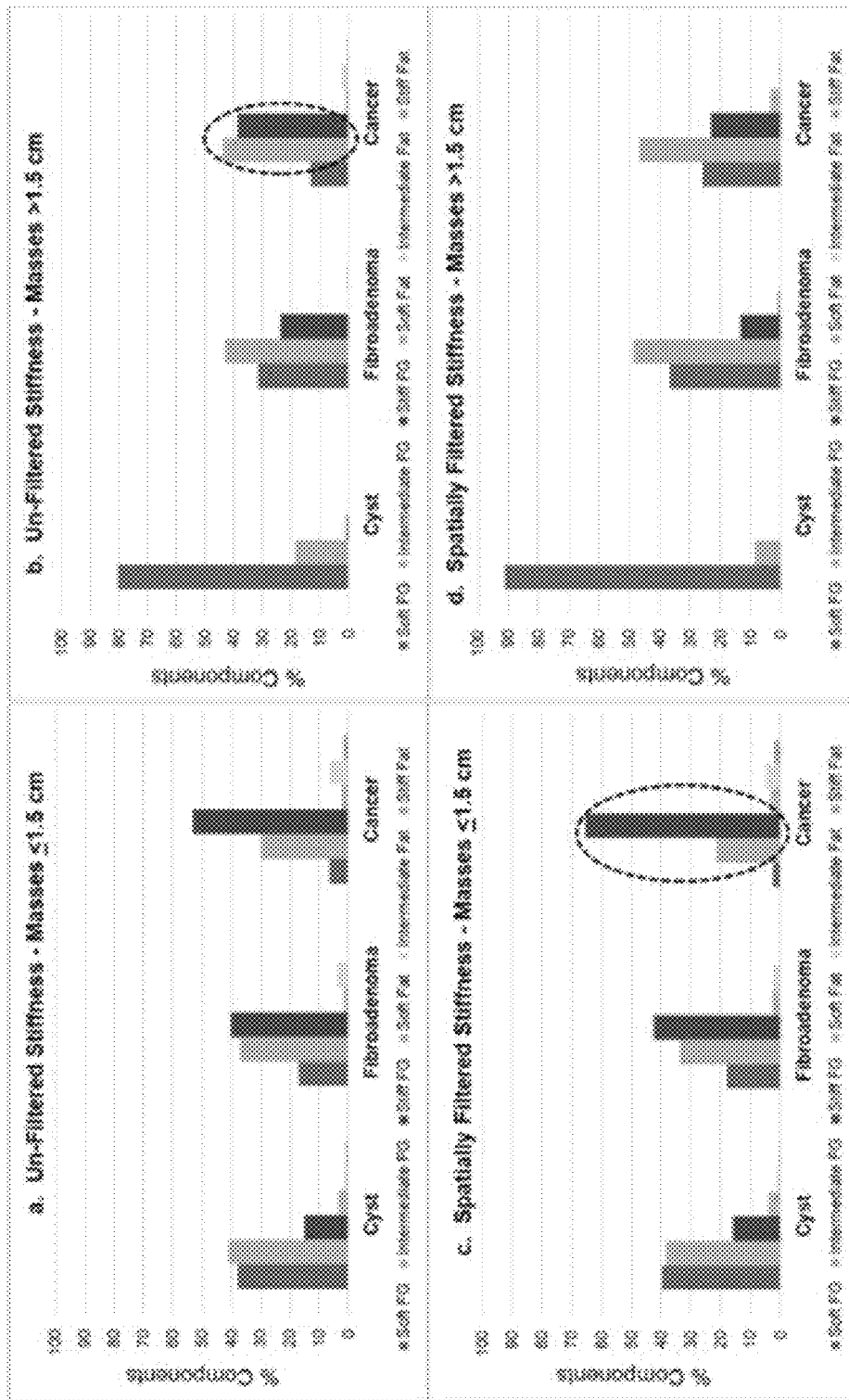
FIG. 31 shows a graph of relative stiffness components as part of the region of interest measurement for masses using unfiltered (top row) and spatially filtered (bottom row) renderings.

Unfiltered and filtered stiffness distributions were separated according to mass size and type in FIG. 31. In general, all smaller masses had a significantly greater percentage of the stiffest component (i.e., dark grey), regardless of tumor type or filtering algorithm. Conversely, larger masses had significantly greater percentages of the softer components (chi-squared; p=0.001). For the filtered algorithm, small cancers reached greater statistical significance for percentages of the stiffest component, compared with fibroadenomas (t test, p=0.001). As expected, the spatial filtering, larger masses (right graphs in FIG. 31) had lower percentages of the stiffest components. Additional data from the mass stiffness distributions also gave insight to their visual appearance. Namely, another way to describe the shift to greater visualization for smaller cancers (circled in graph b of FIG. 31) that fibroadenomas used the averages of the most common pixel percentages of stiffness. Only small cancers were significantly altered by spatial filtering, going from pixel averages of 61.5% and 30.8% for unfiltered stiff and intermediate components to 84.6% and 11.5% for spatial filtering, respectively (p<0.001).

Quantitative stiffness values of large and small masses, as displayed by the unfiltered and spatially filtered algorithms, are shown in Table 12.

TABLE 12

| Total Mass Comparisons | | | Stiffness (5%-95% C.I) | | p values2 |
|---|---|---|---|---|---|
| Small | Unfiltered | Cancer (CA) | 0.1256-0.8585 | CA vs Cyst: | 0.000000001 |
| | | Fibroadenoma (FA) | 0.0021-0.8634 | CA vs FA: | 0.08 |
| | | Cyst | 0.00012-0.6499 | Cyst vs FA: | 0.0000017 |
| | Filtered | Cancer (CA) | 0.1247-0.6967 | CA vs Cyst: | 6E-11 |
| | | Fibroadenoma (FA) | 0.1704-0.5303 | CA vs FA: | 0.000036 |
| | | Cyst | 0.001-0.3618 | Cyst vs FA: | 0.00028 |
| Large | Unfiltered | Cancer (CA) | 0.1916-0.8288 | CA vs Cyst: | 2E-10 |
| | | Fibroadenoma (FA) | 0.036-0.7005 | CA vs FA: | 0.037 |
| | | Cyst | 0.00034-0.2364 | Cyst vs FA: | 0.00013 |
| | Filtered | Cancer (CA) | 0.0826-0.8104 | CA vs Cyst: | 0.00000021 |
| | | Fibroadenoma (FA) | 0.0197-0.4830 | CA vs FA: | 0.127 |
| | | Cyst | 0.00005-0.0691 | Cyst vs FA: | 0.000025 |

The filtered rendering produced significantly greater discrimination of smaller cancers from fibroadenomas (i.e., p=0.00036 versus p=0.080). Conversely, the unfiltered stiffness images better separated the larger cancers from fibroadenomas (p=0.037 versus p=0.127). Stiffness indices and homogeneity texture differences between the mass types were significant for both filtered and unfiltered stiffness images, respectively (p=0.035).

Figure 32:
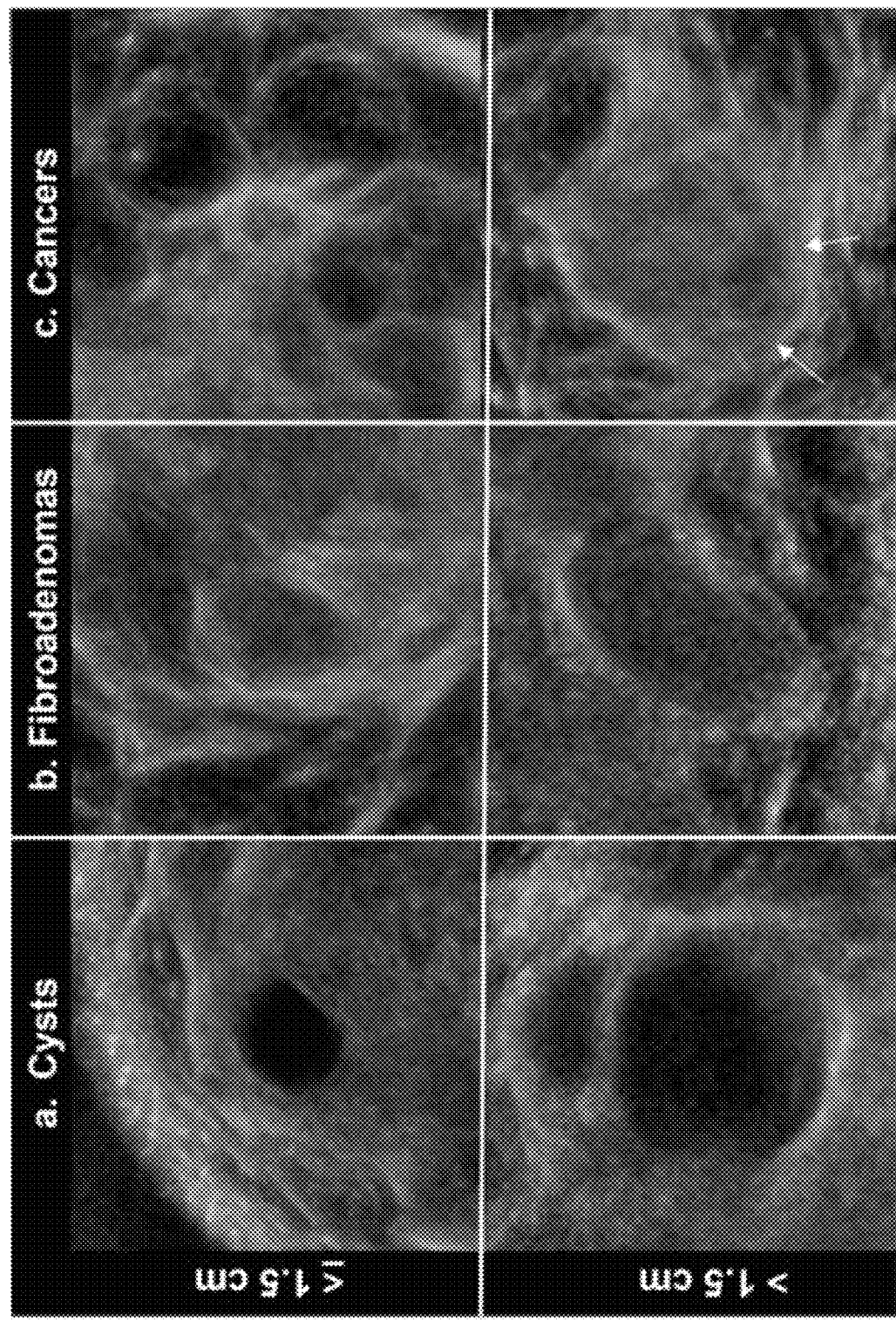
FIG. 32 shows filtered stiffness images of cysts, fibroadenomas and cancers.

Examples of spatially filtered stiffness images are shown in FIG. 32, using magnified cropped view of both smaller and larger cysts, fibroadenomas and cancers. Considering benign masses first, simple cysts had a soft appearance (black) with little or no internal stiffness regardless of size, left top and bottom. Smaller cysts containing stiffer components were commonly associated with complicated cysts (i.e., by standard US) and underwent aspiration/biopsy. Fibroadenomas had either homogenous or mildly heterogenous internal appearance, middle top and bottom, reflecting the quantitative stiffness components noted in FIG. 31, which may be associated with more uniform blending of the stiffness components, middle top and bottom. The fourth histologic category of "other benign" had lower representation (Table 8; N=24), with the 3 larger masses showing a softer pattern like cysts, of which 2 were histologically fibrocystic change and 1 granulomatous mastitis. Conversely, most of the small other benign category (i.e., N-21) suggested stiffness similar to cancers and commonly showed underlying fibrosis (i.e., biopsy report descriptions).

Cancers in FIG. 32, right top and bottom showed the greatest percentage of the stiffest component, whereby small cancers were predominantly stiff compared with larger cancers, as in FIG. 31. Qualitatively, smaller cancers often had their stiff component located centrally (FIG. 32, right top), whereas larger cancers were mostly soft but may have an asymmetric rim of clustered stiffness (FIG. 32, right bottom). Smaller cancers also had irregular margins with less contrast on reflection (i.e., intermediate or gray), corresponding to conventional US terminology of isoechoic than the darker appearing benign masses and larger cancers. Considering the limited number of cancer sub-types, the 7 lobular carcinomas, 2 smaller papillary/mucinous IDCs and the 2 smaller DCIS, all appeared stiff and did not have well circumscribed margins.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of characterizing a tissue volume, the method comprising:
   receiving a plurality of ultrasound tomography images of the tissue volume at a computing system, wherein the plurality of ultrasound tomography images comprises a set of sound speed data and a set of attenuation data, and wherein the tissue volume is breast tissue;
   extracting, at the computing system, a volume averaged sound speed within the tissue volume from the set of sound speed data;
   generating, at the computing system, a stiffness map based at least in part on the set of sound speed data and the set of attenuation data;
   differentiating, at the computing system, between a first tissue type and a second tissue type based at least in part on at least a first tissue type volume averaged sound speed threshold;
   calculating, at the computing system, a volume average stiffness of at least the first tissue type and the second tissue type for a region of the tissue volume based at least in part on the stiffness map; and
   determining, at the computing system, a relative stiffness distribution within the region of the tissue volume, wherein determining the relative stiffness distribution comprises determining a distribution percentage of the first tissue type and a distribution percentage of the second tissue type within the region of the tissue volume, based at least in part on the volume average stiffness of at least the first tissue type and the second tissue type for the region of the tissue volume,
   thereby providing a characterization of the region of the tissue volume.

2. The method of claim 1, wherein the plurality of ultrasound tomography images comprises a plurality of two-dimensional (2D) images, wherein the plurality of 2D images comprise the set of sound speed data; and wherein extracting the volume averaged sound speed comprises:
   determining a volume (V) of the tissue volume by a direct pixel count of the plurality of 2D images; and
   determining the volume averaged sound speed by summing all sound speed pixel values within the direct pixel count and dividing by the volume (V).

3. The method of claim 1, further comprising determining a percent of sound speed tissue of the tissue volume above a threshold from the plurality of ultrasound tomography images of the tissue volume.

4. The method of claim 3, wherein determining the percent of sound speed tissue above the threshold comprises creating a mask comprising the sound speed tissue above the threshold.

5. The method of claim 4, wherein the plurality of images comprises a sound reflection image, and wherein the mask is created from the sound reflection image.

6. The method of claim 4, wherein the mask is created using a k-means segmentation algorithm.

7. The method of claim 1, further comprising characterizing the tissue volume over a plurality of instances of time, wherein the plurality of instances of time comprises at least a portion of a time duration during or after which a treatment is provided.

8. The method of claim 7, wherein the treatment is a preventative or an adjuvant treatment, and wherein the time duration is during a time period for the preventative or the adjuvant treatment.

9. The method of claim 7, wherein the treatment comprises at least one element selected from the group consisting of a chemotherapy treatment, a radiation therapy treatment, a cryotherapy treatment, a radiofrequency ablation treatment, a focused ultrasound treatment, and an electroporation treatment.

10. The method of claim 7, wherein the treatment is a preventative treatment.

11. The method of claim 10, wherein the treatment comprises use of tamoxifen, raloxifene, other anti-estrogen drugs, a dietary restriction, and/or a lifestyle intervention.

12. The method of claim 1, wherein determining the relative stiffness distribution with the region of the tissue volume occurs within 30 days of a start of a treatment plan or later.

13. The method of claim 12, wherein determining the relative stiffness distribution within the region of the tissue volume occurs within 14 days of a start of the treatment plan or later.

14. The method of claim 7, wherein the treatment plan comprises neoadjuvant chemotherapy.

15. The method of claim 12, wherein the plurality of instance of time are during a preventative or an adjuvant time period.

16. The method of claim 12, wherein the treatment plan comprises at least one element selected from the group consisting of a chemotherapy treatment, a radiation therapy treatment, a cryotherapy treatment, a radiofrequency ablation treatment, a focused ultrasound treatment and an electroporation treatment.

17. The method of claim 12, wherein the treatment plan is a preventative treatment.

18. The method of claim 17, wherein the treatment plan comprises use of tamoxifen, raloxifene, other anti-estrogen drugs, a dietary intervention, and/or a lifestyle intervention.

19. A computing system, wherein the computing system comprises a non-transitory computer-readable medium comprising instructions stored thereon which when executed by a processor are configured to:
receive a plurality of ultrasound tomography images of a tissue volume at a computing system, wherein the plurality of ultrasound tomography images corresponds to a plurality of instances of time, and wherein the plurality of ultrasound tomography images comprises a set of sound speed data, and a set of attenuation data;
extract a volume averaged sound speed within the tissue volume from the set of sound speed data using the computing system;
generate a stiffness map based at least in part on the set of sound speed data and the set of attenuation data using the computing system;
differentiate between a first tissue type and a second tissue type based at least in part on at least a first tissue type volume averaged sound speed threshold using the computing system;
calculate a volume average stiffness of at least the first tissue type and the second tissue type for a region of the tissue volume based at least in part on the stiffness map;
determine a relative stiffness distribution within the region of the tissue volume using the computing system, wherein determining the relative stiffness distribution comprises determining a distribution percentage of the first tissue type and a distribution percentage of the second tissue type within the region of the tissue volume based at least in part on the volume average stiffness of at least the first tissue type and the second tissue type for the region of the tissue volume,
thereby providing a characterization of the region of the tissue volume.

20. The method of claim 1, further comprising determining a mass type within the region of the tissue.

21. The method of claim 1, wherein the plurality of ultrasound tomography images comprises a set of reflection data, and wherein the plurality of ultrasound tomography images comprises the relative stiffness distribution overlaying the reflection data.

22. The method of claim 1, wherein the characterization of the region of the tissue volume is performed with or without filtering.

* * * * *